(12) United States Patent
Urtasun et al.

(10) Patent No.: US 11,461,583 B2
(45) Date of Patent: Oct. 4, 2022

(54) BINARY FEATURE COMPRESSION FOR AUTONOMOUS DEVICES

(71) Applicant: UATC, LLC, San Francisco, CA (US)

(72) Inventors: Raquel Urtasun, Toronto (CA); Xinkai Wei, Toronto (CA); Ioan Andrei Barsan, Toronto (CA); Julieta Martinez Covarrubias, Toronto (CA); Shenlong Wang, Toronto (CA)

(73) Assignee: UATC, LLC, Mountain View, CA (US)

( * ) Notice: Subject to any disclaimer, the term of this patent is extended or adjusted under 35 U.S.C. 154(b) by 189 days.

(21) Appl. No.: 16/598,579

(22) Filed: Oct. 10, 2019

(65) Prior Publication Data

US 2020/0160104 A1 May 21, 2020

Related U.S. Application Data

(60) Provisional application No. 62/846,248, filed on May 10, 2019, provisional application No. 62/768,816, filed on Nov. 16, 2018.

(51) Int. Cl.
*G06K 9/62* (2022.01)
*G06N 3/04* (2006.01)
(Continued)

(52) U.S. Cl.
CPC ......... *G06K 9/6232* (2013.01); *G06K 9/6256* (2013.01); *G06K 9/6262* (2013.01);
(Continued)

(58) Field of Classification Search
CPC .. G06K 9/4628; G06K 9/4647; G06K 9/6232; G06K 9/6256; G06K 9/6262;
(Continued)

(56) References Cited

U.S. PATENT DOCUMENTS 6,404,919 B1 * 6/2002 Nishigaki ............... G06T 9/005
 382/162
10,192,327 B1 * 1/2019 Toderici ............... G06K 9/6256
(Continued)

OTHER PUBLICATIONS

Barnes et al, "The Generalized Patchmatch Correspondence Algorithm", European Conference on Computer Vision, Sep. 5-11, 2010, Crete, Greece, 14 pages.
(Continued)

*Primary Examiner* — Ian L Lemieux
(74) *Attorney, Agent, or Firm* — Dority & Manning, P.A.

(57) ABSTRACT

Systems, methods, tangible non-transitory computer-readable media, and devices associated with object localization and generation of compressed feature representations are provided. For example, a computing system can access training data including a source feature representation and a target feature representation. An encoded target feature representation can be generated based on the target feature representation and a machine-learned encoding model. A binarized target feature representation can be generated based on the encoded target feature representation and lossless binarization operations. A reconstructed target feature representation can be generated based on the binarized target feature representation and a machine-learned decoding model. A matching score for the source feature representation and the reconstructed target feature representation can be determined. A loss associated with the matching score can be determined. Parameters of the machine-learned encoding model and the machine-learned decoding model can be adjusted based on the loss.

17 Claims, 18 Drawing Sheets

(51) Int. Cl.
   *G06N 3/08* (2006.01)
   *G06N 20/00* (2019.01)
   *G06V 10/44* (2022.01)
   *G06V 10/50* (2022.01)
   *G06V 30/194* (2022.01)

(52) U.S. Cl.
   CPC ............. *G06N 3/04* (2013.01); *G06N 3/0454* (2013.01); *G06N 3/08* (2013.01); *G06N 3/084* (2013.01); *G06N 20/00* (2019.01); *G06V 10/454* (2022.01); *G06V 10/507* (2022.01); *G06V 30/194* (2022.01)

(58) Field of Classification Search
   CPC ... G06K 9/66; G06K 9/00791; B60W 60/001; G06N 20/00; G06N 3/04; G06N 3/0454; G06N 3/08; G06N 3/084; G06N 3/0445; G06N 7/005
   See application file for complete search history.

(56) References Cited

U.S. PATENT DOCUMENTS

| | | | | |
|---|---|---|---|---|
| 10,885,379 | B2* | 1/2021 | Zhang | G06K 9/629 |
| 2012/0250763 | A1* | 10/2012 | Lainema | H04N 19/463 |
| | | | | 375/240.08 |
| 2018/0174047 | A1* | 6/2018 | Bourdev | G06N 20/00 |
| 2019/0158884 | A1* | 5/2019 | Tsai | H04N 19/85 |
| 2019/0311202 | A1* | 10/2019 | Lee | G06K 9/3233 |
| 2020/0160117 | A1* | 5/2020 | Urtasun | H04N 19/91 |
| 2020/0160151 | A1* | 5/2020 | Urtasun | G06K 9/6256 |

OTHER PUBLICATIONS

Bay et al, "SURF: Speeded Up Robust Features", European Conference on Computer Vision, May 7-13, 2006, Graz, Austria, 14 pages.
Brachmann et al, "DSAC-Differentiable RANSAC For Camera Localization" arXiv: 1611v4, Mar. 21, 2018, 11 pages.
Calonder et al, "Brief: Binary Robust Independent Elementary Features", European Conference on Computer Vision, Sep. 5-11, 2010, Crete, Greece, 14 pages.
Chaurasia et al, "Linknet: Exploiting Encoder Representations for Efficient Semantic Segmentation", arXiv: 1707v1, Jun. 14, 2017, 5 pages.
Chen et al, "Attention to Scale: Scale-Aware Semantic Image Segmentation", Conference on Computer Vision and Pattern Recognition, Jun. 26-Jul. 1, 2016, Las Vegas, Nevada, 10 pages.
Chorowski et al, "Attention-Based Models for Speech Recognition", arXiv: 1506v1, Jun. 24, 2015, 19 pages.
Girdhar et al, "Detect-and-Track: Efficient Pose Estimation in Videos", arXiv:1712v2, May 2, 2018, 10 pages.
Google Developers, "Webp Compression Study", http://developers.google.com/speed/webp/docs/webp_study, retrieved on Oct. 10, 2019, 8 pages.
Gregor et al, "Draw: A Recurrent Neural Network for Image Generation", arXiv:1502v2, May 20, 2015, 10 pages.
Jaderberg et al, "Spatial Transformer Networks", Neural Information Processing Systems, Dec. 7-12, 2015, Montreal, Canada, 9 pages.
Jang et al, "Categorical Reparameterization with Gumbel-Softmax", arXiv: 1611v5, Aug. 5, 2017, 13 pages.
Kendall et al, "End-to-End Learning of Geometry and Context for Deep Stereo Regression", arXiv:1703v1, Mar. 13, 2017, 10 pages.
Lewis, "Fast Template Matching", Vision Interface, vol. 95, 1995, 4 pages.
Lindeberg, "Detecting Salient Blob-Like Image Structures and Their Scales with a Scale-Space Primal Sketch: a Method for Focus-Of-Attention", Journal of Computer Vision, vol. 11, No. 3, 1993, 56 pages.
Lindeberg, "Feature Detection with Automatic Scale Selection", Journal of Computer Vision, vol. 30, No. 2, 1998, 53 pages.
Lowe, "Object Recognition from Local Scale-Invariant Features", Conference on Computer Vision, Sep. 20-25, 1999, Corfu, Greece, 8 pages.
Matas et al, "Robust Wide-Baseline Stereo from Maximally Stable Extremal Regions", British Machine Vision Conference, Sep. 2-5, 2002, 10 pages.
Mnih et al, "Recurrent Models of Visual Attention", Conference on Neural Information Processing Systems, Dec. 8-13, 2014, Montreal, Canada, 9 pages.
Qiu et al., "Scale-Space Sift Flow", Conference on Applications of Computer Vision, Mar. 24-26, 2014, Steamboat Springs, Colorado, 8 pages.
Ren et al, "Sbnet: Sparse Blocks Network for Fast Inference", arXiv:1801v2, Jun. 7, 2018, 10 pages.
Rosten et al, "Faster and Better: a Machine Learning Approach to Corner Detection", arXiv:0810v1, Oct. 14, 2008, 35 pages.
Rublee et al, "Orb: An efficient Alternative to Sift or Surf", Conference on Computer Vision, Nov. 6-13, 2011, Barcelona, Spain, 8 pages.
Shotton et al, "Scene Coordinate Regression Forests for Camera Relocalization in RGB-D Images", Conference on Computer Vision, Jun. 25-27, 2013, Columbus, Ohio, 8 pages.
Simonyan et al, "Learning Local Feature Descriptors Using Convex Optimization", Transactions on Pattern Analysis and Machine Intelligence, 2014, 14 pages.
Simo-Serra et al, "Discriminative Learning of Deep Convolutional Feature Point Descriptors", Conference on Computer Vision, Dec. 11-18, 2015, Santiago, Chile, 9 pages.
Singh et al, "Unsupervised Discovery of Mid-Level Discriminative Patches", European Conference on Computer Vision, Oct. 7-13, 2012, Firenze, Italy, 14 pages.
Strecha et al, "LDAHash: Improved Matching with Smaller Descriptors" Transactions on Pattern Analysis and Machine Intelligence, vol. 33, 2011, 13 pages.
Tola et al, "Daisy: An Efficient Dense Descriptor Applied to Wide-Baseline Stereo", Transactions on Pattern Analysis and Machine Intelligence, vol. 32, No. 5, May 2010, pp. 815-830.
Vaswani et al, "Attention is All You Need", Conference on Neural Information Processing Systems, Dec. 4-9, 2017, Long Beach, California, 11 pages.
Wang et al, "The Global Patch Collider", Conference on Computer Vision and Pattern Recognition, Jun. 26-Jul. 1, 2016, Las Vegas, Nevada, 9 pages.
Xu et al, "Accurate Optical Flow via Direct Cost Volume Processing", Conference on Computer Vision and Pattern Recognition, Jul. 21-16, 2017, Honolulu, Hawaii, 9 pages.
Xu et al, "Show, Attend and Tell: Neural Image Caption Generation with Visual Attention", Conference on Machine Learning, Jul. 6-11, 2015, Lille, France, 10 pages.
Yang et al, "Efficient Mean-Shift Tracking via a New Similarity Measure", Conference on Computer Vision and Pattern Recognition, Jun. 20-25, 2005, San Diego, California, 8 pages.
Zagoruyko et al, "Learning to Compare Image Patches via Convolutional Neural Networks", Conference on Computer Vision and Pattern Recognition, Jun. 8-10, 2015, Boston, Massachusetts, 9 pages.
Balle et al, "End-to-End Optimization of Nonlinear Transform Codes for Perceptual Quality", arXiv:1607v2, Oct. 17, 2016, 5 pages.
Barsan et al, "Learning to Localize Using a LiDAR Intensity Map", Conference on Robot Learning, Oct. 29-31, 2018, Zurich, Switzerland, 12 pages.
Bengio et al, "Estimating or Propagating Gradients through Stochastic Neurons for Conditional Computation", arXiv:1308v1, Aug. 15, 2013, 12 pages.
Brachmann et al, "Learning Less is More—6D Camera Localization via 3D Surface Regression", arXiv:1711v2, Mar. 27, 2018, 11 pages.
Floros et al, "OpenStreetSLAM: Global Vehicle Localization using OpenStreetMaps", Conference on Robotics and Automation, May 6-10, 2013, Karlsruhe, Germany, 6 pages.

(56) References Cited

OTHER PUBLICATIONS

Javanmardi et al, "Autonomous Vehicle Self-Localization Based on Probabilistic Planar Surface Map and Multi-Channel LiDAR in Urban Area", International Association of Traffic and Safety Sciences, vol. 43, 2019, 13 pages.
Kingma et al, "Adam: A Method for Stochastic Optimization", arXiv:1412v9, Jan. 30, 2017, 15 pages.
Kummerle et al, "Autonomous Driving in a Multi-Level Parking Structure", Conference on Robotics and Automation, May 12-17, 2009, Kobe, Japan, 6 pages.
Levinson et al, "Map-Based Precision Vehicle Localization in Urban Environments", Robotics: Science and Systems, Jul. 12-16, 2017, Cambridge, Massachusetts, 8 pages.
Levinson et al, "Robust Vehicle Localization in Urban Environments using Probabilistic Maps", Conference on Robotics and Automation, May 3-8, 2010, Anchorage, Alaska, 7 pages.
Luo et al, "Efficient Deep Learning for Stereo Matching", Conference on Computer Vision and Pattern Recognition, Jun. 26-Jul. 1, 2016, Las Vegas, Nevada, 9 pages.
Ma et al, "Find Your Way by Observing the Sun and other Semantic Cues", arXiv:1606v1, Jun. 23, 2016, 12 pages.
Mentzer et al, "Conditional Probability Models for Deep Image Compression", arXiv:1801v4, Jun. 4, 2019, 19 pages.
Ort et al, "Autonomous Vehicle Navigation in Rural Environments without Detailed Prior Maps", Conference of Robotics and Automation, May 21-26, 2018, Brisbane, Australia, 8 pages.
Radwan et al, "VLocNet++: Deep Multitask Learning for Semantic Visual Localization and Odometry", Robotics and Automation Letters, Sep. 2018, 8 pages.
Revaud et al, "EpicFlow: Edge-Preserving Interpolation of Correspondences for Optical Flow", arXiv:1501v2, May 19, 2015, 11 pages.
Rippel et al, "Real-Time Adaptive Image Compression", arXiv:1705v1, May 16, 2017, 16 pages.
Sattler et al, "Are Large-Scale 3D Models Really Necessary for Accurate Visual Localization", Computer Vision Foundation, 2017, pp. 1637-1646.
Shannon, "A Mathematical Theory of Communication", Bell System Technical Journal, vol. 27, Issue 3, Jul. 1948, 55 pages.
Toderici et al, "Variable Rate Image Compression with Recurrent Neural Networks", arXiv:1511v5, Mar. 1, 2016, 12 pages.
Toderici et al, "Full Resolution Image Compression with Recurrent Neural Networks", arXiv:1608v2, Jul. 7, 2017, 9 pages.
Triebel et al, "Multi-Level Surface Maps for Outdoor Terrain Mapping and Loop Closing", Conference on Intelligent Robots and Systems, Oct. 9-15, 2006, Beijing, China, 7 pages.
Wan et al, "Robust and Precise Vehicle Localization based on Multi-Sensor Fusion in Diverse City Scenes", arXiv:1711v1, Nov. 15, 2017, 8 pages.
Weinzaepfel et al, "DeepFlow: Large Displacement Optical Flow with Deep Matching", Conference on Computer Vision, Dec. 1-8, 2013, Sydney, Australia, 8 pages.
Wolcott et al, "Visual Localization within LiDAR Maps for Automated Urban Driving", Conference on Intelligent Robots and Systems, Sep. 14-18, 2014, Chicago, Illinois, 8 pages.
Wolcott et al, "Fast LiDAR Localization using Multiresolution Gaussian Mixture Maps", May 26-30, 2015, Seattle, Washington, 8 pages.
Yoneda et al, "Lidar Scan Feature for Localization with Highly Precise 3D Map", Intelligent Vehicle Symposium, Jun. 8-11, 2014, Dearborn, Michigan, 6 pages.
Zbontar et al, "Computing the Stereo Matching Cost with a Convolution Neural Network", Conference on Computer Vision and Pattern Recognition, Jun. 8-10, 2015, Boston, Massachusetts, 8 pages.
Borji et al., "State-of-the-art in visual attention modeling." IEEE Transactions on Pattern Analysis and Machine Intelligence, 35(1), 2013, pp. 185-207.
Fu et al., "Look closer to see better: Recurrent attention convolutional neural network for fine-grained image recognition." In Proceedings of the IEEE conference on computer vision and pattern recognition, 2017, pp. 4438-4446.
He et al., "Mask r-cnn." In Proceedings of the IEEE international conference on computer vision, 2017, pp. 2961-2969.
Kim et al., "Interpretable learning for self-driving cars by visualizing causal attention." In Proceedings of the IEEE international conference on computer vision, 2017, pp. 2942-2950.
Li et al., "Hierarchical attention transfer network for cross-domain sentiment classification." In Proceedings of the AAAI Conference on Artificial Intelligence, vol. 32, No. 1. 2018.
Nguyen et al., "Attentive Systems: A Survey." Int J Comput Vis 126, 2018, pp. 86-110.
Song et al., "Mask-guided contrastive attention model for person re-identification." In Proceedings of the IEEE conference on computer vision and pattern recognition, 2018, pp. 1179-1188.
Stab et al., "Cross-topic argument mining from heterogeneous sources using attention-based neural networks." arXiv preprint arXiv:1802.05758, 2018.
Wang et al., "AutoScaler: Scale-Attention Networks for Visual Correspondence", arXiv:161 1v1, Nov. 17, 2016, 10 pages.
Wu et al., "Deep attention-based spatially recursive networks for fine-grained visual recognition." IEEE transactions on cybernetics 49.5, 2018, pp. 1791-1802.
Xiong et al., "Global supervised descent method." In Proceedings of the IEEE Conference on Computer Vision and Pattern Recognition, 2015, pp. 2664-2673.
Zhang et al., "Attention-based neural network for traffic sign detection." In 2018 24th International Conference on Pattern Recognition (ICPR), Aug. 2018, pp. 1839-1844.
Zhang et al., "Mask R-CNN with feature pyramid attention for instance segmentation." In 2018 14th IEEE International Conference on Signal Processing (ICSP), 2018, pp. 1194-1197.

* cited by examiner

BINARY FEATURE COMPRESSION FOR AUTONOMOUS DEVICES

RELATED APPLICATIONS

The present application is based on and claims benefit of U.S. Provisional Patent Application No. 62/768,816 having a filing date of Nov. 16, 2018; and U.S. Provisional Patent Application No. 62/846,248 having a filing date of May 10, 2019, which are incorporated by reference herein.

FIELD

The present disclosure relates generally to localizing objects in an environment using compressed feature representations of the environment.

BACKGROUND

Vehicles, including autonomous vehicles, can receive data that is used to determine the state of an environment through which the vehicle travels. This data can then be used to perform various operations related to the state of the vehicles with respect to the environment. As the state of the environment is dynamic, and the relationship of the vehicle to the environment can change over time, operation of a vehicle may depend on the determination of the state of this changing environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of localization and use of compressed feature representations by a device including a vehicle. The computer-implemented method can include accessing, by a computing system including one or more computing devices, source data and target data. The source data can include a source representation of an environment including a source object. The target data can include a compressed target feature representation of the environment. The compressed target feature representation can be based at least in part on compression of a target feature representation of the environment produced by one or more machine-learned feature extraction models. The computer-implemented method can include generating, by the computing system, a source feature representation based at least in part on the source representation and the one or more machine-learned feature extraction models. Furthermore, the computer-implemented method can include determining, by the computing system, a localized state of the source object with respect to the environment based at least in part on the source feature representation and the compressed target feature representation.

Another example aspect of the present disclosure is directed to a computing system including: one or more processors; one or more machine-learned feature extraction models configured to access training data including one or more representations of a training environment and generate one or more feature extracted representations of the training environment; and one or more tangible non-transitory computer-readable media storing computer-readable instructions that when executed by one or more processors cause the one or more processors to perform operations. The operations can include accessing training data including a source representation of a training environment and a target representation of the training environment. The source representation can be associated with a ground-truth state of a source object in the training environment. The operations can also include generating a source feature representation and a target feature representation based at least in part on the one or more machine-learned feature extraction models accessing the source representation and the target representation respectively. The operations can include generating a compressed target feature representation of the target feature representation based at least in part on one or more machine-learned compression models. The operations can include determining a localized state of the source object within the target representation of the environment based at least in part on the source feature representation and the compressed target feature representation. The operations can include determining a loss based at least in part on one or more comparisons of the localized state of the source object to the ground-truth state of the source object. Furthermore, the operations can include adjusting one or more parameters of the one or more machine-learned compression models based at least in part on the loss.

Another example aspect of the present disclosure is directed to a computing device including: one or more processors; a memory including one or more tangible non-transitory computer-readable media, the memory storing computer-readable instructions that when executed by the one or more processors cause the one or more processors to perform operations. The operations can include accessing source data including a representation of an environment including a source object. The operations can include generating a source feature representation of the source data based at least in part on one or more machine-learned feature extraction models. The operations can also include accessing target data including a compressed target feature representation of the environment. The compressed target feature representation can be generated based at least in part on compression of a target feature representation of the environment produced by the one or more machine-learned feature extraction models. Furthermore, the operations can include determining a localized state of the source object with respect to the environment based at least in part on the source feature representation and the compressed target feature representation.

Another example aspect of the present disclosure is directed to a computer-implemented method including accessing, by a computing system including one or more computing devices, training data including a source feature representation of a training environment and a target feature representation of the training environment. The computer-implemented method can also include generating, by the computing system, an encoded target feature representation based at least in part on the target feature representation and a machine-learned encoding model. The computer-implemented method can also include generating, by the computing system, a binarized target feature representation based at least in part on the encoded target feature representation and one or more lossless binary encoding operations. The computer-implemented method can also include generating, by the computing system, a reconstructed target feature representation based at least in part on the binarized target feature representation and a machine-learned decoding model. The computer-implemented method can also include determining, by the computing system, a matching score based at least in part on application of a matching function to the source feature representation and the reconstructed target feature representation. The computer-implemented method can also include determining, by the computing system, a loss associated with a matching score for the source feature representation and the reconstructed target feature representation relative to a ground-truth matching score. Furthermore, the computer-implemented method can include adjusting, by the computing system, one or more parameters of at least one of the machine-learned encoding model or the machine-learned decoding model based at least in part on the loss.

Another example aspect of the present disclosure is directed to a computing system including: one or more processors; a machine-learned encoding model configured to access a target feature representation and generate an encoded target feature representation based at least in part on the target feature representation; and one or more tangible non-transitory computer-readable media storing computer-readable instructions that when executed by one or more processors cause the one or more processors to perform operations. The operations can include accessing target data including a target feature representation of an environment. The operations can include generating an encoded target feature representation based at least in part on the target feature representation and the machine-learned encoding model. The operations can include generating a binarized target feature representation based at least in part on performance of one or more binary encoding operations on the encoded target feature representation. Furthermore, the operations can include generating a compressed target feature representation of the encoded target feature representation based at least in part on performance of one or more compression operations on the binarized target feature representation.

Another example aspect of the present disclosure is directed to a computing device including: one or more processors; a memory including one or more computer-readable media, the memory storing computer-readable instructions that when executed by the one or more processors cause the one or more processors to perform operations. The operations can include accessing target data including a target feature representation of an environment. The operations can include generating an encoded target feature representation of the target feature representation based at least in part on a machine-learned encoding model. The encoded target feature representation can have a smaller data size than the target feature representation. The operations can include generating a binarized target feature representation of the encoded target feature representation. Furthermore, the operations can include generating a compressed target representation of the encoded representation based at least in part on performance of one or more compression operations on the binarized target feature representation.

Another example aspect of the present disclosure is directed to a computer-implemented method including accessing, by a computing system including one or more computing devices, training data including a target feature representation and a source feature representation. The computer-implemented method can include generating, by the computing system, an attention feature representation based at least in part on the target feature representation and a machine-learned attention model. The computer-implemented method can include generating, by the computing system, an attended target feature representation based at least in part on masking the target feature representation with the attention feature representation. The computer-implemented method can include determining, by the computing system, a matching score based at least in part on application of a matching function to the source feature representation and the attended target feature representation. The computer-implemented method can also include determining, by the computing system, a loss associated with the matching score and a ground-truth matching score for the source feature representation and the target feature representation. Furthermore, the computer-implemented method can include adjusting, by the computing system, one or more parameters of the machine-learned attention model based at least in part on the loss.

Another example aspect of the present disclosure is directed to a computing system including: one or more processors; a machine-learned attention model configured to generate an attention feature representation of a target feature representation of an environment based at least in part on evaluation of a loss associated with a matching score for a source feature representation and an attended feature representation relative to a ground-truth matching score for a source feature representation and the target feature representation; and one or more tangible non-transitory computer-readable media storing computer-readable instructions that when executed by one or more processors cause the one or more processors to perform operations. The operations can include accessing target data including the target feature representation of the environment. The operations can include generating an attention feature representation based at least in part on the target feature representation and the machine-learned attention model. Furthermore, the operations can include generating an attended target feature representation based at least in part on masking the target feature representation with the attention feature representation.

Another example aspect of the present disclosure is directed to a vehicle including: one or more processors; a memory including one or more computer-readable media, the memory storing computer-readable instructions that when executed by the one or more processors cause the one or more processors to perform operations. The operations can include accessing target data including a target feature representation of an environment. The operations can include generating, by the computing system, an attention feature representation of the target feature representation based at least in part on a machine-learned attention model that is trained by evaluating a loss associated with a matching score for the attention feature representation and a source representation compared to a ground-truth matching score for the target feature representation and the source feature representation. Furthermore, the operations can include generating an attended feature representation based at least in part on masking the target feature representation with the attention feature representation.

Other example aspects of the present disclosure are directed to other systems, methods, vehicles, apparatuses, tangible non-transitory computer-readable media, and devices for localization and use of compressed feature representations by a device.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
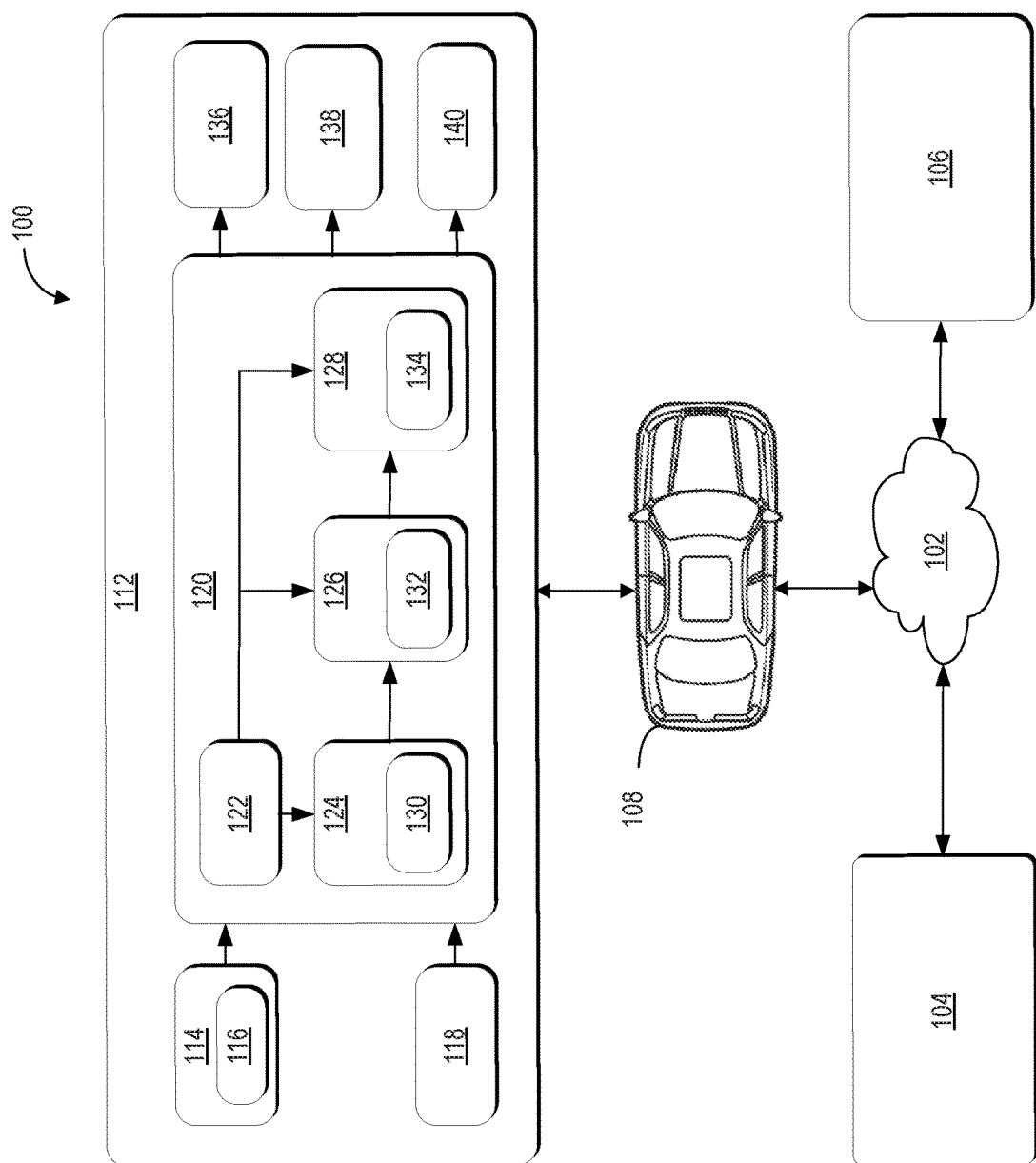
FIG. 1 depicts a diagram of an example system according to example embodiments of the present disclosure.

Example aspects of the present disclosure are directed to generating feature representations based on the use of machine-learned models that have been trained using various types of representations of an environment. More particularly, aspects of the present disclosure can include a computing system that accesses source data and target data. The source data can include a source representation of an environment including a source object, and the target data can include a compressed target feature representation of the same environment as the source representation. By way of example, the source representation can be based on light detection and ranging (LiDAR) data and the compressed target feature representation can be based on the compression of a target feature representation of the environment using some combination of a machine-learned feature extraction model (e.g., a machine-learned model trained to generate a feature representation by extracting features from a representation), a machine-learned attention model (e.g., a machine-learned model trained to generate a feature representation by focusing attention on particular features of a representation), and lossless compression operations (e.g., Huffman coding and/or run-length encoding) that can reduce the data size of a representation without losing information.

Further, a source feature representation of the source representation can be generated by using at least one of the machine-learned feature extraction models. The computing system can then determine a localized state of the source object with respect to the environment based on operations (e.g., comparing the source feature representation to the target feature representation) performed on the source feature representation and the compressed target feature representation. A localized state of an object (e.g., the source object) can include the object's position, location, orientation, heading, velocity, and/or acceleration. Accordingly, aspects of the present disclosure can be used for a variety of purposes including localization of objects with respect to a representation of an environment (e.g., localizing an autonomous vehicle with respect to a map stored on the autonomous vehicle), mapping an environment, and generating compressed feature representations that can occupy less space on a storage device.

In some embodiments, the machine-learned feature extraction models can be trained based on evaluation of a loss function associated with training data. In some examples, the loss function can be a total loss function that is associated with one or more compression loss functions or one or more matching loss functions. In particular, a computing system can access training data that includes a source representation of a training environment and a target representation of the training environment. The source representation can be associated with a ground-truth state of a source object in the training environment. A ground-truth state of an object (e.g., the source object) can include the object's position, location, orientation, heading, velocity, and/or acceleration. The computing system can then use a combination of machine-learned feature extraction models and the application of compression operations to generate a compressed target feature representation and a source feature representation of the source representation. The computing system can determine a loss based on comparisons of the localized state of the source object to the ground-truth state of the source object. The computing system can then determine a localized state of the source object within the target representation of the environment based on the source feature representation and the compressed target feature representation.

After each of the iterations of performing operations on the training data and determining a loss (e.g., a loss based at least in part on evaluation of a loss function associated with the accuracy of the localized state with respect to the ground-truth state), the computing system can adjust parameters of the machine-learned feature extraction models based on the loss. For example, parameters can be weighted in proportion to their contribution to decreasing the loss. As such, the computing system can generate more effective machine-learned models that can be used to generate efficiently compressed and highly accurate representations of an environment.

Furthermore, in some embodiments, the output of the feature extraction models can be used to compress target feature representations, thereby reducing the amount of storage capacity needed to store larger target feature representations. For example, a compressed target feature representation of a city or nation can be stored on the local storage device of an autonomous vehicle. As such, the disclosed technology can more accurately and efficiently localize an object by determining the localized state of the object in an environment using machine-learned models and a compressed feature representation of the environment. By enabling more effective estimation of an object's location, the disclosed technology allows for various improvements including a number of safety improvements resulting from more accurately localized maps, less wear and tear on vehicle components due to fewer course corrections, and more efficient use of storage space, and more effective use of computational resources resulting from the use of highly compressed yet accurate feature representations of an environment.

A system (e.g., a computing system) according to the disclosed technology can include one or more computing devices (e.g., one or more computing devices with one or more processors and one or more memory storage devices) that can perform one or more operations including controlling a variety of other systems and/or components (e.g., machine-learning systems, vehicle systems, augmented reality systems, and/or robotic systems). Further, the computing system can process, generate, access (e.g., send and/or receive) one or more signals, information, and/or data, including signals, information, and/or data exchanged with various locally accessible computing systems, vehicle systems, vehicles, or remote computing systems. Furthermore, the computing systems and/or computing devices described herein can access data and/or information by obtaining and/or retrieving the data and/or information (e.g., actively accessing data) from another computing system and/or computing device; and/or receiving, being sent, and/or being provided with data and/or information (e.g., passively accessing data) from another computing system and/or computing device. Further, the computing systems and/or computing devices described herein can access data and/or information by sending and/or receiving one or more signals encoded with data and/or information.

For example, the computing system (e.g., a vehicle computing system, a robotic computing system, or an augmented reality system) can send and/or receive one or more signals (e.g., electronic signals) and/or data to or from one or more vehicle systems including one or more sensor systems (e.g., systems that generate one or more outputs based on detection of changes in the state of the physical environment external to the vehicle) including LiDAR devices, cameras, microphones, radar devices, thermal sensors, and/or sonar devices; communication systems (e.g., wired and/or wireless communication systems that can exchange signals and/or data with other devices); perception systems including one or more systems used to determine the state of the environment surrounding a vehicle; motion planning systems including one or more systems used to determine a travel path for a vehicle; navigation systems (e.g., devices that can receive signals from GPS, GLONASS, or other systems used to determine a vehicle's geographical location); notification systems (e.g., devices used to provide notifications to other vehicles and/or pedestrians, including display devices, status indicator lights, and/or audio output devices); braking systems used to slow down the vehicle (e.g., brakes of the vehicle including mechanical and/or electric brakes); propulsion systems used to provide power for the vehicle to move from one location to another (e.g., motors and/or engines including electric engines and/or internal combustion engines); and/or steering systems used to change the path, course, and/or direction of travel of the vehicle.

By way of further example, the computing system can send and/or receive one or more signals and/or data to or from one or more robotic systems and/or robotic components associated with a robotic device. For example, the computing system can send one or more control signals that are used to control the movements of a robotic device (e.g., a robotic arm in a manufacturing environment) that interacts with one or more objects based at least in part on detection of the one or more objects using one or more sensors and manipulation of the objects using the robotic device. Accordingly, more effective localization of the robotic device can result in more accurate and precise interaction with one or more objects in the environment. Further, more efficient feature compression allows for the storage of greater amounts of information on the robotic device with less usage of storage resources.

By way of further example, the computing system can send and/or receive one or more signals and/or data to or from one or more augmented reality systems and/or augmented reality components (e.g., a head-mounted augmented reality display component). Further, the one or more signals and/or data sent to the augmented reality component can be used to generate one or more images that are localized with respect to a physical environment surrounding the augmented reality system, so that the one or more images will appear to be part of the physical environment when displayed on a display device of the augmented reality system. In this way, the disclosed technology can generate augmented reality images that are accurately localized and can also leverage the advantages of efficiently compressing images including being able to store more of the compressed images locally on the augmented reality system and/or reducing the use of network bandwidth when the compressed images are stored remotely and transmitted to the augmented reality system.

Furthermore, the computing system can access one or more machine-learned models that have been at least partly generated and/or trained using training data including a plurality of training objects (e.g., various vehicles including automobiles, motorcycles, buses, bicycles, scooters, and/or mopeds) that have a plurality of features (e.g., physical dimensions and/or shapes) and which are associated with a respective plurality of classified object labels. In some embodiments, the plurality of features of the plurality of training objects can be extracted from training data that includes a plurality of images associated with one or more sensor outputs from one or more sensors that detect the plurality of training objects. When the one or more machine-learned models have been trained, the one or more machine-learned models can associate some of the plurality of features with one or more of the plurality of classified object labels that are used to classify and/or categorize objects including objects that are not included in the plurality of training objects. In some embodiments, as part of the training process, differences in correct classification output between a machine-learned model (that outputs the one or more classified object labels) and a set of classified object labels associated with a plurality of training objects that have previously been correctly identified (e.g., ground-truth labels), can be processed using an error loss function that can determine a set of probability distributions based on repeated classification of the same plurality of training objects. As such, the accuracy (e.g., the proportion of correctly identifies objects) of the machine-learned model can be improved over time.

The computing system can access the machine-learned model in various ways including accessing data and/or information associated with one or more machine-learned models stored on a remote computing device (e.g., a computing device that is accessed via a wired and/or wireless network connection); and/or accessing one or more machine-learned models that are stored locally (e.g., in one or more storage devices of the vehicle). Furthermore, the plurality of features can be associated with one or more values that can be analyzed individually and/or in various combinations. The analysis of the one or more values associated with the plurality of classified features can include determining a mean, mode, median, variance, standard deviation, maximum, minimum, and/or frequency of the one or more values associated with the plurality of features. Further, analysis of the one or more values associated with the plurality of features can include comparisons of the differences or similarities between the one or more values.

Aspects and advantages of embodiments of the present disclosure will be set forth in part in the following description, or may be learned from the description, or may be learned through practice of the embodiments.

In some embodiments, the plurality of features classified by the one or more machine-learned models can include a range of physical dimensions associated with the plurality of training objects (e.g., a training object's length, width, and/or height), a range of colors associated with the plurality of training objects (e.g., RGB values associated with the color of an object), and/or a range of shapes associated with the plurality of training objects. Further, the plurality of features classified by the one or more machine-learned models can be based at least in part on one or more sensor outputs from one or more sensors that have captured the plurality of training objects (e.g., the actual objects used to train the machine-learned model) from various angles and/or distances in different environments (e.g., urban areas, suburban areas, rural areas, heavy traffic, and/or light traffic) and/or environmental conditions (e.g., bright daylight, rainy days, darkness, snow covered roads, inside parking structures, in tunnels, and/or under streetlights). The one or more classified object labels can then be used to classify and/or categorize the one or more training objects, including one or more vehicles, buildings, roads, road markings, sidewalks, bridges, overpasses, waterways, pedestrians, trees, foliage, and/or natural geographic formations.

The computing system can access source data and/or target data. In some examples, the source data and/or the target data can be based at least in part on, or can include, one or more sensor outputs from one or more sensors. One or more portions of the source data and/or the target data can be accessed concurrently and/or at different times. The source data can include a source representation of an environment including a source object. For example, the source data can include information associated with one or more images or maps of an environment that includes a source object. The environment can include any area or space and can include any combination of a natural environment, a human-made environment (e.g., a city or highway), a simulated environment (e.g., an environment generated by one or more computing systems), and/or any type of geographic environment.

In some embodiments, the source object can be associated with a point in the environment that indicates the position of the source object. For example, the point in the environment can be associated with the location of the center of the source object.

The target data can include a compressed target feature representation of the environment (e.g., the same environment represented by the source representation in the source data).

In some embodiments the source data and/or the target data can be based at least in part on, or can include one or more aerial images of the environment, one or more satellite images of the environment, and/or one or more maps of the environment. Furthermore, the target feature representation of the environment and/or the source feature representation of the environment can include at least one of: one or more aerial images of the environment, one or more satellite images of the environment, and/or one or more maps of the environment.

In some embodiments, the source data and the target data can be based on, or include, different types of information. For example, when the source data is based on one or more sensor outputs from a LiDAR device that detects an environment, the target data can be based on one or more maps of the environment.

In some embodiments, the source representation and/or the target representation can include information associated with one or more images of the environment. The one or more images can include various raster (e.g., bitmap), vector, and/or voxel image formats. Further, the one or more images can include a two-dimensional representation of an environment (e.g., a two-dimensional overhead aerial map of an environment) or a three-dimensional representation of an environment (e.g., a three-dimensional LiDAR point cloud).

In some embodiments, the source object can include a sensor system, a vehicle, a robotic system, and/or an augmented reality system. Furthermore, a representation of the source object can be included as part of the source representation (e.g., a portion of the source representation includes a representation of the source object) or as information associated with the source image (e.g., information indicating the position of the source object within the source representation). For example, the source representation of the environment can include an image of the environment. The image of the environment can depict the source object in the environment (e.g., an image of an environment can include a depiction of a vehicle as part of the depiction).

Furthermore, the compressed target feature representation can be based at least in part on compression of a target feature representation of the environment generated and/or produced by one or more machine-learned feature extraction models. For example, the compressed target feature representation can be based at least in part on the input of a target representation that is provided as an input to the one or more machine-learned feature extraction models, that have been trained to receive the input, perform various operations on the input, and generate a target feature representation as an output. The target feature representation can represent the same environment as the target representation, have the same spatial resolution as the target feature representation, and have a lower spectral resolution than the target feature representation. In some embodiments, one or more machine-learned compression models can be trained to receive the target feature representation as input and perform one or more compression operations (e.g., one or more lossless compression operations) on the target feature representation, resulting in the compressed target feature representation which can be lower precision and/or lower resolution than the target feature representation.

The computing system can generate a source feature representation based at least in part on the source representation and one or more machine-learned feature extraction models. For example, the source representation (e.g., source data including one or more images of an environment including the source object) can be provided as an input to the one or more machine-learned feature extraction models, that have been trained to receive the input and generate an output including the source feature representation. The source feature representation can have the same spatial resolution as the source representation and a lower spectral resolution than the source representation in some examples.

The one or more machine-learned feature extraction models can include a plurality of layers including convolutional layers with varying stride. Each of the plurality of layers of the one or more machine-learned feature extraction models can: receive an input (e.g., receive the source data, which can include one or more images as input for the first layer and one or more feature maps as input for the remaining layers subsequent to the first layer); perform some operations on the input (e.g., evaluating the input based at least in part on one or more parameters); and generate an output based on the operations performed on the input (e.g., generate a source feature representation based on the input of a source representation). For intermediate layers, the output can include a feature map that can serve as an input for another layer (e.g., an immediately subsequent layer). For the last layer, the output can include some representation (e.g., the source feature representation) based at least in part on the feature map generated by the preceding layers.

In some embodiments, the output generated by the one or more machine-learned feature extraction models can include an image with the same spatial resolution (e.g., the same number of pixels) as the input (e.g., an image included in the source data). Furthermore, in some embodiments, the output generated by the one or more machine-learned feature extraction models can include an image with a lower spectral resolution (e.g., the output can include a two-color image that was generated based at least in part on the input of an image that has millions of colors) than the input (e.g., an image included in the source data).

In some embodiments, the one or more machine-learned feature extraction models can include a convolutional neural network, a recurrent neural network, or a recursive neural network. Furthermore, the one or more machine-learned feature extraction models can be configured and/or trained to perform one or more operations including: encoding an input of a representation (e.g., the target feature representation) to generate an output including a compressed representation (e.g., the compressed target feature representation); and decoding an input of a representation (e.g., the compressed target feature representation) to generate an output including a reconstructed representation (e.g., a reconstructed target feature representation).

In some implementations, the computing system can determine a localized state of the source object with respect to the environment based at least in part on the source feature representation and the compressed target feature representation. The localized state of the source object can include a velocity of the source object; an acceleration of the source object; an orientation, heading, or bearing of the source object; a position or location of the source object relative to some point of reference (e.g., the source object's position is some angle and distance relative to the point of reference); and/or the position or location of the source object as some combination of latitude, longitude, altitude, and/or trajectory. In some embodiments, the localized state of the source object is an estimate of the state of the object. By way of example, to determine the localized state of the source object, the computing system can perform one or more operations including one or more encoding operations, one or more decoding operations, one or more transformations, and/or one or more comparisons between the source feature representation and the compressed target feature representation. Furthermore, determining a localized state of the source object with respect to the environment can be used for various purposes including localization. For example, when the source object is representative of a vehicle, the localized state of the source object can be used to determine the location of the vehicle with respect to a map of the environment in which the vehicle is located.

In some embodiments, the computing system can determine the localized state of the source object with respect to the environment by performing one or more operations including generating a reconstructed target feature representation based at least in part on the compressed target feature representation and a machine-learned reconstruction model. In some embodiments, the reconstructed target feature representation can be a reconstruction of the target feature representation. For example, the computing system can generate the reconstructed target feature representation by receiving the compressed target feature representation as an input to the machine-learned reconstruction model, that has been configured and/or trained to reconstruct (e.g., decompress) the compressed target feature representation so that a higher precision, higher resolution reconstructed target feature representation is generated as an output.

Further, the computing system can determine the localized state of the source object based at least in part on one or more comparisons of the source feature representation to the reconstructed target feature representation. For example, the computing system can compare one or more aspects of the source feature representation to the reconstructed target feature representation to determine one or more matches between the source feature representation and the reconstructed target feature representation. Based at least in part on one or more matches between the source feature representation and the reconstructed target feature representation, the computing system can determine the localized state of the source object. Further, in some embodiments, the computing system can determine one or more matching scores (e.g., one or more position scores based on the extent to which the position of the source feature representation and the reconstructed target feature representation match) based at least in part on the extent to which the source feature representation and the reconstructed target feature representation match. The computing system can then determine the localized state of the source object based at least in part on the localized state of the source object that is associated with the highest matching score (e.g., a higher score is associated with a greater accuracy of the localized state).

In some embodiments, the computing system can determine the localized state of the source object with respect to the environment by performing one or more operations including determining one or more correlations between the target feature representation and the source feature representation based at least in part on a probabilistic inference model configured to encode agreement between the source feature representation and the reconstructed target feature representation indexed at the position of the source object. For example, the computing system can use a Bayesian inference model that uses prior beliefs about the position of the object (e.g., the previous position of the source object and previous time intervals) and a conditional probability distribution of the localized state of the source object to determine the localized state of the source object.

In some embodiments, the Bayesian inference model can be expressed as: $Bel_t(x) = Bel_{t|t-1}(x; \chi) \cdot P_{GPS}(\mathcal{G}_t|x) \cdot P_{LIDAR}(\mathcal{I}_t|x; w)$. $Bel_t(x)$ can represent a posterior distribution of the source object pose at time t given all the sensor observations until time step t. $x = \{t_x, t_y, \theta\}$ can represent a three-degrees of freedom pose for the source object. $P_{GPS}(G_t|x)$ can represent a set of GPS observations under a coordinate system (e.g., the target representation of the environment. $P_{LIDAR}(I_t|x; w)$ can represent a set of LiDAR observations in which $I_t$ can represent a LiDAR sweep (e.g., a LiDAR sweep associated with the source representation).

In some embodiments, the compressed target feature representation is based at least in part on an encoding of the target feature representation using one or more lossless compression operations. For example, the compressed target feature representation can be based at least in part on one or more machine-learned compression models and/or one or more compression operations performed on the target feature representation that reduce the precision and/or the data size of the target feature representation. By way of further example, the encoding of the target feature representation can be based at least in part on the use of the target feature representation as an input to a machine-learned encoding model that is configured and/or trained to perform one or more operations including generating the compressed target feature representation as an output that is based at least in part on the input including the target feature representation.

Further, the computing system can generate a decoded target feature representation of the compressed target feature representation based at least in part on the one or more machine-learned compression models and/or one or more lossless compression operations. The one or more machine-learned compression models and/or the one or more compression operations can use one or more lossless binary encoding operations (e.g., lossless binary encoding operations in which no information is lost when the decoded target feature representation is generated based on the compressed target feature representation).

Furthermore, the computing system can generate the target feature representation based at least in part on the decoded target feature representation and the machine-learned reconstruction model. For example, the computing system can use the decoded target feature representation as an input to the machine-learned reconstruction model, which can then generate output including the reconstructed target feature representation.

In some embodiments, the computing system can determine the localized state of the source object with respect to the environment by performing one or more operations including rotating the source feature representation to a plurality of candidate angles. For example, the computing system can perform one or more geometric transformations of the source feature representation including rotating the source feature representation to the plurality of candidate angles (e.g., rotating the source feature representation by one degree in a clockwise direction, three hundred and sixty times).

The computing system can determine, at each of the plurality of candidate angles, whether the source feature representation matches the compressed target feature representation. For example, the computing system can rotate the source feature representation to a plurality of candidate angles. The computing system can then determine at each candidate angle when the localized state (e.g., the heading) of the source object in the target feature representation matches the localized state of the source object within the source feature representation.

In some embodiments, the compressed target feature representation of the environment is based at least in part on an attended feature representation of the target feature representation generated by a machine-learned attention model configured and/or trained to mask one or more portions of the target feature representation. For example, a machine-learned attention model can generate the compressed target feature representation based at least in part on an attended feature representation that is generated based at least in part on the input of the target feature representation into the machine-learned attention model. The machine-learned attention model can be trained to learn to mask one or more features of a representation (e.g., the target feature representation) based at least in part on the attention that is focused on those features. For example, in the context of localizing a vehicle on the road, the machine-learned attention model can be trained to focus on features that are more useful to matching including road boundaries, curbs, and/or lane markings.

The computing system (e.g., a vehicle computing system, a robotic system, and/or an augmented reality system) can access training data. The training data can include a source representation of a training environment and a target representation of the training environment. In some embodiments the source representation and/or the target representation of the training data can be based at least in part on, or can include, one or more sensor outputs from one or more sensors. The source representation can be associated with a ground-truth state of a source object in the training environment (e.g., the actual, completely accurate position, location, orientation, velocity, acceleration, or heading of the source object in the training environment). In some embodiments, the ground-truth localized state of the source object can include an annotated position that is expressed in a human or computer-readable format (e.g., a ground-truth position associated with a latitude, longitude, and/or altitude). Different portions of the training data can be accessed concurrently or at different times (e.g., a portion of the training data including the source representation can be accessed at a different time than the portion of the training data including the target representation).

In some embodiments, the source representation and the target representation can be based on, or include, different types of information which can include different types of representations of the environment. For example, when the source representation is based on one or more sensor outputs from a camera device that detects an environment, the target representation can be based on one or more overhead satellite images of the environment.

The computing system can generate a source feature representation and a target feature representation based at least in part on the one or more machine-learned feature extraction models accessing the source representation and the target representation respectively. For example, the source representation (e.g., training data including one or more images of the environment including the source object at the ground-truth state within the environment) and the target representation can be provided as inputs to the one or more machine-learned feature extraction models, which have been trained to receive the input and generate a respective output including the source feature representation and the target feature representation.

In some embodiments, the one or more machine-learned feature extraction models that generate the source feature representation and the target feature representation are the same (e.g., a single machine-learned feature extraction model generates the source feature representation and the target feature representation). In some embodiments, the one or more machine-learned feature extraction models are different from one another (e.g., different machine-learned feature extraction models generate the source feature representation and the target feature representation). For example, the one or more machine-learned feature extraction models can include a first machine-learned extraction model that is configured and/or trained to generate the source feature representation and a second machine-learned model that is configured and/or trained to generate the target feature representation.

The computing system can generate a compressed target feature representation of the target feature representation based at least in part on one or more machine-learned compression models and/or one or more compression operations. For example, the compressed target feature representation can be generated using one or more compression operations and/or one or more machine-learned compression models that reduce the precision and/or the data size of the target feature representation.

The computing system can determine a localized state of the source object within the compressed target feature representation of the environment based at least in part on the source feature representation and the compressed target feature representation. For example, the localized state of the source object within the compressed target feature representation of the environment can include a position of the source object relative to some point of reference. Additionally or alternatively, the position of the source object can be expressed as a latitude, longitude, altitude, and/or trajectory when the compressed target feature representation includes a map. For example, the computing system can perform one or more operations including one or more transformations and/or one or more comparisons between the source feature representation and the compressed target feature representation to determine a localized state of the source object within the environment. Further, determining a localized state of the source object with respect to the environment can be used for various purposes including mapping and/or localization. For example, when the source object is a vehicle, the localized state of the source object can be used to determine the location of the vehicle in an environment that is being mapped.

The computing system can determine a loss based at least in part on evaluation of one or more loss functions (e.g., a loss function that includes one or more variables associated with one or more features) and/or one or more comparisons of the localized state of the source object to the ground-truth state of the source object. In some embodiments, minimization of the loss is positively correlated with a more accurate localized state of the source object with respect to the ground-truth state of the source object.

The loss can be based at least in part on one or more evaluations of one or more loss functions that include variables associated with various aspects of the training data. For example, aspects of the source feature representation and the compressed target feature representation can be provided as inputs to the one or more loss functions associated with the loss, which can be iteratively evaluated to determine a minimum loss value and/or a loss value that is lower than some predetermined minimization threshold value.

Further, in some embodiments the loss can be determined based at least in part on the evaluation of one or more loss functions that are different, and which can in some embodiments have different weighting contributions to the loss. The loss function can be used to maximize the accuracy of the localized state source object with respect to the ground-truth state of the source object (e.g., the accuracy of the localized state is positively correlated with its proximity to the ground-truth state).

In some embodiments, the loss can be based at least in part on the loss function, $\ell = \ell_{LOC}(y, y_{GT}) + \lambda_1 \ell_{MDL}(p) + \lambda_2 \ell_{SPARSE}(p)$. The loss can be represented by $\ell$; the position can be represented by $\ell_{LOC}(y, y_{GT})$; the matching loss can be represented by $\lambda_1 \ell_{MDL}(p)$; the sparse loss can be represented by $\lambda_2 \ell_{SPARSE}(p)$; p can represent a representation (e.g., a target feature representation or a source feature representation); y can represent the final softmax-normalized matching score; and $y_{GT}$ can represent the one-hot representation of the ground-truth position.

The computing system can adjust one or more parameters of the one or more machine-learned feature extraction models based at least in part on the loss. The one or more parameters that can be adjusted (e.g., weighted differently) based at least in part on the contributions that each of the one or more parameters make in terms of minimizing the loss. For example, the one or more parameters of the one or more machine-learned feature extraction models that do not change the loss may be kept the same the one or more parameters that decrease the loss can be weighted more heavily (e.g., adjusted to increase their contribution to the loss), and the one or more parameters that increase the loss can have their weighting reduced (e.g., adjusted to reduce their contribution to the loss). Accordingly, adjustment of the one or more parameters of the one or more machine-learned feature extraction models over a plurality of iterations can result in a lower loss which can correspond to a more accurate localized state of the source object relative to the ground-truth state of the source object.

In some embodiments, generating the compressed target feature representation can include generating an encoded target feature representation of the target feature representation based at least in part on a machine-learned encoding model. For example, the target feature representation can be provided as an input to a machine-learned encoding model that is configured and/or trained to perform one or more operations including generating the encoded target feature representation based at least in part on the input.

Further, the computing system can generate the compressed target feature representation based at least in part on use of one or more lossless binary encoding operations (e.g., binarization) on the encoded target representation. For example, the computing system can perform one or more lossless encoding operations on the encoded target representation (e.g., the output of the machine-learned coding model) that read the format of the encoded target representation and change the format of the encoded target representation into a binary format without losing any of the information in the encoded target representation. Further, the one or more lossless encoding operations can include lossless operations that can compress the encoded target representation (e.g., Huffman encoding and/or run-length-encoding).

By way of further example, the one or more lossless binary encoding operations can be binarized in part using the following group softmax function:

$$p_j = \frac{\exp(f_j)}{\sum_{k \in S_j} \exp(f_k)}, b_j = \begin{cases} 1 & \text{if } p_j \geq 0.5 \\ 0 & \text{else} \end{cases}.$$

In the preceding group softmax function, softmax $p_j$ can represent the probability distribution for each pixel of the encoded target representation (e.g., an image with a plurality of pixels) and $b_j$ can represent the binarized output for each pixel of the encoded target representation (e.g., the pixel value is one when $p_j$ is greater than or equal to 0.5 and zero otherwise).

In some embodiments, generating the compressed target feature representation can be based at least in part on generating an attention feature representation based at least in part on the target feature representation and a machine-learned attention model. For example, a machine-learned attention model can receive an input including the target feature representation of an environment and generate an output including an attention feature representation. The attention feature representation can be used to mask one or more features of a representation based at least in part on the attention that is focused on those features. For example, in the context of generating a map, the machine-learned attention model can be trained to create a mask (the attention feature representation) that focuses attention on features that are useful for mapping applications including building features, waterway features, highway features, and/or road features.

Further, the computing system can generate an attended target feature representation based at least in part on masking the target feature representation with the attention feature representation. For example, the computing system can perform one or more operations to use the attention feature representation to mask one or more features of the target feature representation. By way of further example, the attention feature representation can be used to increase the sparsity of a target feature representation (e.g., in a binary representation in which features are associated with one's, increasing the sparsity can include increasing the portion of zeroes so that the features are more prominent).

In some embodiments, the compressed target feature representation can be based at least in part on the attended target feature representation. For example, the compressed target feature representation can be the same as the attended target feature representation or the compressed target feature representation can include one or more aspects of the attended target feature representation.

In some embodiments, determining the localized state of the source object can include determining one or more correlations between the source feature representation and the attended feature representation. For example, in some embodiments, the computing system can perform one or more operations including using a correlation operator to determine the one or more correlations of the source feature representation with respect to the attended feature representation.

In some embodiments, determining the localized state of the source object can include generating a decompressed target feature representation based at least in part on one or more lossless binary decoding operations. For example, the computing system can generate a decompressed target feature representation based at least in part on one or more lossless binary decoding operations performed on the compressed target feature representation. The one or more lossless binary decoding operations can include reconstructing the compressed target feature representation to the same state (e.g., the state of the target feature representation) it was in before being compressed.

Further, the computing system can generate a reconstructed target feature representation based at least in part on the decompressed target feature representation and a machine-learned decoding model. For example, the computing system can generate the reconstructed target feature representation by receiving the decompressed target feature representation as an input to the machine-learned decoding model, that has been configured and/or trained to decode the decompressed target feature representation and generate the reconstructed target feature representation as an output.

Furthermore, the computing system can determine the localized state of the source object within the target representation of the environment based at least in part on one or more comparisons of the source feature representation to the reconstructed target feature representation. For example, the computing system can compare one or more aspects of the source feature representation to the reconstructed target feature representation to determine one or more matches and/or one or more similarities between the source feature representation and the reconstructed target feature representation. Based at least in part on one or more comparisons between the source feature representation and the reconstructed target feature representation, the computing system can determine the localized state of the source object.

In some embodiments, the computing system can adjust the one or more parameters of at least one of the machine-learned encoding model and the machine-learned decoding model based at least in part on the loss. The machine-learned encoding model and/or the machine-learned decoding model can include one or more parameters that can be adjusted based at least in part on the contributions that each of the one or more parameters make in terms of minimizing the loss. For example, the one or more parameters of the machine-learned encoding model that do not change (e.g., have an effect on) the loss may be kept the same (e.g., not adjusted), the one or more parameters that decrease the loss can be weighted more heavily, and the one or more parameters that increase the loss can have their weighting reduced. Accordingly, adjustment of the one or more parameters of the machine-learned encoding model over a plurality of iterations can result in a lower loss that can correspond to a more accurate localized state of the source object relative to the ground-truth state of the source object.

In some embodiments, adjusting the one or more parameters of at least one of the machine-learned encoding mode and the machine-learned decoding model can include backpropagating the loss through the machine-learned decoding model. For example, the computing system can determine the gradient associated with the loss (e.g., a gradient associated with the loss and the weighting of each parameter respectively) based at least in part on one or more differences between the actual output and the expected output (e.g., a ground-truth output) of the machine-learned encoding model. The gradient of the loss function can be used in the determination of the weighting of the one or more parameters of the machine-learned encoding model by determining the minimum point along the gradient. Furthermore, in some embodiments, backpropagating the loss through the machine-learned decoding model can include straight through estimation that bypasses the one or more encoding operations, the one or more machine-learned compression models and/or the one or more compression operations. For example, the computing system can substitute the use of the one or more compression operations with the use of an identity function that serves as an approximation of the gradient.

Further, the computing system can backpropagate the loss through the machine-learned encoding model. In some embodiments, straight through estimation that bypasses the one or more lossless binary encoding operations, the one or more machine-learned compression models, and/or the one or more compression operations can be used. For example, the computing system can substitute the use of the one or more lossless binary encoding operations and the one or more compression operations with the use of an identity function.

In some embodiments, determining the loss can include determining the loss based at least in part on an entropy associated with the compressed target feature representation. For example, the computing system can determine the loss based at least in part on evaluation of a compression loss function for which a compression loss is minimized based at least in part on the entropy which can be associated with a lower bound for the encoding that is used. The entropy can be based at least in part on a data size of the compressed target feature representation. Further, the entropy can be positively correlated with the data size (e.g., the greater the entropy, the greater the data size).

In some embodiments, the loss is based at least in part on an accuracy of the localized state of the source object with respect to the ground-truth state of the source object. The accuracy can be inversely correlated with the loss (e.g., a greater accuracy is associated with a lower loss). For example, the loss can be based at least in part on evaluation of a matching loss function for which a matching loss is minimized based at least in part on the accuracy of the localized state. The accuracy can be based at least in part on the similarity of the localized state of the source object to the ground-truth state of the source object. Further, in some embodiments, the accuracy can be associated with a distance of the localized state of the source object from the ground-truth state of the source object.

In some embodiments the training data, the target data (e.g., the compressed target feature representation), and/or the source data can be stored in one or more storage and/or one or more memory devices. The target data and/or the source data can be stored, as well as associated data including the time the target data and/or source data was stored, the time the target data and/or source data was captured, and/or the data size of the source data and/or the target data.

In some embodiments, the target data can be stored in a storage device of a device or system (e.g., a vehicle and/or a robotic system) associated with the computing system. For example, an autonomous vehicle associated with the computing system can include one or more local storage devices on which data including the target data is stored. Furthermore, in some embodiments, the source data and/or other data associated with the target data and/or source data can be stored in a storage device or system (e.g., a vehicle and/or a robotic system) associated with the computing system.

In some embodiments, the computing system can control, based at least in part on the localized state of the source object with respect to the environment, one or more device systems associated with operation of the device. The one or more device systems can include one or more engine systems, one or more motor systems, one or more steering systems, one or more braking systems, one or more electrical systems, and/or one or more communications systems. By way of example, the localized state of the source object can be the position of an autonomous vehicle controlled in part by the computing system. The computing system can then use the position of the autonomous vehicle to localize the autonomous vehicle with respect to target data that includes one or more maps of the environment the autonomous vehicle is traversing.

The computing system can access training data. The training data can include a source representation of a training environment and a target representation of the training environment. In some embodiments the source representation and/or the target representation of the training data can include different representations of the same environment. For example, the source representation can be based at least in part on, or can include, one or more sensor outputs from one or more sensors including at least one of: one or more light detection and ranging devices (LiDAR), one or more sonar devices, one or more radar devices, and/or one or more cameras.

Further, the target representation of the training data can be based at least in part on, or can include one or more maps of the environment. The source representation and/or the target representation of the training data can also be based on or include, one or more images of the environment.

The computing system can generate an encoded target representation based at least in part on the target feature representation and a machine-learned encoding model. For example, the encoding of the target feature representation can be based at least in part on the use of the target feature representation as an input to a machine-learned encoding model that is trained to perform one or more operations including generating the compressed target feature representation based at least in part on the input including the target feature representation.

The computing system can generate a binarized target feature representation based at least in part on the encoded target feature representation and one or more lossless binary encoding operations. For example, the computing system can perform one or more lossless encoding operations on the encoded target representation (e.g., the output of the machine-learned coding model) that read the format of the encoded target representation and generate the binarized target feature representation in a binary format without losing any of the information in the encoded target representation. Further, the one or more lossless encoding operations can include lossless operations that can compress the encoded target representation (e.g., Huffman encoding and/or run-length-encoding).

The computing system can generate a reconstructed target feature representation based at least in part on the binarized target feature representation and a machine-learned decoding model. For example, the computing system can generate the reconstructed target feature representation by receiving the binarized target feature representation as an input to the machine-learned decoding model, that has been configured and/or trained to decode (e.g., decompress) the binarized target feature representation and generate the reconstructed target feature representation as an output.

The computing system can determine a matching score based at least in part on application of a matching function to the source feature representation and the reconstructed target feature representation. For example, the matching score can be based at least in part on a comparison of one or more features of the source feature representation (e.g., a LiDAR point cloud of the environment) and the reconstructed target feature representation (e.g., a map of the environment).

During a training phase, the computing system can determine a loss associated with a matching score for the source feature representation and the reconstructed target feature representation relative to a ground-truth matching score for the source feature representation and the reconstructed target feature representation. Determination of the loss can be based at least in part on evaluation of one or more loss functions (e.g., a loss function that includes one or more variables associated with one or more features) and/or one or more comparisons of the matching score and the ground-truth matching score. In some embodiments, minimization of the loss is positively correlated with greater similarity between the matching score and the ground-truth matching score (e.g., a matching score that is closer to the ground-truth matching score).

The computing system can generate at least one of the source feature representation and the target feature representation based at least in part on one or more machine-learned feature extraction models. For example, the target data (e.g., target data including the target representation that includes one or more maps of an environment) can be provided as an input to the one or more machine-learned feature extraction models, that have been trained to access the input and perform one or more operations including generating an output including the target feature representation. Furthermore, the target feature representation can have the same spatial resolution as the target representation and a lower spectral resolution than the target representation.

In some embodiments, determining the matching score can include determining a localized state of a source object in the training environment based at least in part on one or more comparisons of the source feature representation to the reconstructed target feature representation. For example, the computing system can compare one or more aspects of the source feature representation to the reconstructed target feature representation to determine one or more matches between the source feature representation and the reconstructed target feature representation. In some embodiments, the loss is a total loss that is based at least in part on at least one of a matching loss and a compression loss. The matching loss can be based at least in part on an accuracy of the matching score with respect to the ground-truth matching score. For example, the computing system can determine the matching loss based at least in part on evaluation of a matching loss function for which a matching loss is minimized.

Further, the compression loss can be based at least in part on a data size of the reconstructed target feature representation. For example, the computing system can determine the compression loss based at least in part on evaluation of a compression loss function for which a compression loss is minimized.

In some embodiments, the loss is based at least in part on evaluation of a loss function based at least in part on a regularization term that is used to increase sparsity of the binarized target feature representation. For example, the computing system can use the regularization term to minimize the entropy of each pixel in the binarized target feature representation (e.g., a two-dimensional image) by making the binary representation more sparse (e.g., a greater proportion of zeroes associated with non-features in comparison to ones associated with features).

The computing system can generate an encoded target feature representation based at least in part on the target feature representation and a machine-learned encoding model. For example, the encoded target feature representation can be based at least in part on the use of the target feature representation as an input to a machine-learned encoding model that is configured to perform one or more operations including generating the encoded target feature representation based at least in part on the input.

In some embodiments, the machine-learned encoding model is a residual convolutional neural network.

The computing system can generate a binarized target feature representation based at least in part on performance of one or more binary encoding operations on the encoded target feature representation. For example, the computing system can generate the binarized target feature representation (e.g., a binary representation of the target feature representation) by performing one or more binarization operations on the encoded target representation. The one or more binarization operations can include receiving the encoded target feature representation as an input that is passed through a binarization function that is evaluated and that generates a binary output.

The computing system can generate a compressed target feature representation of the encoded target feature representation based at least in part on use of one or more machine-learned compression models and/or performance of one or more compression operations on the binarized target feature representation.

In some embodiments, the machine-learned encoding model can be configured and/or trained based at least in part on joint training with a machine-learned decoding model configured to generate a reconstructed target feature representation based at least in part on the binarized target feature representation. For example, the machine-learned encoding model and the machine-learned decoding model can be concurrently trained using the same binarized target feature representation and reconstructed target feature representation. In some embodiments, the reconstructed target feature representation is a reconstruction of the target feature representation.

In some embodiments, at least one of the machine-learned encoding model and the machine-learned decoding model are configured and/or trained based at least in part on evaluation of a compression loss function associated with a matching score for a source feature representation of the environment and the reconstructed target feature representation relative to a ground-truth matching score.

In some embodiments, the one or more binary encoding operations can reconstruct the compressed target feature representation without loss of information encoded in the target feature representation.

In some embodiments, the one or more binary encoding operations are based at least in part on a frequency of occurrence of one or more portions of the binarized target feature representation, and one or more subsequent encoding operations (e.g., binary encoding operations) are based at least in part on one or more redundancies in one or more portions of the binarized target feature representation. For example, the computing system can generate a dictionary based on the frequency of occurrence of one or more portions of the binarized target feature representation (e.g., the frequency of occurrence of ones and zeroes in the target feature representation) and encode the binarized target frequency representation using the dictionary.

In some embodiments, performing the one or more binary encoding operations can include performing a first set of one or more binary encoding operations based at least in part on a frequency of occurrence of one or more portions of the target feature representation; and performing a second set of one or more binary encoding operations subsequent to the first set of the one or more binary encoding operations. The second set of the one or more binary encoding operations can be based at least in part on one or more redundancies in one or more portions of the target feature representation.

In some embodiments, the one or more binary encoding operations can include one or more Huffman encoding operations and/or one or more Run-Length-Encoding operations. Further, in some embodiments, the one or more Huffman encoding operations can be performed prior to the one or more Run-Length-Encoding operations.

In some embodiments, the computing system can generate one or more maps of the environment based at least in part on the compressed target feature representation. For example, the computing system can generate one or more maps that occupy less storage space than the target representation on which the compressed target feature representation is based. Further, the computing system can store the one or more maps in a storage device or memory of the computing device and/or an autonomous vehicle associated with the computing device. For example, the computing system can store the one or more maps for future use including localization that uses two or more representations of an environment.

In some embodiments, the machine-learned attention model can be a convolutional neural network that is trained end-to-end. For example, the machine-learned attention model can be trained without the use of manually performed operations and/or supervised training of the machine-learned attention model.

The computing system can generate an attended target feature representation based at least in part on masking the target feature representation with the attention feature representation. For example, the computing system can perform one or more operations to use the attention feature representation to mask one or more features of the target feature representation.

The computing system can determine a matching score based at least in part on application of a matching function to the source feature representation and the attended target feature representation. For example, the matching score can be based at least in part on a comparison of one or more features of the source feature representation (e.g., a LiDAR point cloud of the environment) and the reconstructed target feature representation (e.g., a satellite image of the environment).

The computing system can determine a loss associated with the matching score relative to a ground-truth matching score. The loss can be determined based at least in part on evaluation of one or more loss functions (e.g., a loss function that includes one or more variables associated with one or more features) and/or one or more comparisons of the matching score to the ground-truth matching score.

In some embodiments, the loss associated with the matching score relative to a ground-truth matching score can be based at least in part on evaluation of the loss function: $\ell = \ell_{match}(y, y_{GT}) + \lambda\, \ell_{att}(\Omega)$. The loss can be represented by $\ell$; the matching loss can be represented by $\ell_{match}(y, y_{GT})$; the sparsity inducing loss can be represented by $\lambda\, \ell_{att}(\Omega)$; y can represent a localized state (e.g., an estimated position); and $y_{GT}$ can represent a ground-truth state (e.g., a ground-truth position).

The computing system can adjust one or more parameters of the machine-learned attention model based at least in part on the loss. The machine-learned attention model can include one or more parameters that can be adjusted based at least in part on the contributions that each of the one or more parameters make in terms of minimizing the loss. For example, the one or more parameters of the machine-learned attention model that do not change the loss (e.g., e.g., cause the loss to increase or decrease) may be kept the same (e.g., not adjusted), the one or more parameters that decrease the loss can be weighted more heavily, and the one or more parameters that increase the loss can have their weighting reduced. Adjustment of the one or more parameters of the machine-learned attention model over a plurality of iterations can result in a lower loss which can correspond to greater accuracy as indicated by greater similarity of the matching score relative to a ground-truth matching score (e.g., more effective focus of attention).

The computing system can generate the training data including at least one of the source feature representation and the target feature representation based at least in part on one or more machine-learned feature extraction models. For example, target data (e.g., target data including one or more map images of an environment) and source data (e.g., source data including one or more LiDAR images of an environment) can be provided as an input to the one or more machine-learned feature extraction models, that have been trained to receive the input and generate an output including the target feature representation and the source feature representation respectively.

In some embodiments, generating the attended target feature representation can include performing one or more content-aware band pass filtering operations that mask one or more portions of the attended feature representation based at least in part on attention to specific bands in a frequency domain. For example, the computing system can use some combination of high-pass filtering and low-pass filtering to mask certain frequencies by attending to specific bands in the frequency domain.

In some embodiments, determining a matching score can include determining a localized state of a source object in the environment based at least in part on one or more comparisons of the source feature representation to the attended target feature representation. For example, the computing system can compare one or more aspects of the source feature representation to the attended target feature representation to determine one or more matches between the source feature representation and the attended target feature representation.

In some embodiments, the loss can be based at least in part on a matching loss and a sparsity-inducing loss. The matching loss can be associated with a loss function that is used to determine one or more matches between the attended target feature representation and the source feature representation. The sparsity-inducing loss can be associated with increasing the sparsity of the attended feature representation. Increasing sparsity of the attended feature representation can, after the performance of one or more compressions operations on the attended feature representation, result in a reduction in the data size of the attended feature representation.

In some embodiments, generating an attended target feature representation based at least in part on masking the target feature representation with the attention feature representation can include performing one or more hard attention operations to increase sparsity of the attended feature representation. For example, hard attention ($att_h(f)$) can be formulated as:

$$att_h(f) = \text{binarize}(att_s(f; w)), \text{binarize} = \begin{cases} 0 & \text{if } x < \tau \\ 1 & \text{else} \end{cases}.$$

In the preceding formulation of hard attention, $att_s(f; w)$ can be a soft attention output (e.g., a soft attention map) of the machine-learned attention model, and $\tau$ can be a thresholding constant.

Furthermore, performing the one or more hard attention operations on the target feature representation to increase sparsity of the attended feature representation can include determining the sparsity of the attended feature representation based at least in part on evaluation of the attended target feature representation with respect to a sparsity threshold. For example, the thresholding constant $\tau$ can be used to determine the sparsity of the attended feature representation.

In some embodiments, the sparsity threshold can be based in part on a predetermined accuracy of the attended target feature representation with respect to the target feature representation and a predetermined data size of the attended target feature representation. For example, the sparsity threshold can be based at least in part on a desired accuracy of the attended target feature representation or a desired data size of the attended target feature representation.

In some embodiments, generating an attended target feature representation based at least in part on masking the target feature representation with the attention feature representation can include using on or more machine-learned compression models and/or performing one or more compression operations on the attended target feature representation. For example, the computing system can perform one or more compression operations that reduce the data size of the attended target feature representation.

In some embodiments, the one or more compression operations can include a plurality of lossless binary compression operations that reconstruct the attended target feature representation without loss of information encoded in the attended target feature representation. For example, the one or more compression operations can include one or more Huffman encoding operations performed prior to one or more Run-Length-Encoding operations.

In some embodiments, the computing system can store the attended feature representation in one or more storage devices. After being stored, the attended feature representation can be accessed for later use by various systems including localization systems and/or mapping systems.

The computing system can operate, based at least in part on the attended feature representation, one or more vehicle localization systems and/or one or more mapping systems. The attended feature representation can be used to determine a location in an environment based at least in part on one or more comparisons to another representation of the environment (e.g., a source representation of the environment based at least in part on LiDAR data). For example, the attended feature representation can be accessed by the computing system in order to localize an autonomous vehicle associated with the computing system.

The systems, methods, devices, and non-transitory computer-readable media in the disclosed technology can provide a variety of technical effects and benefits to the overall operation of a vehicle and to object localization and the generation of feature representations in particular. By more effectively determining the locations of objects in an environment through use of one or more machine-learned models that can utilize compressed data (e.g., compressed maps of the environment), the disclosed technology can provide various benefits including more accurate localized state estimation, more efficient compression, improved scalability, reduced wear and tear on a vehicle, greater fuel efficiency, improved safety, and/or an overall improvement in the utilization of computational resources that results from a more highly compressed and accurate representation of an environment.

The disclosed technology can achieve more accurate and/or faster estimation of object locations in environment by leveraging the use of one or more machine-learned models (e.g., the machine-learned feature extraction model, the machine-learned encoding model, and/or the machine-learned attention model). The one or more machine-learned models can be trained to determine object localized states based at least in part on the comparisons of a localized state of the object to a ground-truth state, the use of jointly trained machine-learned encoding and decoding models, and the use of various lossless compression operations (e.g., Huffman coding and/or run-length encoding).

The disclosed technology can generate highly compressed feature representations that include sparse feature representations of an environment that reduce storage requirements while preserving features that are useful for applications including localization and mapping. Further, the compressed feature representations can be reconstructed on the fly, allowing for their use in a real-time setting in which the compressed feature representation can be accessed and used quickly. As such, the compressed feature representations allows for a reduction in the amount of storage required to maintain representations of large geographic areas.

Furthermore, by using the one or more machine-learned models, the disclosed technology has the additional advantage of improved scalability. In particular, a machine-learned model that can be retrained using an additional set of training data can be improved without the laborious manual derivations and adjustments that are often required in rules-based models or heuristic models that do not use machine-learning. For example, in a manually derived rules based model, a human designer would need to manually derive heuristic models that determine the way in which correlations can be made between different representations of various environments. As such, the task of crafting and adjusting a heuristic model can be onerous relative to using a machine-learned model that is trained using training datasets. Further, the one or more machine-learned models in the disclosed technology can be trained using relevant training data (e.g., LiDAR data and maps), which can be done on a massive scale. Additionally, the one or more machine-learned models can readily revised as new training data becomes available or new uses for the one or more machine-learned models are envisioned.

The disclosed technology can also improve the operation of the vehicle by reducing the amount of wear and tear on vehicle components through more gradual adjustments in the vehicle's travel path that can be performed based on the more accurate localization of the vehicle with respect to a representation of an environment surrounding the vehicle. For example, more accurate localization of the vehicle can result in a more safe and smooth ride (e.g., fewer course corrections) that reduces strain on a vehicle's engine, braking, and steering systems. Additionally, more accurate localization can result in improved passenger comfort when the vehicle is in transit due to smoother adjustments by the vehicle (e.g., more gradual turns and acceleration).

The disclosed technology can further improve the operation of the vehicle by improving the fuel efficiency of a vehicle. For example, more accurate feature representations of an environment can result in more efficient navigation of a vehicle through an environment, thereby reducing the number of fuel consuming course changes and achieving a reduction in the overall amount of energy (e.g., fuel or battery power) that is consumed when operating the vehicle.

Additionally, more effective object localization can allow for an improvement in safety for passengers inside a vehicle as well as those outside the vehicle (e.g., pedestrians, cyclists, and passengers of other vehicles). For example, the feature representations generated by the disclosed technology can be used by an autonomous vehicle's perception system to more effectively avoid unintentional contact with other objects. Further, the disclosed technology can be used to generate more accurate maps of an environment that can be shared with various devices including autonomous vehicles, robotic systems, and/or augmented reality systems. For example, highly accurate localization is a boon for augmented reality games and other augmented reality applications in which the precise correspondence of a computer generated image of an object with respect to an actual physical environment is required.

Accordingly, the disclosed technology provides improved prediction of the locations of detected objects. Operational benefits of the disclosed technology include more accurate localized state estimation, better data compression, improved scalability, reduced wear and tear on a vehicle, greater fuel efficiency, improved safety, and/or an overall improvement in the utilization of computational resources.

With reference now to FIGS. 1-21, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including accessing training data including a source representation of a training environment and a target representation of the training environment; generating a source feature representation and a target feature representation based at least in part on one or more machine-learned feature extraction models accessing the source representation and the target representation respectively; generating a compressed target feature representation of the target feature representation based at least in part on use of one or more machine-learned compression models and/or one or more compression operations; determining a localized state of the source object within the target representation of the environment based at least in part on the source feature representation and the compressed target feature representation; determining a loss based at least in part on one or more comparisons of the localized state of the source object to the ground-truth state of the source object; and adjusting one or more parameters of the one or more machine-learned compression models based at least in part on the loss.

In some embodiments, the one or more operations and/or functions performed by the operations computing system 104 can include accessing training data including a source feature representation of a training environment and a target feature representation of the training environment; generating an encoded target feature representation based at least in part on the target feature representation and a machine-learned encoding model; generating a binarized target feature representation based at least in part on the encoded target feature representation and one or more lossless binary encoding operations; generating a reconstructed target feature representation based at least in part on the binarized target feature representation and a machine-learned decoding model; determining a matching score based at least in part on application of a matching function to the source feature representation and the reconstructed target feature representation; determining a loss associated with the matching score for the source feature representation and the reconstructed target feature representation relative to a ground-truth matching score; and adjusting one or more parameters of at least one of the machine-learned encoding model or the machine-learned decoding model based at least in part on the loss.

In some embodiments, the one or more operations and/or functions performed by the operations computing system 104 can include accessing training data including a target feature representation of a training environment and a source feature representation of the training environment; generating an attention feature representation based at least in part on the target feature representation and a machine-learned attention model; generating an attended target feature representation based at least in part on masking the target feature representation with the attention feature representation; determining a matching score based at least in part on application of a matching function to the source feature representation and the attended target feature representation; determining a loss associated with the matching score for the source feature representation and the target feature representation relative to a ground-truth matching score for the source feature representation and the target feature representation; and adjusting one or more parameters of the machine-learned attention model based at least in part on the loss.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned feature extraction models, one or more machine-learned reconstruction models, one or more machine-learned encoding models, one or more decoding models, and/or one or more machine-learned attention models, which are described herein including in the methods 500-1900 that are depicted in FIGS. 5-19.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude and longitude of an object detected by the one or more sensors 114 of the vehicle 108), the state of a vehicle (e.g., the velocity, acceleration, and/or location of the vehicle 108), or the state of objects external to a vehicle (e.g., the physical dimensions, velocity, acceleration, heading, location, shape, and/or appearance of objects external to the vehicle).

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the source data, the target data, the training data, and/or the one or more machine-learned models that are stored in the operations computing system 104.

The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including accessing source data and target data; generating a source feature representation based at least in part on the source representation and one or more machine-learned feature extraction models; and determining a localized state of the source object with respect to the environment based at least in part on the source feature representation and the compressed target feature representation. Furthermore, the one or more memory devices of the vehicle computing system 112 can be used to store data including the source data, the target data, the training data, and/or the one or more machine-learned models that are stored in the operations computing system 104.

In some embodiments, the one or more operations and/or functions performed by the vehicle computing system 112 can include accessing target data including a target feature representation of an environment; generating an encoded target feature representation of the target feature representation based at least in part on a machine-learned encoding model; generating a binarized target feature representation of the encoded target feature representation; and generating a compressed target representation of the encoded representation based at least in part on performance of one or more compression operations on the binarized target feature representation and/or use of one or more machine-learned compression models (e.g., using the machine-learned models which are configured and/or trained to generate the compressed target representation based on an input including the binarized target feature representation).

In some embodiments, the one or more operations and/or functions performed by the vehicle computing system 112 can include accessing target data including a target feature representation of an environment; generating an attention feature representation based at least in part on the target feature representation and the machine-learned attention model; and generating an attended target feature representation based at least in part on masking the target feature representation with the attention feature representation.

Furthermore, the vehicle computing system 112 can perform one or more operations associated with the control, exchange of data, and/or operation of various devices and systems including robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, sidewalks, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices);

and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
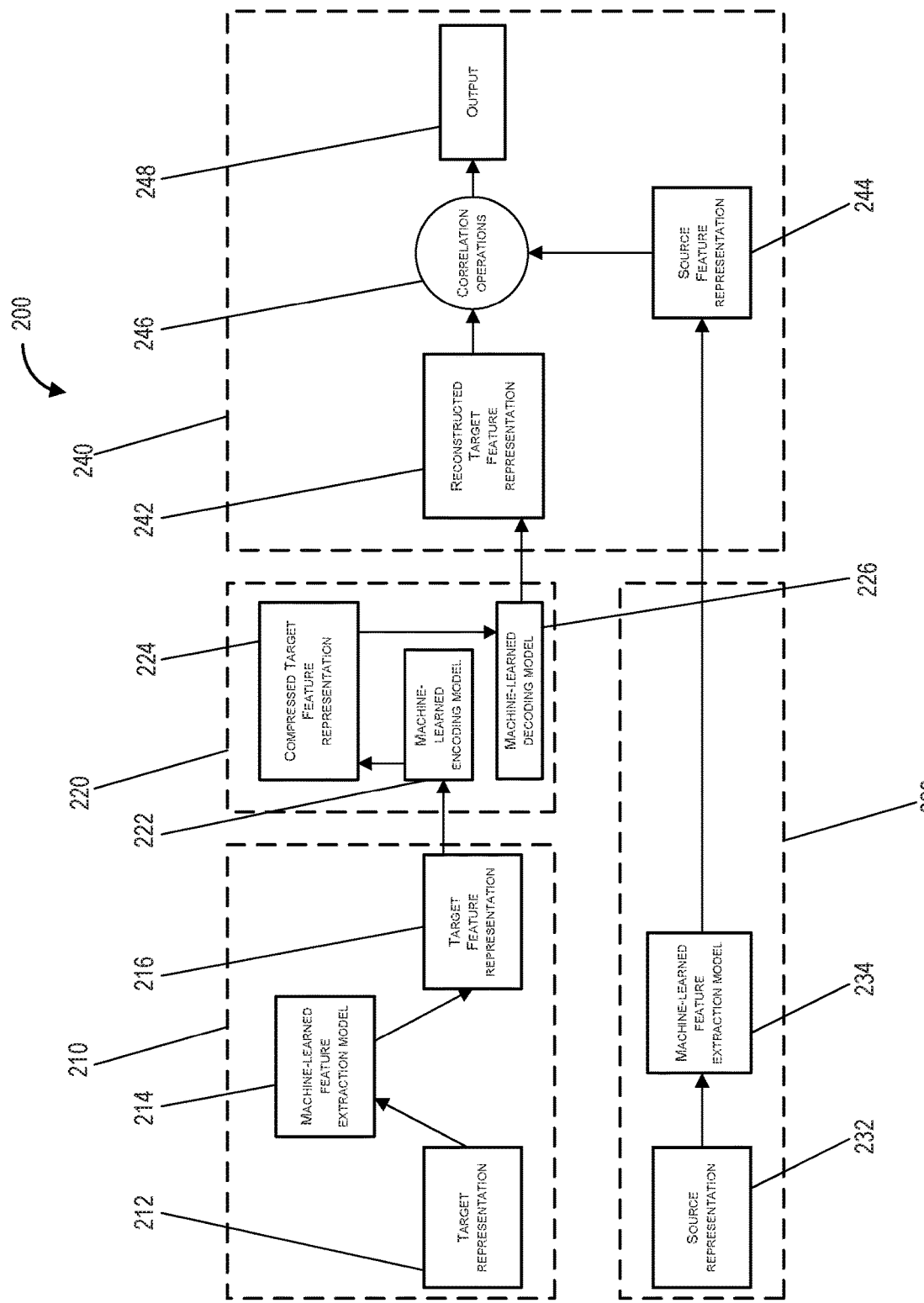
FIG. 2 depicts a diagram of an example technique for localization and compression according to example embodiments of the present disclosure.

FIG. 2 depicts a diagram of an example technique for localization and compression according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows an example of a localization and compression technique 200 including target representation operations 210, a target representation 212, a machine-learned feature extraction model 214, a target feature representation 216, compression operations 220, a machine-learned encoding model 222, a compressed target feature representation 224, a machine-learned decoding model 226, source representation operations 230, source representation 232, machine-learned feature extraction model 234, matching operations 240, reconstructed target feature representation 242, source feature representation 244, correlation operations 246, and output 248.

The target representation operations 210 can include one or operations that are used to determine one or more features of the target representation 212 which can include one or more images of a geographic area. The target representation 212 can be used as an input to the machine-learned feature extraction model 214 which is configured to receive the target representation 212 and generate the target feature representation 216 after performing one or more operations on the target representation 212. By way of example, the machine-learned feature extraction model 214 can receive maps including satellite imagery of a geographic area; determine one or more features of the geographic area including road features, sidewalk features, tree features, and building features; and generate the target feature representation 216 which includes the one or more features of the target representation 212.

The compression operations 220 can include one or operations that are used to compress the target feature representation 216 so that the data size of the target feature representation 216 is reduced. For example, the target feature representation 216 can be used as an input to the machine-learned encoding model 222 which is configured to receive the target feature representation 216, perform one or more encoding operations on the target feature representation 216, and generate the compressed target feature representation 224. Further, the compression operations 220 can include using the compressed target feature representation 224 as an input to the machine-learned decoding model 222 which is configured to receive the compressed target feature representation 224, perform one or more decoding operations on the target feature representation 216, and generate the reconstructed target feature representation 242. The one or more encoding operations performed by the machine-learned encoding model 222 can losslessly encode the target feature representation 216. Further, the one or more decoding operations performed by the machine-learned decoding model 226 can losslessly decode the compressed target feature representation 224. Accordingly, the reconstructed target feature representation 242 can include all of the features of the target feature representation 216 without loss of information resulting from the one or more encoding operations and/or the one or mode decoding operations. Furthermore, the compression operations 220 can include the performance of one or more Huffman encoding operations and/or one or more run-length encoding operations that can losslessly compress the target feature representation.

The source representation operations 230 can include one or operations that are used to determine one or more features of the source representation 232 which can include one or more sensor outputs including one or more sensor outputs generated by a LiDAR device scanning the same geographic area represented by the target representation 212. Furthermore, the source representation 232 can include information associated with the position of a source object in the source representation 232. The source representation 232 can be used as an input to the machine-learned feature extraction model 234 which is configured to receive the source representation 232 and generate the source feature representation 244 after performing one or more operations on the source representation 232. By way of example, the machine-learned feature extraction model 234 can receive sensor data based on one or more sensor outputs of a LiDAR device; determine one or more features of the geographic area detected by the LiDAR device; and generate the source feature representation 244 which includes one or more features of the source representation 232.

The matching operations 240 can include one or more operations that are used to determine one or more matches and/or similarities between the reconstructed target feature representation 242 and the source feature representation 244. For example, the matching operations 240 can include performing the correlation operations 246 on the reconstructed target feature representation 242 and the source feature representation 244. The correlation operations 246 can include the use of one or more spatial transformer networks to rotate the reconstructed target feature representation 242 and the source feature representation 244 to various positions and thereby determine one or more correlations between the reconstructed target feature representation 242 and the source feature representation 244. Based at least in part on the results of the correlation operations 246, the output 248 can be generated. The output 248 can include a localized state (e.g., an estimated position) of the source object in the source feature representation 244. In some embodiments, the output 248 can include a matching score and/or a position score. The matching score and/or the position score can be associated with the extent to which the reconstructed target feature representation 242 and the source feature representation 244 match. In this way, the matching operations 240 can be used to localize an object in the source feature representation 244 based on one or more comparisons to the reconstructed target feature representation 242.

Figure 3:
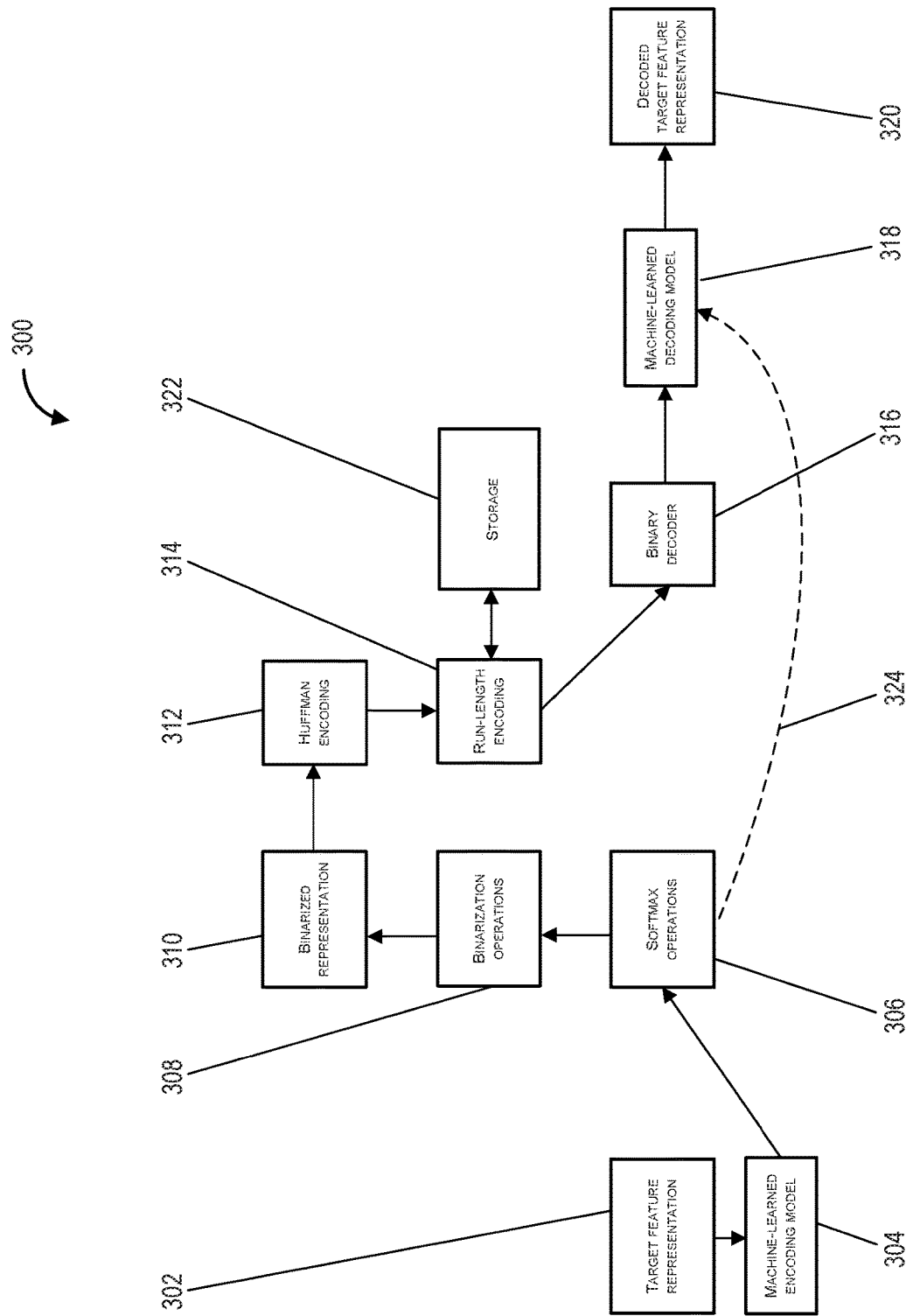
FIG. 3 depicts a diagram of an example technique for compression according to example embodiments of the present disclosure.

FIG. 3 depicts a diagram of an example technique for compression according to example embodiments of the present disclosure. One or more operations and/or functions or operations in FIG. 3 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of the compression operations 300 which include the use of a target feature representation 302, a machine-learned encoding model 304, softmax operations 306, binarization operations 308, a binarized representation 310, Huffman encoding 312, run-length encoding 314, binary decoder 316, machine-learned decoding model 318, decoded target feature representation 320, storage 322, and straight-through estimator 324.

The compression operations 300 can include one or operations that are used to compress the target feature representation 302 so that the data size of the target feature representation 302 is reduced. The compression operations 300 can include one or more encoding operations that can encode the target feature representation 302 without loss of information. Further, the compression operations 300 can include one or mode decoding operations that can decode an encoded version of the target feature representation 302 without loss of information. The target feature representation 302 can include one or more images of a geographic area. For example, the target feature representation 302 can include the one or more images of the target feature representation 216 that is depicted in FIG. 2.

By way of example, the target feature representation 302 can be used as an input to the machine-learned encoding model 304 which is configured to receive the target feature representation 302, perform one or more encoding operations on the target feature representation 302, and generate an encoded version of the target feature representation 302. The encoded version of the target feature representation 302 can be used as the input on which the softmax operations 306 are performed and on which the binarization operations 308 can then be performed to output the binarized representation 310 in which the target feature representation 302 is represented in a binary format. Huffman encoding 312 can be performed on the binarized representation 310, and the run-length-encoding 314 can then be performed on the Huffman encoded version of the binarized representation 310. The run-length encoded version of the binarized representation 310 can then be provided as an input to the binary decoder 316. In some embodiments, the straight-through estimator 324 can use an identity function in lieu of the softmax operations 306, the binarization operations 308, the Huffman encoding 312, the run-length encoding 314, and the decoder 316.

In some embodiments, the Huffman encoded version of the binarized representation 310 can be stored in the storage 322. Further, in some embodiments, the storage 322 can provide a stored copy of a Huffman encoded version of the binarized representation 310 to the binary decoder 316.

The decoder 316 can perform operations including Huffman decoding and run-length decoding to decode the run-length encoded version of the binarized representation 310. The machine-learned decoding model 318 can then receive as an input, the output of the decoder 316. The machine-learned decoding model 318 can then output the decoded target feature representation 320 which can include the one or more images of the target feature representation 302.

Figure 4:
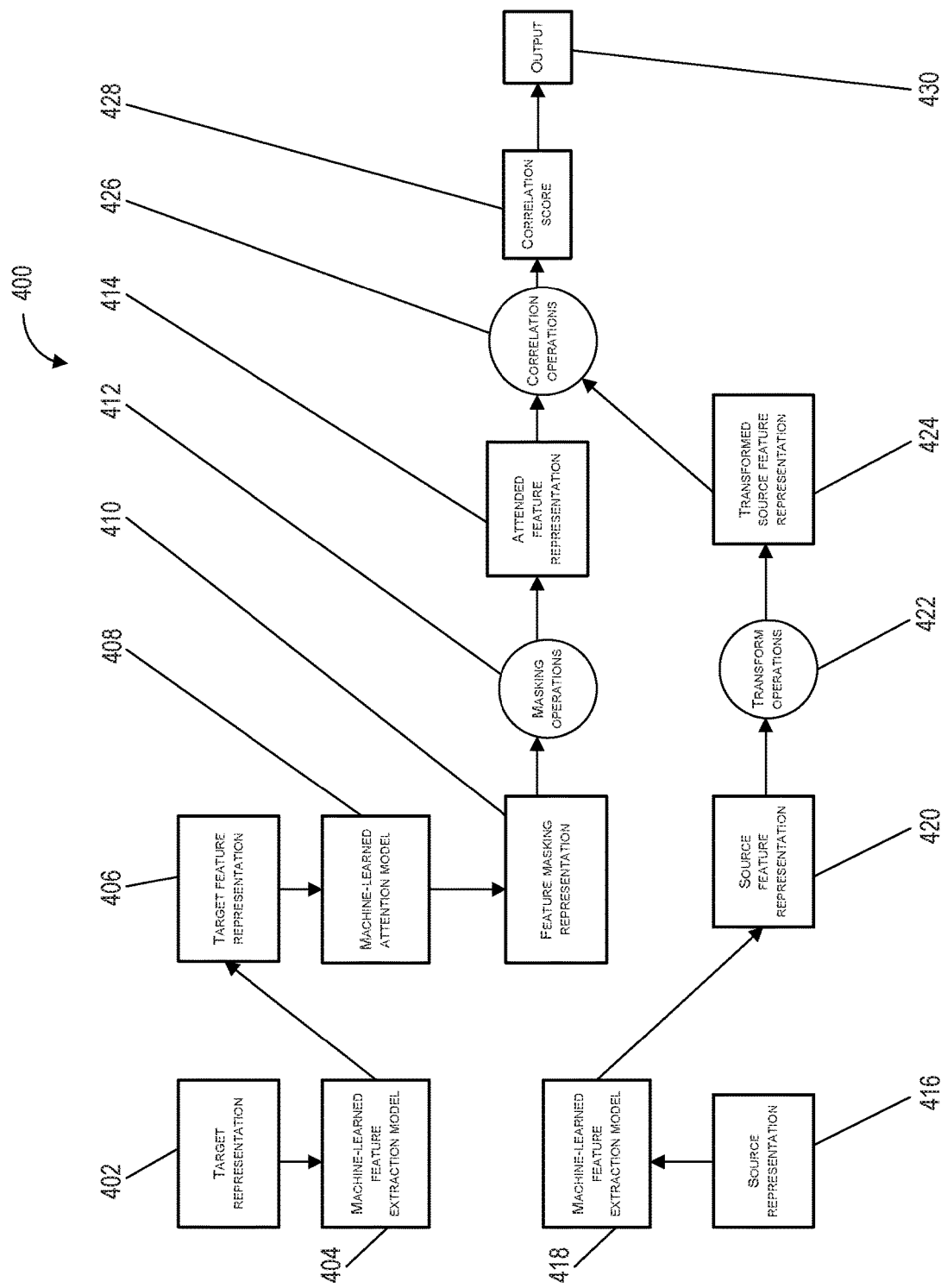
FIG. 4 depicts a diagram of an example aspect of an attention based matching according to example embodiments of the present disclosure.

FIG. 4 depicts a diagram of an example aspect of an attention based matching according to example embodiments of the present disclosure. One or more operations and/or functions in FIG. 4 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 4 can include one or more features of one or more devices and/or systems including, for example, the operations computing system 104, the vehicle 108, or the vehicle computing system 112, which are depicted in FIG. 1.

As illustrated, FIG. 4 shows an example of attention based matching 400 including use of a target representation 402, a machine-learned feature extraction model 404, a target feature representation 406, a machine-learned attention model 408, a feature masking representation 410, masking operations 412, an attended feature representation 414, a source representation 416, a machine-learned feature extraction model 418, a source feature representation 420, transform operations 422, a transformed source feature representation 424, correlation operations 426, correlation score 428, and output 430.

The attention based matching 400 can include one or operations that are used to determine one or more features of the target representation 402 that match the source representation 416. The target representation 402 can be used as an input to the machine-learned feature extraction model 404 which is configured to receive the target representation 402 and generate the target feature representation 406 after performing one or more operations on the target representation 402. By way of example, the machine-learned feature extraction model 404 can receive the target representation 402 which includes satellite imagery of a geographic area; determine one or more features of the geographic area depicted in the satellite imagery; and generate the target feature representation 406 which includes the one or more features of the target representation 402.

The target feature representation 406 can then be used as an input to the machine-learned attention model 408 that is configured and/or trained to generate the feature masking representation 410 that can be used as part of the masking operations 412 to mask the target feature representation 406 and thereby generate the attended feature representation 414.

The source representation 416 can include information associated with one or more sensor outputs. For example, the source representation 416 can include one or more sensor outputs generated by a LiDAR device scanning the same geographic area represented by the target representation 402. The source representation 416 can be used as an input to the machine-learned feature extraction model 418 which is configured to receive the source representation 416 and generate the source feature representation 420 after performing one or more operations on the source representation 416. The transform operations 422 can be performed on the source feature representation 420. For example, the transform operations can include one or more rigid two-dimensional transform operations to transform the three-dimensional LiDAR sensor outputs represented in the source feature representation 420 into the two-dimensional representation of the transformed source feature representation 424.

The correlation operations 426 can be performed on the attended feature representation 414 and the transformed source feature representation 424. The correlation operations can include the use of Fourier Fast Transform based cross correlation to determine one or more correlations between the attended feature representation 414 and the transformed source feature representation 424. Based on the results of the correlation operations 426, the correlation score 428 can be determined based on one or more similarities between the features of the attended feature representation 414 and the transformed source feature representation 424. A higher correlation score 428 can be associated with a greater degree of similarity between the features of the attended feature representation 414 and the transformed source feature representation 424. The output 430 can then be generated based on an inference using the matched features of the attended feature representation 414 and the transformed source feature representation 424.

Figure 5:
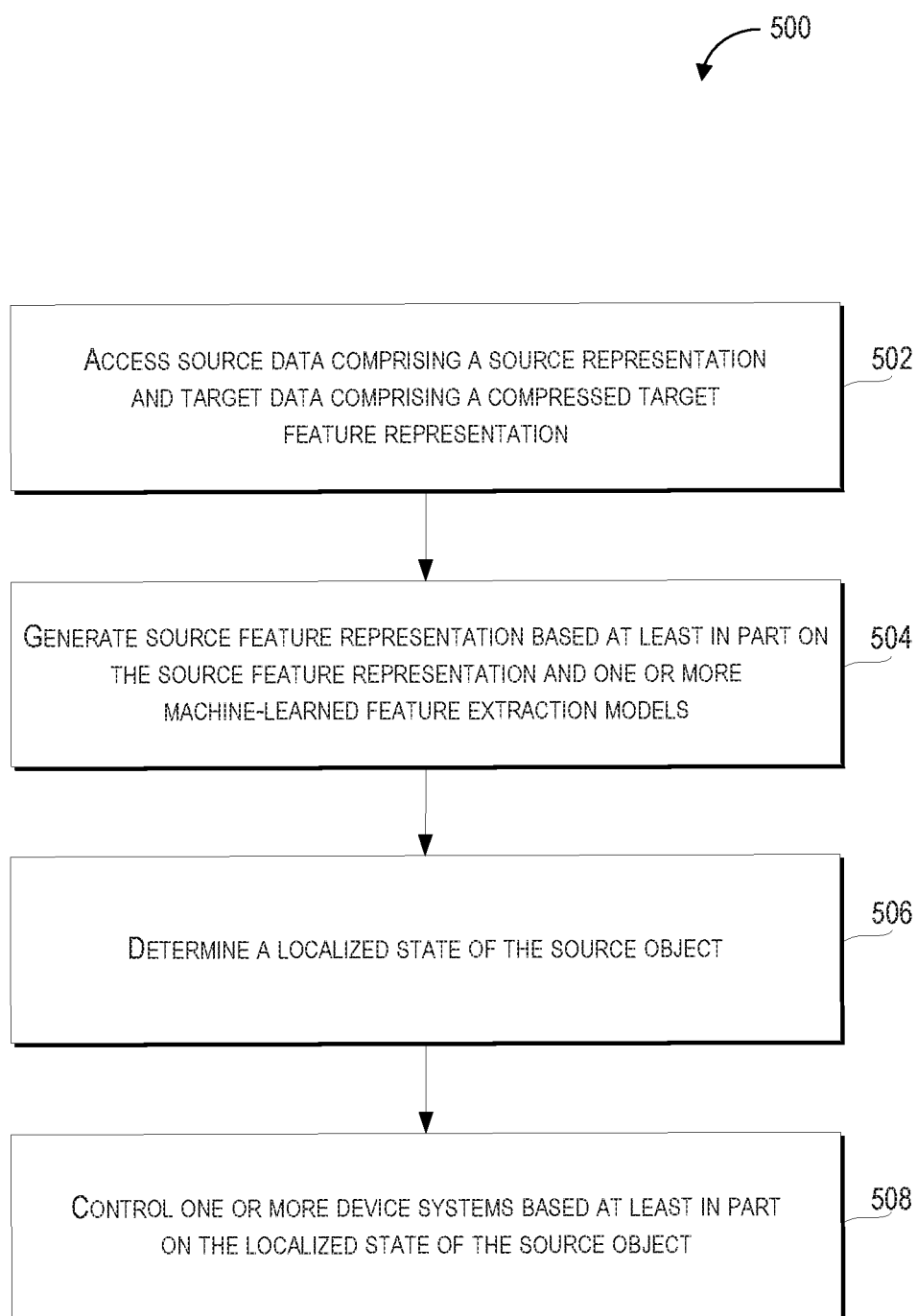
FIG. 5 depicts a flow diagram of an example method of feature compression and localization according to example embodiments of the present disclosure.

FIG. 5 depicts a flow diagram of an example method of feature compression and localization according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1) to, for example, generate outputs including estimated locations of objects in an environment based on different representations of the environment. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include accessing source data and/or target data. In some examples, the source data and/or the target data can be based at least in part on, or can include, one or more sensor outputs from one or more sensors. One or more portions of the source data and/or the target data can be accessed serially and/or in parallel. The source data can include a source representation of an environment including a source object. For example, the source data can include information associated with one or more images or maps of an environment that includes a source object. The environment can include any area or space and can include any combination of a natural environment including a natural geographic area, a human-made environment (e.g., a town), a simulated environment (e.g., a wholly artificial environment or a recreation of an actual environment generated by one or more computing systems), and/or any other type of geographic environment.

In some embodiments, the source object can be associated with a point in the environment that indicates the localized state (e.g., the position) of the source object. For example, the source object can be associated with a set of coordinates indicating the position or location of the source object in the environment.

The target data can include a compressed target feature representation of the environment (e.g., the same environment represented by the source representation in the source data). For example, the compressed target feature representation of the environment can be a version of a target feature representation that has been compressed using one or more machine-learned compression models and/or one or more compression operations.

In some embodiments the source data and/or the target data can be based at least in part on and/or include, one or more aerial images of the environment, one or more satellite images of the environment, and/or one or more maps of the environment. Further, the one or more images of the source data and/or the target data can include various raster (e.g., bitmap), vector, and/or voxel image formats. Further, the one or more images can include a two-dimensional representation of an environment (e.g., a two-dimensional overhead satellite map of an environment) or a three-dimensional representation of an environment (e.g., a three-dimensional LiDAR point cloud of the environment).

In some embodiments, the source data and the target data can be based on, or include, different types of information. For example, when the source data is based on one or more sensor outputs that provide a three-dimensional representation of an environment, the target data can be based on one or more satellite images that provide a two-dimensional representation of the same environment.

In some embodiments, the source object can include any object including a sensor system, a vehicle, a robotic system, and/or an augmented reality system. In some embodiments, the source object can be associated with the source of the one or more sensor outputs. Further, a representation of the source object can be: included as part of the source representation such that the source representation includes a representation of the source object; and/or as information associated with the localized state (e.g., location, orientation, and/or position) of the source object within the source representation). For example, the source representation of the environment can include an image of the environment in which the source object is a vehicle that is depicted as part of the environment.

Furthermore, the compressed target feature representation can be based at least in part on compression of a target feature representation of the environment generated and/or produced by one or more machine-learned feature extraction models. For example, the compressed target feature representation can be based at least in part on the input of a target representation that is provided as an input to the one or more machine-learned feature extraction models, that have been configured and/or trained to receive the input, perform various operations (e.g., feature extraction operations used to determine and/or identify particular features in the target feature) on the input, and generate a target feature representation as an output. In some embodiments, the target feature representation can represent the same environment as the target representation, have the same spatial resolution as the target feature representation, and/or have a lower spectral resolution than the target feature representation. In some embodiments, one or more compression operations (e.g., one or more lossless compression operations including Huffman encoding/decoding operations and run-length encoding/decoding operations) can be performed on the target feature representation, resulting in the compressed target feature representation which can be lower precision and/or lower resolution than the target feature representation. Further, in some embodiments, one or more machine-learned compression models can be configured and/or trained to receive an input including the target feature representation, and thereby generating the compressed target feature representation which can be lower precision and/or lower resolution than the target feature representation.

In some embodiments, the compressed target feature representation can be based at least in part on an encoding of the target feature representation using one or more lossless compression operations. For example, the compressed target feature representation can be based at least in part on one or more compression operations performed on the target feature representation and/or the one or more machine-learned compression models that are configured and/or trained to reduce the precision and/or the data size of the target feature representation. By way of further example, the encoding of the target feature representation can be based at least in part on the use of the target feature representation as an input to a machine-learned encoding model that is configured and/or trained to perform one or more operations including generating the compressed target feature representation as an output that is based at least in part on the input of the target feature representation.

In some embodiments, the compressed target feature representation of the environment is based at least in part on an attended feature representation of the target feature representation generated by a machine-learned attention model configured and/or trained to mask one or more portions of the target feature representation. For example, a machine-learned attention model can generate the compressed target feature representation based at least in part on an attended feature representation that is generated based at least in part on the input of the target feature representation into the machine-learned attention model. The machine-learned attention model can be trained to mask one or more features of a representation (e.g., the target feature representation) based at least in part on the attention that is focused on those particular features. For example, in the context of localizing an augmented reality device with respect to its indoor surroundings, the machine-learned attention model can be trained to focus on features that are more useful to matching including walls, floors, furniture, windows, and/or household items.

In some embodiments, the target data can be stored in a storage device of a device or system (e.g., a vehicle and/or a robotic system) associated with the computing system. For example, robotic device associated with the vehicle computing system 112 can store the target data on the memory devices of the vehicle computing system 112. Furthermore, in some embodiments, the source data and/or other data associated with the target data and/or source data can be stored in a storage device or system (e.g., a vehicle and/or a robotic system) associated with the vehicle computing system 112 and/or the operations computing system 104.

At 504, the method 500 can include generating a source feature representation based at least in part on the source representation and one or more machine-learned feature extraction models. For example, the source representation (e.g., source data including one or more images of an environment including the source object) can be provided as an input to the one or more machine-learned feature extraction models, that have been configured and/or trained to receive the input and generate an output including the source feature representation. In some embodiments, the source feature representation can have the same spatial resolution (e.g., the same number of pixels in a bitmap image) as the source representation and a lower spectral resolution (e.g., fewer colors in an image) than the source representation in some examples.

The one or more machine-learned feature extraction models can include a plurality of layers including convolutional layers portions of which can have the same stride or varying stride. Each of the plurality of layers of the one or more machine-learned feature extraction models can: receive an input (e.g., receive the source data, which can include one or more images as input for the first layer and one or more feature maps as input for the remaining layers subsequent to the first layer); perform some operations on the input (e.g., evaluate one or more variables and/or aspects of the input based at least in part on one or more parameters); and generate an output based on the operations performed on the input (e.g., generate a source feature representation based on the input of a source representation). For intermediate layers, the output can include a feature map that can be provided as an input for another layer (e.g., an immediately subsequent layer). For the last layer of the plurality of layers, the output can include some representation (e.g., the source feature representation) based at least in part on the one or more feature maps generated by the preceding layers.

In some embodiments, the output generated by the one or more machine-learned feature extraction models can include an image with the same spatial resolution (e.g., the same number of pixels) as the input (e.g., an image included in the source data). Furthermore, in some embodiments, the output generated by the one or more machine-learned feature extraction models can include an image with a lower spectral resolution (e.g., the output can include a binary image that was generated based at least in part on the input of twenty-four bit color image) than the input (e.g., an image included in the source data).

In some embodiments, the one or more machine-learned feature extraction models can include a convolutional neural network, a recurrent neural network, and/or a recursive neural network. Furthermore, the one or more machine-learned feature extraction models can be configured and/or trained to perform one or more operations including: encoding an input representation (e.g., the target feature representation) to generate an output representation including a compressed representation (e.g., the compressed target feature representation) that can be a lower resolution and lower precision than the input representation; and decoding an input representation (e.g., the compressed target feature representation) to generate an output including a reconstructed representation (e.g., a reconstructed target feature representation).

At 506, the method 500 can include determining a localized state of the source object with respect to the environment based at least in part on the source feature representation and the compressed target feature representation. The localized state of the source object can include an orientation of the source object; a position of the source object relative to some point of reference (e.g., the source object's position can be some angle and distance relative to the point of reference); and/or the position of the source object as some combination of latitude, longitude, and/or trajectory. For example, to determine the localized state of a source object associated with the position of a vehicle in an environment, the vehicle computing system 112 can perform one or more operations including one or more encoding operations, one or more decoding operations, one or more transformations, and/or one or more comparisons between the source feature representation and the compressed target feature representation to determine the position of the vehicle in the environment.

At 508, the method 500 can include controlling, based at least in part on the localized state of the source object with respect to the environment, one or more device systems associated with operation of the device. The one or more device systems can include one or more engine systems, one or more motor systems, one or more steering systems, one or more braking systems, one or more electrical systems, and/or one or more communications systems. By way of example, the localized state of the source object can be the position of an autonomous vehicle controlled in part by the vehicle computing system 112. The vehicle computing system 112 can then use the position of the autonomous vehicle to localize the autonomous vehicle with respect to target data that includes one or more maps of the environment the autonomous vehicle is traversing. Based on localization of the autonomous vehicle, the vehicle computing system 112 can more accurately determine the position of the autonomous vehicle in the environment.

Figure 6:
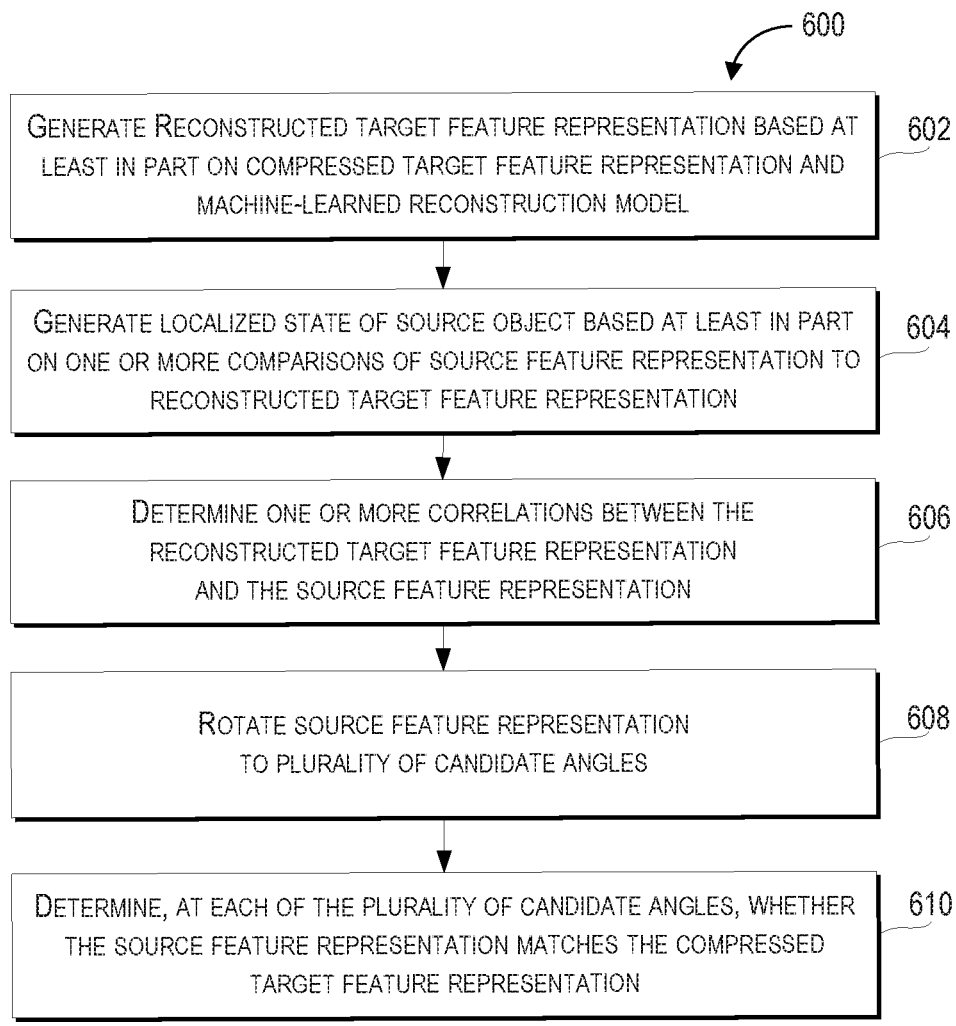
FIG. 6 depicts a flow diagram of an example method of feature compression and localization according to example embodiments of the present disclosure.

FIG. 6 depicts a flow diagram of an example method of feature compression and localization according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, generate outputs including estimated locations of objects in an environment based on different representations of the environment. In some embodiments, one or more portions of the method 600 can be performed as part of the method 500 that is depicted in FIG. 5. Further, one or more portions of the method 600 can be performed as part of determining the localized state of the source object with respect to the environment as described in 506 of the method 500. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include generating a reconstructed target feature representation based at least in part on the compressed target feature representation and a machine-learned reconstruction model. In some embodiments, the reconstructed target feature representation can be a reconstruction of the target feature representation. For example, the operations computing system 104 can generate the reconstructed target feature representation by receiving the compressed target feature representation as an input to the machine-learned reconstruction model stored on the operations computing system 104 and using the machine-learned reconstruction model to reconstruct (e.g., decompress) the compressed target feature representation so that a higher precision, higher resolution reconstructed target feature representation is generated as an output.

At 604, the method 600 can include determining the localized state of the source object based at least in part on one or more comparisons of the source feature representation to the reconstructed target feature representation. For example, the operations computing system 104 can compare one or more features of the source feature representation to the reconstructed target feature representation to determine one or more matches between the source feature representation and the reconstructed target feature representation. Based at least in part on one or more matches between the source feature representation and the reconstructed target feature representation, the operations computing system 104 can determine the localized state of the source object.

Further, in some embodiments, the operations computing system 104 can determine one or more matching scores (e.g., position scores) based at least in part on the extent to which the source feature representation and the reconstructed target feature representation match. For example, the matching score can be based at least in part on one or more spatial and/or spectral similarities between the source feature representation and the reconstructed target feature representation. The operations computing system 104 can then determine the localized state of the source object based at least in part on the localized state of the source object that is associated with the highest matching score (e.g., a higher score can be associated with a greater accuracy of the localized state).

At 606, the method 600 can include determining one or more correlations between the target feature representation and the source feature representation based at least in part on a probabilistic inference model configured to encode agreement between the source feature representation and the reconstructed target feature representation indexed at the position of the source object. For example, the operations computing system 104 can implement a Bayesian inference model that uses prior beliefs about the position of the object (e.g., the previous position of the source object at previous time intervals) and a conditional probability distribution of the localized state of the source object to determine the localized state of the source object. Using the Bayesian inference model, the operations computing system 104 can determine that the localized state is associated with the highest conditional probability.

In some embodiments, the Bayesian inference model can be expressed as: $Bel_t(x) = Bel_{t|t-1}(x; \chi) \cdot P_{GPS}(\mathcal{G}_t|x) \cdot P_{LIDAR}($ $\mathcal{I}_t|x; w)$. $Bel_t(x)$ can represent a posterior distribution of the source object pose at time t given all the sensor observations until time step t. $x=\{t_x, t_y, \theta\}$ can represent a three-degrees of freedom pose for the source object. $P_{GPS}(G_t|x)$ can represent a set of GPS observations under a coordinate system (e.g., the target representation of the environment. $P_{LiDAR}(\mathcal{A}_t|x; w)$ can represent a set of LiDAR observations in which $\mathcal{A}_t$ can represent a LiDAR sweep (e.g., a LiDAR sweep associated with the source representation).

At 608, the method 600 can include rotating the source feature representation to a plurality of candidate angles. For example, the operations computing system 104 can perform one or more geometric transformations of the source feature representation including rotating the source feature representation to the plurality of candidate angles (e.g., rotating the source feature representation by two degrees in a counter-clockwise direction, one-hundred and eighty times).

At 610, the method 600 can include determining, at each of the plurality of candidate angles, whether the source feature representation matches the compressed target feature representation. For example, after the operations computing system 104 rotates the source feature representation to the plurality of candidate angles, the operations computing system 104 can determine at each candidate angle when the localized state of the source object in the target feature representation matches the state (e.g., position) of the source object within the source feature representation.

Figure 7:
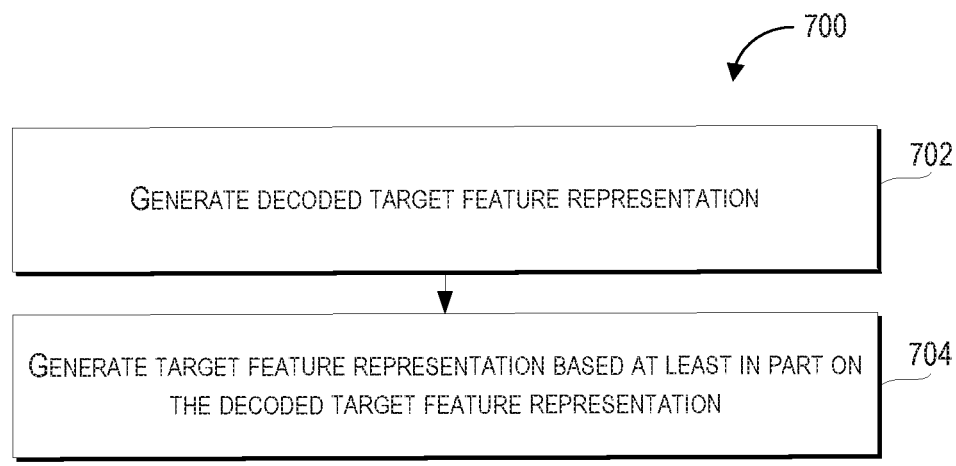
FIG. 7 depicts a flow diagram of an example method of feature compression and localization according to example embodiments of the present disclosure.

FIG. 7 depicts a flow diagram of an example method of feature compression and localization according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1) to, for example, generate outputs including estimated locations of objects in an environment based on different representations of the environment. In some embodiments, one or more portions of the method 700 can be performed as part of the method 500 that is depicted in FIG. 5 and/or the method 600 that is depicted in FIG. 6. Further, one or more portions of the method 700 can be performed as part of generating a reconstructed target feature representation based at least in part on the compressed target feature representation and a machine-learned reconstruction model as described in 602 of the method 600. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include generating a decoded target feature representation of the compressed target feature representation based at least in part on the one or more lossless compression operations and/or one or more machine-learned compression models. The one or more compression operations and/or the one or more machine-learned compression models can include one or more lossless binary encoding operations (e.g., lossless binary encoding operations in which no information is lost when the decoded target feature representation is generated based on the compressed target feature representation). For example, the operations computing system 104 can perform one or more Huffman decoding operations on a compressed target feature representation that was previously encoded using Huffman encoding.

At 704, the method 700 can include generating the target feature representation based at least in part on the decoded target feature representation and the machine-learned reconstruction model. For example, the operations computing system 104 can use the decoded target feature representation as an input to a machine-learned reconstruction model that is stored in a storage device of the operations computing system 104. Further, the machine-learned reconstruction model can then generate output including the reconstructed target feature representation.

Figure 8:
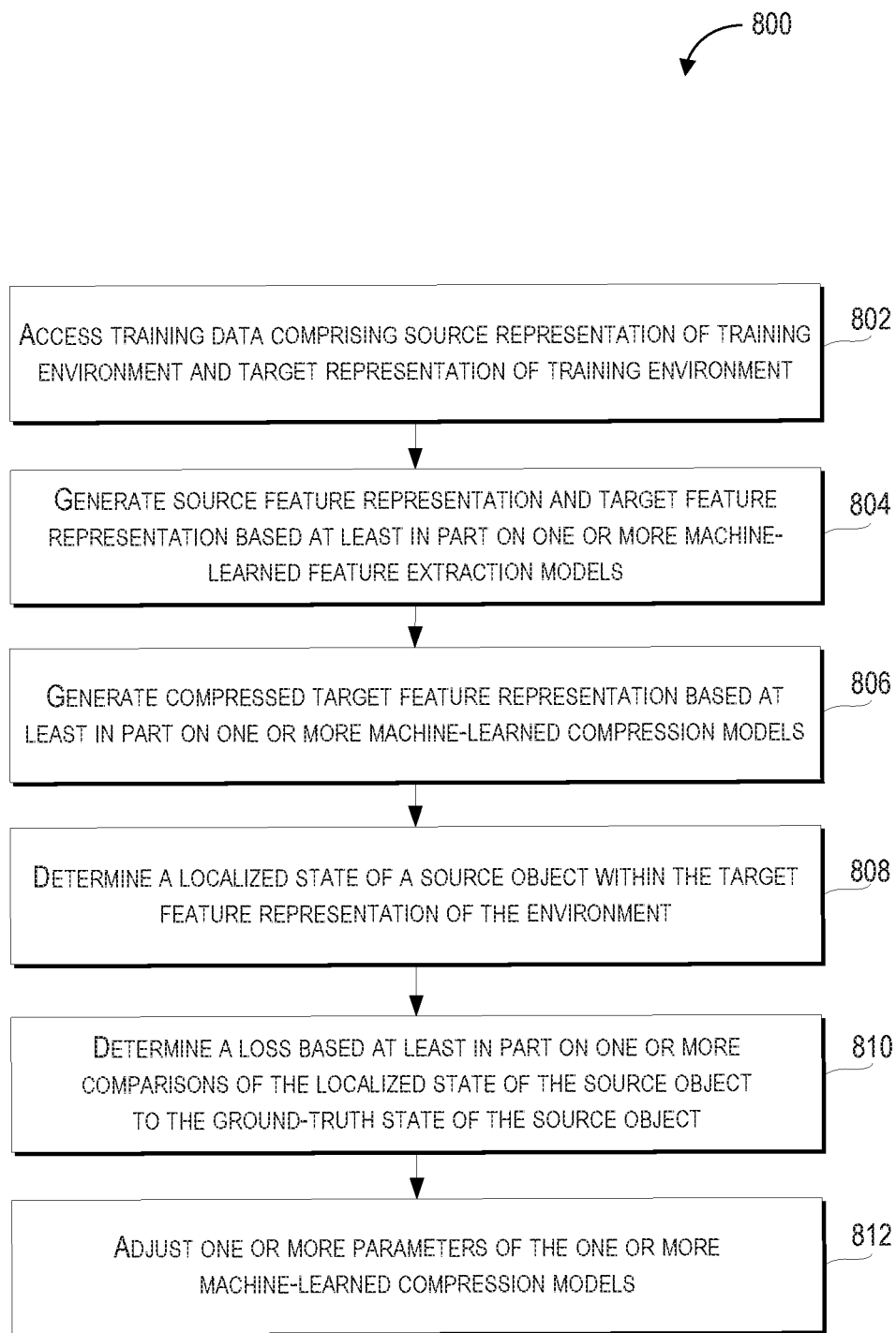
FIG. 8 depicts a flow diagram of an example method of feature compression and localization according to example embodiments of the present disclosure.

FIG. 8 depicts a flow diagram of an example method of feature compression and localization according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, generate outputs including estimated locations of objects in an environment based on different representations of the environment. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include accessing training data. The training data can include a source representation of a training environment and a target representation of the training environment. In some embodiments the source representation and/or the target representation of the training data can be based at least in part on, or can include, one or more sensor outputs from one or more sensors. The source representation can be associated with a ground-truth state (e.g., ground-truth position) of a source object in the training environment (e.g., the actual, completely accurate state of the source object in the training environment). In some embodiments, the ground-truth state of the source object can include an annotated position that is expressed in a human or computer-readable format (e.g., a ground-truth position associated with a latitude, longitude, and/or altitude). Different portions of the training data can be accessed serially or in parallel. For example, the operations computing system 104 can access training data stored in one or more storage devices of the operations computing system 104 and/or the one or more remote computing devices 106.

In some embodiments, the source representation and the target representation can be based on, or include, different types of information which can include different types of representations of the environment. For example, when the source representation can be based at least in part on one or more sensor outputs from a LiDAR device that detects an environment, and the target representation can be based on one or more aerial images of the same environment.

In some embodiments the training data, the target data (e.g., the compressed target feature representation), and/or the source data can be stored in one or more storage and/or one or more memory devices. The target data and/or the source data can be stored. Further, data associated with the target data and/or the source data can be stored including information associated with the time the target data and/or source data was stored, the time the target data and/or source data was captured, the time the target data and/or source data was accessed and/or modified, and/or the data size of the source data and/or the target data.

At 804, the method 800 can include generating a source feature representation and a target feature representation based at least in part on the one or more machine-learned feature extraction models accessing the source representation and the target representation respectively. For example, the operations computing system 104 can provide the source representation (e.g., training data including one or more images of the environment including the source object at the ground-truth state (e.g., ground-truth position) within the environment) and the target representation as inputs to the one or more machine-learned feature extraction models stored on the operations computing system 104.

In some embodiments, the one or more machine-learned feature extraction models that generate the source feature representation and the target feature representation are the same (e.g., a single machine-learned feature extraction model generates the source feature representation and the target feature representation). In some embodiments, the one or more machine-learned feature extraction models are different from one another (e.g., different machine-learned feature extraction models generate the source feature representation and the target feature representation). For example, the operations computing system 104 can store one or more machine-learned feature extraction models including a first machine-learned extraction model that is configured and/or trained to receive the source representation and generate the source feature representation and a second machine-learned model that is configured and/or trained to receive the target representation and generate the target feature representation.

At 806, the method 800 can include generating a compressed target feature representation of the target feature representation based at least in part on one or more machine-learned compression models. For example, the operations computing system 104 can generate the compressed target feature representation using one or more compression operations and/or one or more machine-learned compression models that reduce the precision and/or the data size of the target feature representation. For example, the operations computing system 104 can include one or more machine-learned compression models that are trained to receive the target feature representation as an input and generate the compressed target feature representation as an output. By way of further example, as part of using the one or more machine-learned compression models the operations computing system 104 can generate the compressed target feature representation by implementing one or more compression operations including Huffman encoding and/or run-length encoding on the target feature representation.

At 808, the method 800 can include determining a localized state of the source object within the compressed target feature representation of the environment based at least in part on the source feature representation and the compressed target feature representation. The localized state of the source object within the compressed target feature representation of the environment can include a location of the source object, a velocity of the source object (e.g., the velocity of the source object that is determined based on changes in the location of the source object over a plurality of compressed target feature representations), an orientation of the source object, and/or a position of the source object relative to some point of reference. Additionally or alternatively, the localized state of the source object can be expressed as a latitude, longitude, and/or trajectory when the compressed target feature representation is a map of an environment. For example, the operations computing system 104 can perform one or more operations including one or more transformations (e.g., spatial transformations) and/or one or more comparisons between the source feature representation and the compressed target feature representation to determine a localized state of the source object within the environment.

At 810, the method 800 can include determining a loss based at least in part on evaluation of one or more loss functions (e.g., a loss function that includes one or more variables associated with one or more features of a representation) and/or one or more comparisons of the localized state of the source object to the ground-truth state (e.g., ground-truth position, velocity, or orientation) of the source object. For example, the operations computing system 104 can perform one or more operations to evaluate one or more loss functions using values associated with the localized state of the source object to the ground-truth state of the source object as inputs for the one or more loss functions.

In some embodiments, minimization of the loss can be positively correlated with a more accurate localized state of the source object with respect to the ground-truth state of the source object. Further, the loss can be based at least in part on one or more evaluations of one or more loss functions that include variables associated with various aspects of the training data. For example, one or more features of the source feature representation and/or the compressed target feature representation can be provided as inputs to one or more loss functions associated with the loss, which can be iteratively evaluated to determine a minimum loss value and/or a loss value that is lower than some predetermined minimization threshold value.

Further, in some embodiments the loss can be determined based at least in part on the evaluation of one or more loss functions that are different, and which can in some embodiments have different weighting contributions to the loss. The loss function can be used to maximize the accuracy of the localized state source object with respect to the ground-truth state of the source object (e.g., the accuracy of the localized state is positively correlated with its proximity to the ground-truth state).

In some embodiments, the loss can be based at least in part on the loss function, $\ell = \ell_{LOC}(y, y_{GT}) + \lambda_1 \ell_{MDL}(p) + \lambda_2 \ell_{SPARSE}(p)$. The loss can be represented by $\ell$; the position can be represented by $\ell_{LOC}(y, y_{GT})$; the matching loss can be represented by $\lambda_1 \ell_{MDL}(p)$; the sparse loss can be represented by $\lambda_2 \ell_{SPARSE}(p)$; p can represent a representation (e.g., a target feature representation or a source feature representation); y can represent the final softmax-normalized matching score; and $y_{GT}$ can represent the one-hot representation of the ground-truth state.

At 812, the method 800 can include adjusting one or more parameters of the one or more machine-learned compression models based at least in part on the loss. The one or more parameters that can be adjusted (e.g., weighted differently) based at least in part on the contributions that each of the one or more parameters make in terms of minimizing the loss. For example, the operations computing system 104 can determine that the one or more parameters of the one or more machine-learned compression models that do not change the loss may be kept the same the one or more parameters that decrease the loss can be weighted more heavily (e.g., adjusted to increase their contribution to the loss), and the one or more parameters that increase the loss can have their weighting reduced (e.g., adjusted to reduce their contribution to the loss).

In some embodiments, adjusting the one or more parameters of the one or more machine-learned compression models can include adjusting one or more parameters of a machine-learned encoding model (e.g., the machine-learned encoding model of the method 900) based at least in part on the loss.

Figure 9:
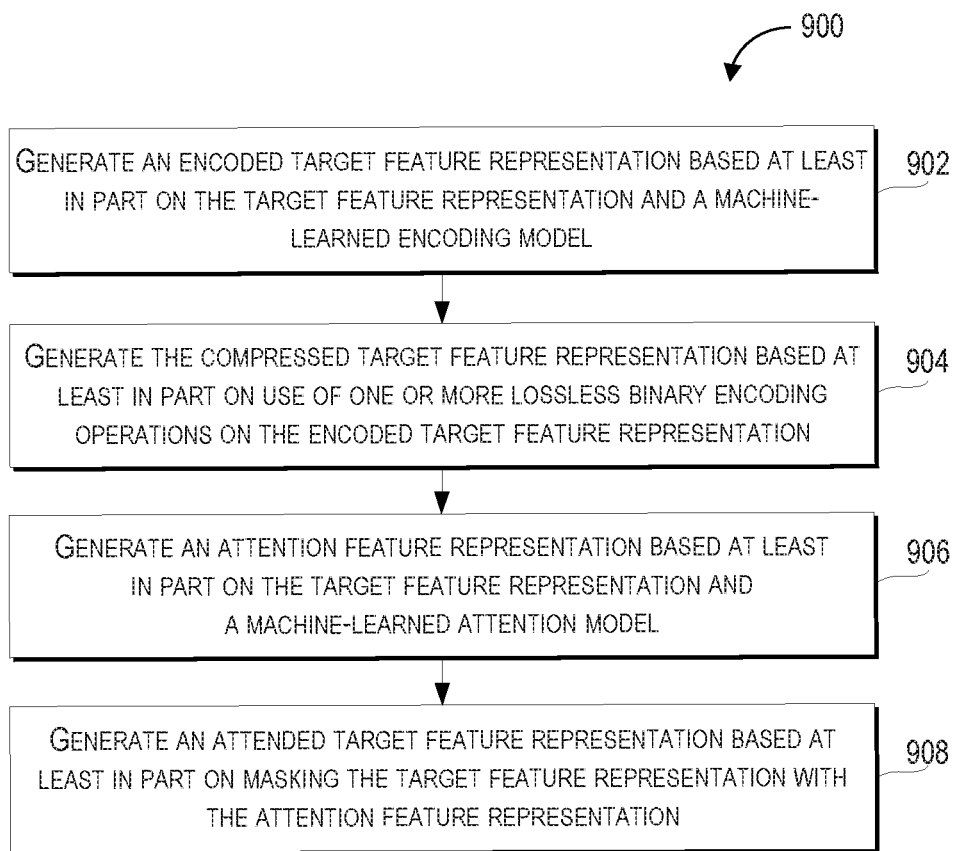
FIG. 9 depicts a flow diagram of an example method of feature compression and localization according to example embodiments of the present disclosure.

FIG. 9 depicts a flow diagram of an example method of feature compression and localization according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, generate outputs including estimated locations of objects in an environment based on different representations of the environment. In some embodiments, one or more portions of the method 900 can be performed as part of the method 800 that is depicted in FIG. 8. Further, one or more portions of the method 900 can be performed as part of generating a compressed target feature representation of the target feature representation based at least in part on one or more machine-learned compression models as described in 806 of the method 800. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include generating an encoded target feature representation of the target feature representation based at least in part on a machine-learned encoding model. For example, the operations computing system 104 can use the target feature representation as an input to a machine-learned encoding model that is stored on the operations computing system 104. The machine-learned encoding model can be configured and/or trained to perform one or more operations including generating the encoded target feature representation based at least in part on the input of the target feature representation.

At 904, the method 900 can include generating the compressed target feature representation based at least in part on use of one or more lossless binary encoding operations (e.g., binarization) on the encoded target representation. For example, the operations computing system 104 can perform one or more lossless encoding operations on the encoded target representation (e.g., the output of the machine-learned encoding model) that read the format of the encoded target representation and change the format of the encoded target representation into a binary format without losing any of the information in the encoded target representation. Further, the one or more lossless encoding operations implemented by the operations computing system 104 can include lossless operations that can compress the encoded target representation (e.g., Huffman encoding and/or run-length-encoding).

By way of further example, the one or more lossless binary encoding operations can be binarized in part using the following group softmax function:

$$p_j = \frac{\exp(f_j)}{\sum_{k \in S_j} \exp(f_k)}, b_j = \begin{cases} 1 & \text{if } p_j \geq 0.5 \\ 0 & \text{else} \end{cases}.$$

In the preceding group softmax function, softmax $p_j$ can represent the probability distribution for each pixel of the encoded target representation (e.g., an image with a plurality of pixels) and $b_j$ can represent the binarized output for each pixel of the encoded target representation (e.g., the pixel value is one when $p_j$ is greater than or equal to 0.5 and zero otherwise). Furthermore, the operations computing system 104 can use one or more features of the encoded target representation as an input to evaluate the group softmax function as part of the one or more lossless binary encoding operations.

At 906, the method 900 can include generating an attention feature representation based at least in part on the target feature representation and a machine-learned attention model. For example, the operations computing system 104 can include a machine-learned attention model that can receive an input including the target feature representation of an environment and generate an output including an attention feature representation. The attention feature representation can be used to mask one or more features of a representation based at least in part on the attention that is focused on those features. For example, in the context of generating a map, the machine-learned attention model can be trained to create a mask (the attention feature representation) that focuses attention on features that are useful for mapping applications including building features, body of water features, sidewalk features, and/or street features.

In some embodiments, the machine-learned attention model can be a convolutional neural network that is trained end-to-end. For example, the machine-learned attention model can be trained without the use of manually performed operations and/or supervised training of the machine-learned attention model.

At 908, the method 900 can include generating an attended target feature representation based at least in part on masking the target feature representation with the attention feature representation. For example, the operations computing system 104 can perform one or more operations to use the attention feature representation to mask one or more features of the target feature representation. By way of further example, the attention feature representation can be used to increase the sparsity of a target feature representation (e.g., in a binary representation in which features are associated with one's and non-features are associated with zeroes, increasing the sparsity can include increasing the portion of zeroes so that the features are more prominent).

In some embodiments, the compressed target feature representation can be based at least in part on the attended target feature representation. For example, the compressed target feature representation can be the same as the attended target feature representation or the compressed target feature representation can include one or more aspects of the attended target feature representation.

Figure 10:
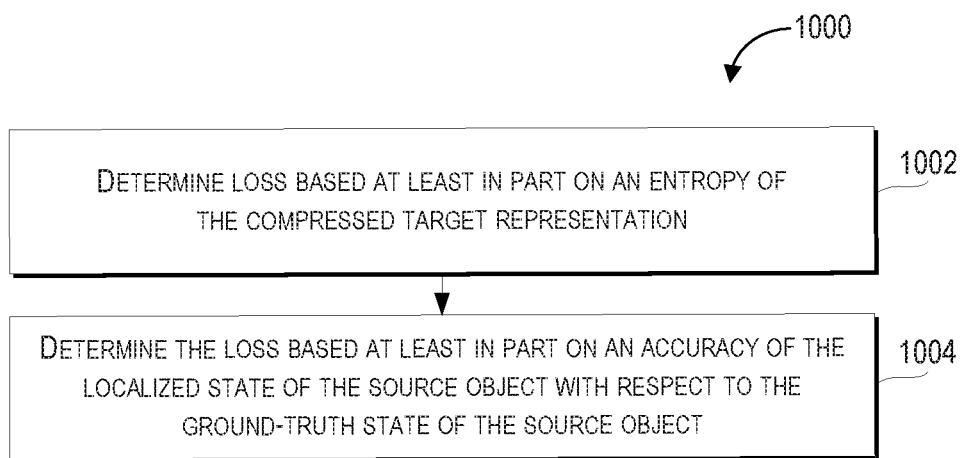
FIG. 10 depicts a flow diagram of an example method of feature compression and localization according to example embodiments of the present disclosure.

FIG. 10 depicts a flow diagram of an example method of feature compression and localization according to example embodiments of the present disclosure. One or more portions of a method 1000 can be implemented by one or more devices (e.g., one or more computing devices) or systems including, for example, the operations computing system 104, the vehicle 108, or the vehicle computing system 112, shown in FIG. 1. Moreover, one or more portions of the method 1000 can be implemented as an algorithm on the hardware components of the devices described herein (e.g., as in FIG. 1) to, for example, generate outputs including estimated locations of objects in an environment based on different representations of the environment. In some embodiments, one or more portions of the method 1000 can be performed as part of the method 800 that is depicted in FIG. 8. Further, one or more portions of the method 1000 can be performed as part of determining a loss as described in 810 of the method 800. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include determining the loss based at least in part on an entropy associated with the compressed target feature representation. For example, the operations computing system 104 can determine the loss based at least in part on performance of one or more operations to evaluate a compression loss function for which a compression loss is minimized based at least in part on the entropy which can be associated with a lower bound for the encoding that is used. The entropy can be based at least in part on a data size of the compressed target feature representation. Further, the entropy can be positively correlated with the data size (e.g., the lower the entropy, the smaller the data size).

At 1004, the method 1000 can include determining a loss based at least in part on based at least in part on an accuracy of the localized state (e.g., the estimated position, location, orientation, velocity, or heading) of the source object with respect to the ground-truth state (e.g., the actual position, location, orientation, velocity, or heading) of the source object. The accuracy can be inversely correlated with the loss (e.g., a greater accuracy is associated with a lower loss). For example, the operations computing system 104 can determine the loss based at least in part on performance of one or more operations to evaluate a matching loss function for which a matching loss is minimized based at least in part on the accuracy of the localized state. The accuracy can be based at least in part on the similarity of the localized state of the source object to the ground-truth state of the source object. Further, in some embodiments, the accuracy can be associated with a distance of the localized state of the source object from the ground-truth state of the source object (e.g., greater accuracy is associated with a shorter distance between the localized state of the source object and the ground-truth state of the source object).

Figure 11:
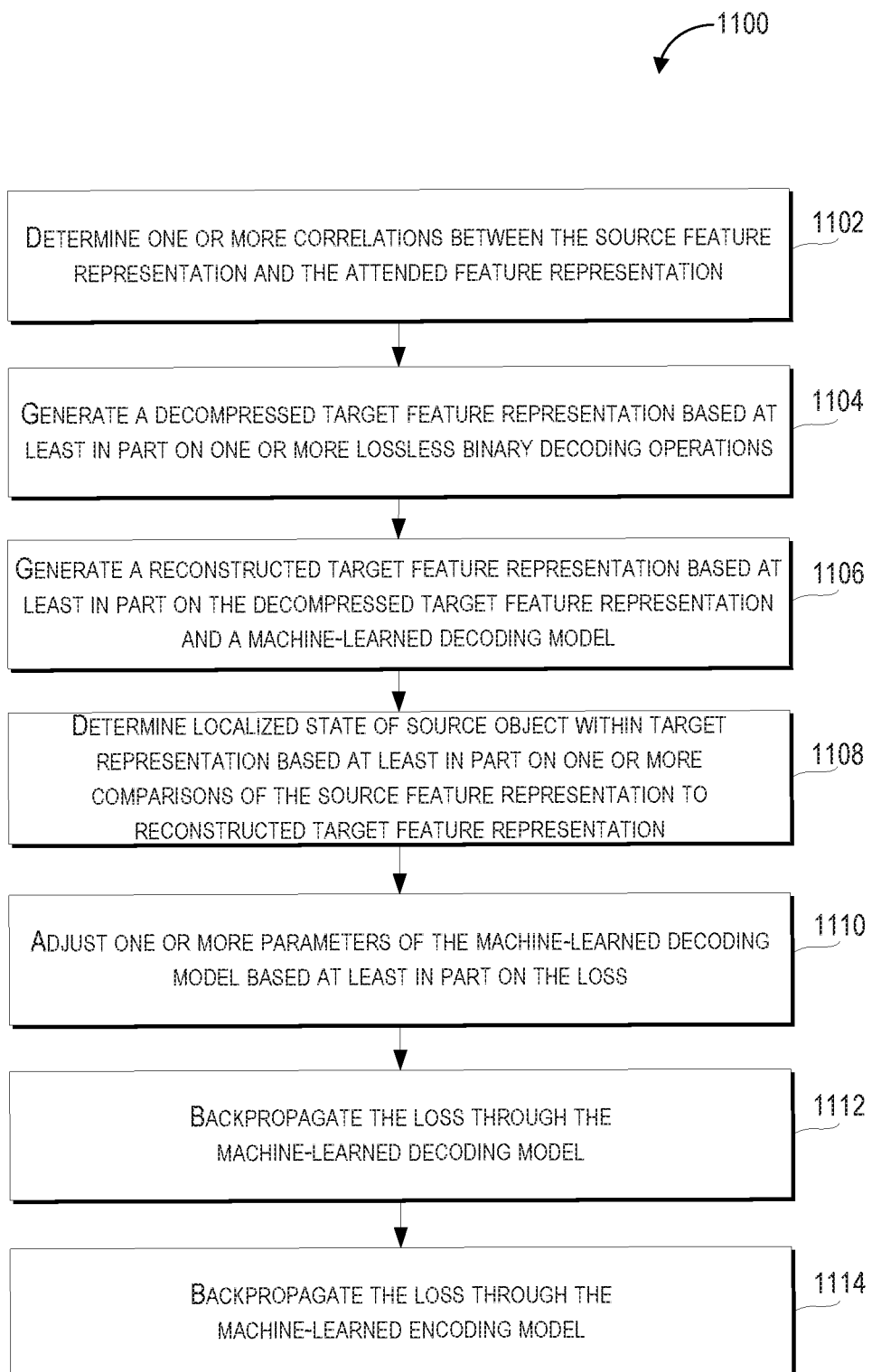
FIG. 11 depicts a flow diagram of an example method of feature compression and localization according to example embodiments of the present disclosure.

FIG. 11 depicts a flow diagram of an example method of feature compression and localization according to example embodiments of the present disclosure. One or more portions of a method 1100 can be implemented by one or more devices (e.g., one or more computing devices) or systems including, for example, the operations computing system 104, the vehicle 108, or the vehicle computing system 112, shown in FIG. 1. Moreover, one or more portions of the method 1100 can be implemented as an algorithm on the hardware components of the devices described herein (e.g., as in FIG. 1) to, for example, generate outputs including estimated locations of objects in an environment based on different representations of the environment. In some embodiments, one or more portions of the method 1100 can be performed as part of the method 800 that is depicted in FIG. 8. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1102, the method 1100 can include determining one or more correlations between the source feature representation and the attended feature representation. For example, in some embodiments, the operations computing system 104 can perform one or more operations including using a correlation operator to determine one or more correlations of the source feature representation with respect to the attended feature representation.

At 1104, the method 1100 can include generating a decompressed target feature representation based at least in part on one or more lossless binary decoding operations. For example, the operations computing system 104 can generate a decompressed target feature representation based at least in part on one or more lossless binary decoding operations performed on the compressed target feature representation. The one or more lossless binary decoding operations can include reconstructing the compressed target feature representation to the same state (e.g., the state of the target feature representation) it was in before being compressed.

At 1106, the method 1100 can include generating a reconstructed target feature representation based at least in part on the decompressed target feature representation and a machine-learned decoding model. For example, the operations computing system 104 can generate the reconstructed target feature representation by receiving the decompressed target feature representation as an input to the machine-learned decoding model, that has been configured and/or trained to decode the decompressed target feature representation and generate the reconstructed target feature representation as an output.

At 1108, the method 1100 can include determining the localized state of the source object within the target representation of the environment based at least in part on one or more comparisons of the source feature representation to the reconstructed target feature representation. For example, the operations computing system 104 can compare one or more aspects of the source feature representation to the reconstructed target feature representation to determine one or more matches and/or one or more similarities between the source feature representation and the reconstructed target feature representation. The one or more matches can be based at least in part on the source feature representation and the reconstructed target feature representation having one or more features in common. Further, based at least in part on one or more comparisons between the source feature representation and the reconstructed target feature representation, the operations computing system 104 can determine the localized state of the source object.

At 1110, the method 1100 can include adjusting the one or more parameters of at least one of the machine-learned encoding model and the machine-learned decoding model based at least in part on the loss. The machine-learned encoding model and/or the machine-learned decoding model can include one or more parameters that can be adjusted based at least in part on the contributions that each of the one or more parameters make in terms of minimizing the loss. For example, the operations computing system 104 can determine that one or more parameters of the machine-learned encoding model that do not change (e.g., have an effect on) the loss may be kept the same (e.g., not adjusted), the one or more parameters that decrease the loss can be weighted more heavily, and the one or more parameters that increase the loss can have their weighting reduced.

At 1112, the method 1100 can include backpropagating the loss through the machine-learned decoding model. For example, the operations computing system 104 can determine a gradient associated with the loss (e.g., a gradient associated with the loss and the weighting of each parameter respectively) based at least in part on one or more differences between the actual output and the expected output (e.g., a ground-truth output) of the machine-learned encoding model. The gradient of the loss function can be used in the determination of the weighting of the one or more parameters of the machine-learned encoding model by determining the minimum value along the gradient. Furthermore, in some embodiments, backpropagating the loss through the machine-learned decoding model can include straight through estimation that bypasses the one or more decoding operations, one or more encoding operations, one or more machine-learned compression models, and/or the one or more compression operations. For example, the operations computing system 104 can substitute the use of the one or more decoding operations, one or more encoding operations, and one or more compression operations with the use of an identity function that serves as an approximation of the gradient.

At 1114, the method 1100 can include backpropagating the loss through the machine-learned encoding model. For example, the operations computing system 104 can determine the gradient associated with the loss based at least in part on one or more differences between the actual output and the ground-truth output of the machine-learned encoding model. The gradient of the loss function can be used in the determination of the weighting of the one or more parameters of the machine-learned encoding model by determining the minimum value along the gradient.

Figure 12:
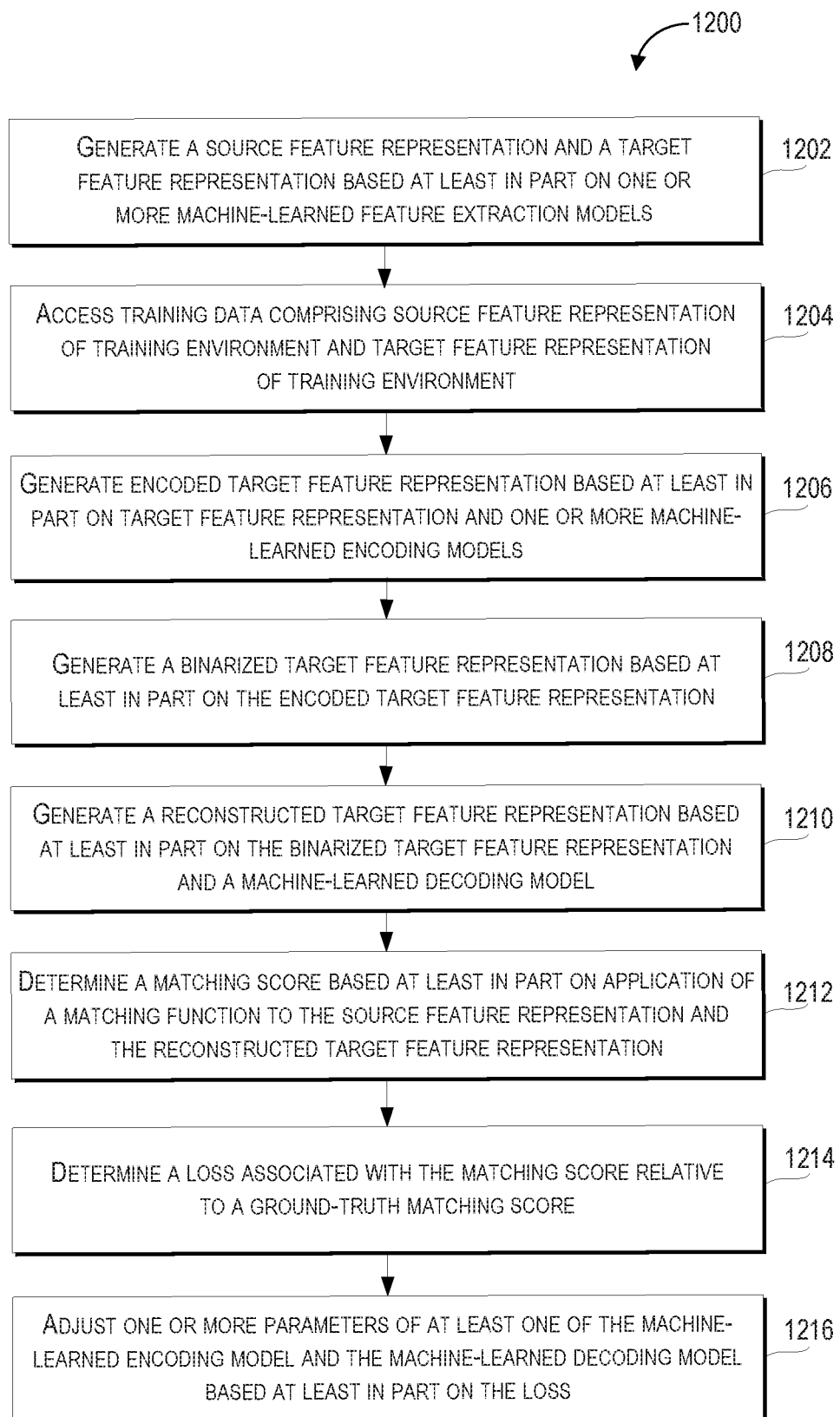
FIG. 12 depicts a flow diagram of an example method of feature compression and localization according to example embodiments of the present disclosure.

FIG. 12 depicts a flow diagram of an example method of feature compression and localization according to example embodiments of the present disclosure. One or more portions of a method 1200 can be implemented by one or more devices (e.g., one or more computing devices) or systems including, for example, the operations computing system 104, the vehicle 108, or the vehicle computing system 112, shown in FIG. 1. Moreover, one or more portions of the method 1200 can be implemented as an algorithm on the hardware components of the devices described herein (e.g., as in FIG. 1) to, for example, generate outputs including estimated locations of objects in an environment based on different representations of the environment. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1202, the method 1200 can include generating at least one of the source feature representation and the target feature representation based at least in part on one or more machine-learned feature extraction models. For example, the operations computing system 104 can use the source data (e.g., source data including the source representation that includes one or more LiDAR sensor outputs associated with detection of an environment) as an input to the one or more machine-learned feature extraction models, that have been trained to access the input and perform one or more operations including generating an output including the source feature representation. Furthermore, in some embodiments, the source feature representation can have the same spatial resolution as the source representation and a lower spectral resolution than the source representation.

At 1204, the method 1200 can include accessing training data. The training data can include a source representation of a training environment and a target representation of the training environment. In some embodiments the source representation and/or the target representation of the training data can include different representations of the same environment. For example, the operations computing system 104 can access training data including source representation based at least in part on, or including, one or more sensor outputs from one or more sensors including at least one of: one or more light detection and ranging devices (LiDAR), one or more sonar devices, one or more radar devices, and/or one or more cameras. Further, the target representation of the training data can be based at least in part on, or can include one or more images (e.g., map images) of the environment; and the source of the training data can be based on or include, one or more sensor outputs associated with detection of the environment.

At 1206, the method 1200 can include generating an encoded target representation based at least in part on the target feature representation and a machine-learned encoding model. For example, the operations computing system 104 can encode the target feature representation based at least in part on use of the target feature representation as an input to a machine-learned encoding model that is trained to perform one or more operations including generating the compressed target feature representation based at least in part on the input including the target feature representation.

At 1208, the method 1200 can include generating a binarized target feature representation based at least in part on the encoded target feature representation and one or more lossless binary encoding operations. For example, the operations computing system 104 can perform one or more lossless encoding operations on the encoded target representation (e.g., the output of the machine-learned coding model) that read the format of the encoded target representation and generate the binarized target feature representation in a binary format without losing any of the information in the encoded target representation. Further, the one or more lossless encoding operations can include lossless operations that can compress the encoded target representation (e.g., Huffman encoding and/or run-length-encoding).

At 1210, the method 1200 can include generating a reconstructed target feature representation based at least in part on the binarized target feature representation and a machine-learned decoding model. For example, the operations computing system 104 can generate the reconstructed target feature representation by receiving the binarized target feature representation as an input to the machine-learned decoding model, that has been configured and/or trained to decode (e.g., decompress) the binarized target feature representation and generate the reconstructed target feature representation as an output.

At 1212, the method 1200 can include determining a matching score based at least in part on application of a matching function to the source feature representation and the reconstructed target feature representation. For example, the operations computing system 104 can determine the matching score based at least in part on use of one or more machine-learned models configured to compare and determine differences between one or more features of the source feature representation (e.g., a LiDAR point cloud of the environment) and the reconstructed target feature representation (e.g., a raster image of the environment).

At 1214, the method 1200 can include determining a loss associated with the matching score for the source feature representation and the reconstructed target feature representation relative to a ground-truth matching score for the source feature representation and the reconstructed target feature representation. For example, the operations computing system 104 can perform one or more operations to evaluate one or more loss functions using values associated with the matching score for the source feature representation and the reconstructed target feature representation and the ground-truth matching score as inputs for the one or more loss functions.

In some embodiments, minimization of the loss can be positively correlated with greater accuracy corresponding to greater similarity between the matching score relative to the ground-truth matching score.

At 1216, the method 1200 can include adjusting the one or more parameters of at least one of the machine-learned encoding model and the machine-learned decoding model based at least in part on the loss. The machine-learned encoding model and/or the machine-learned decoding model can include one or more parameters that can be adjusted based at least in part on the contributions that each of the one or more parameters make in terms of minimizing the loss. For example, the operations computing system 104 can determine that one or more parameters of the machine-learned encoding model that do not change (e.g., have an effect on) the loss may be kept the same (e.g., not adjusted), the one or more parameters that decrease the loss can be weighted more heavily, and the one or more parameters that increase the loss can have their weighting reduced.

Figure 13:
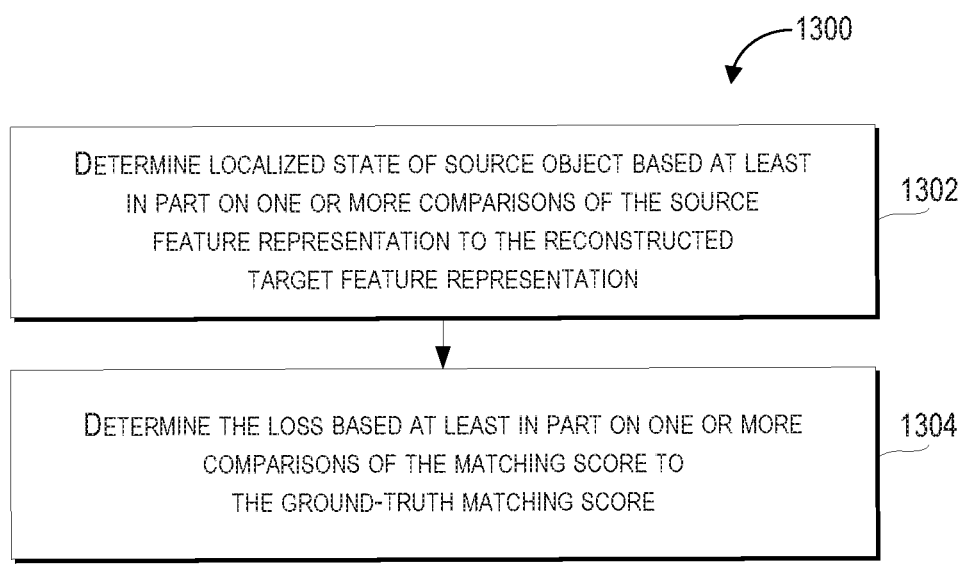
FIG. 13 depicts a flow diagram of an example method of feature compression and localization according to example embodiments of the present disclosure.

FIG. 13 depicts a flow diagram of an example method of feature compression and localization according to example embodiments of the present disclosure. One or more portions of a method 1300 can be implemented by one or more devices (e.g., one or more computing devices) or systems including, for example, the operations computing system 104, the vehicle 108, or the vehicle computing system 112, shown in FIG. 1. Moreover, one or more portions of the method 1300 can be implemented as an algorithm on the hardware components of the devices described herein (e.g., as in FIG. 1) to, for example, generate outputs including estimated locations of objects in an environment based on different representations of the environment. In some embodiments, one or more portions of the method 1300 can be performed as part of the method 1200 that is depicted in FIG. 12. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1302, the method 1300 can include determining a localized state (e.g., an estimated position, location, orientation, heading, velocity, or acceleration) of a source object in the training environment based at least in part on one or more comparisons of the source feature representation to the reconstructed target feature representation. For example, the operations computing system 104 can compare one or more aspects of the source feature representation to the reconstructed target feature representation to determine one or more matches between the source feature representation and the reconstructed target feature representation. In some embodiments, the loss is a total loss that is based at least in part on at least one of a matching loss and a compression loss. The matching loss can be based at least in part on an accuracy of the matching score with respect to the ground-truth matching score. For example, the operations computing system 104 can determine the matching loss based at least in part on evaluation of a matching loss function for which a matching loss is minimized.

Further, the compression loss can be based at least in part on a data size of the reconstructed target feature representation. For example, the operations computing system 104 can determine the compression loss based at least in part on evaluation of a compression loss function for which a compression loss is minimized.

In some embodiments, the loss can be based at least in part on evaluation of a loss function based at least in part on a regularization term that is used to increase sparsity of the binarized target feature representation. For example, the operations computing system 104 can use the regularization term to minimize the entropy of each pixel in the binarized target feature representation (e.g., a two-dimensional image) by making the binary representation more sparse.

At 1304, the method 1300 can include determining the loss based at least in part on evaluation of one or more loss functions (e.g., a loss function that includes one or more variables associated with one or more features) and/or one or more comparisons of the matching score and the ground-truth matching score. For example, the operations computing system 104 can implement one or more operations to minimize the loss by evaluating one or more loss functions including the matching loss and/or the compression loss of 1302. In some embodiments, minimization of the loss is positively correlated with a matching score that is more similar or closer to the ground-truth matching score).

Figure 14:
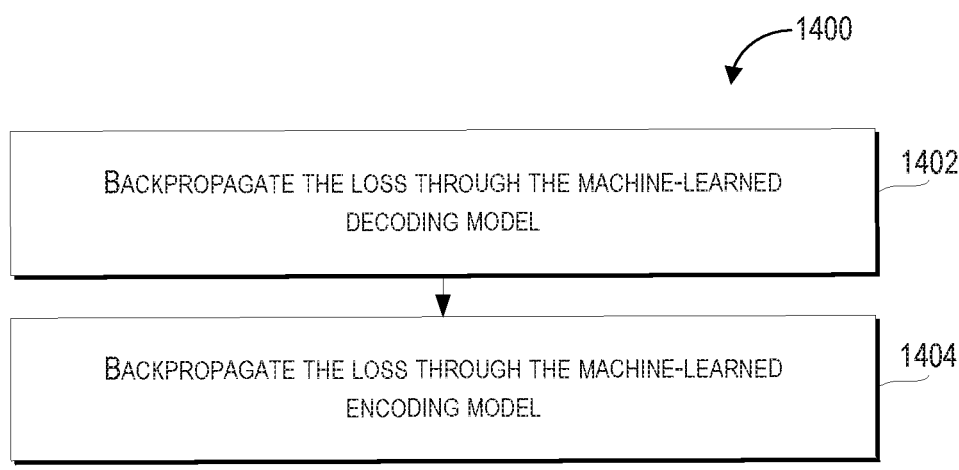
FIG. 14 depicts a flow diagram of an example method of feature compression and localization according to example embodiments of the present disclosure.

FIG. 14 depicts a flow diagram of an example method of feature compression and localization according to example embodiments of the present disclosure. One or more portions of a method 1400 can be implemented by one or more devices (e.g., one or more computing devices) or systems including, for example, the operations computing system 104, the vehicle 108, or the vehicle computing system 112, shown in FIG. 1. Moreover, one or more portions of the method 1400 can be implemented as an algorithm on the hardware components of the devices described herein (e.g., as in FIG. 1) to, for example, generate outputs including estimated locations of objects in an environment based on different representations of the environment. In some embodiments, one or more portions of the method 1400 can be performed as part of the method 1200 that is depicted in FIG. 12. Further, one or more portions of the method 1300 can be performed as part of adjusting the one or more parameters of at least one of the machine-learned encoding model and the machine-learned decoding model based at least in part on the loss as described in 1216 of the method 1200. FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1402, the method 1400 can include backpropagating the loss through the machine-learned decoding model. For example, the operations computing system 104 can determine the gradient associated with the loss based at least in part on one or more differences between the actual output and the ground-truth output of the machine-learned encoding model. The gradient of the loss function can be used in the determination of the weighting of the one or more parameters of the machine-learned encoding model by determining the minimum point along the gradient. Furthermore, in some embodiments, backpropagating the loss through the machine-learned decoding model can include straight through estimation that bypasses the one or more encoding operations, the one or more machine-learned compression models, and/or the one or more compression operations. For example, the operations computing system 104 can substitute the use of the one or more lossless binary encoding operations, the one or more binary decoding operations, the one or more machine-learned compression models, and/or the one or more compression operations with the use of an identity function that serves as an approximation of the gradient.

At 1404, the method 1400 can include backpropagating the loss through the machine-learned encoding model. In some embodiments, straight through estimation that bypasses the one or more lossless binary encoding operations, the one or more machine-learned compression models, and/or the one or more compression operations can be used. For example, the operations computing system 104 can substitute the use of the one or more lossless binary encoding operations, the one or more binary decoding operations, and/or the one or more compression operations with the use of an identity function.

Figure 15:
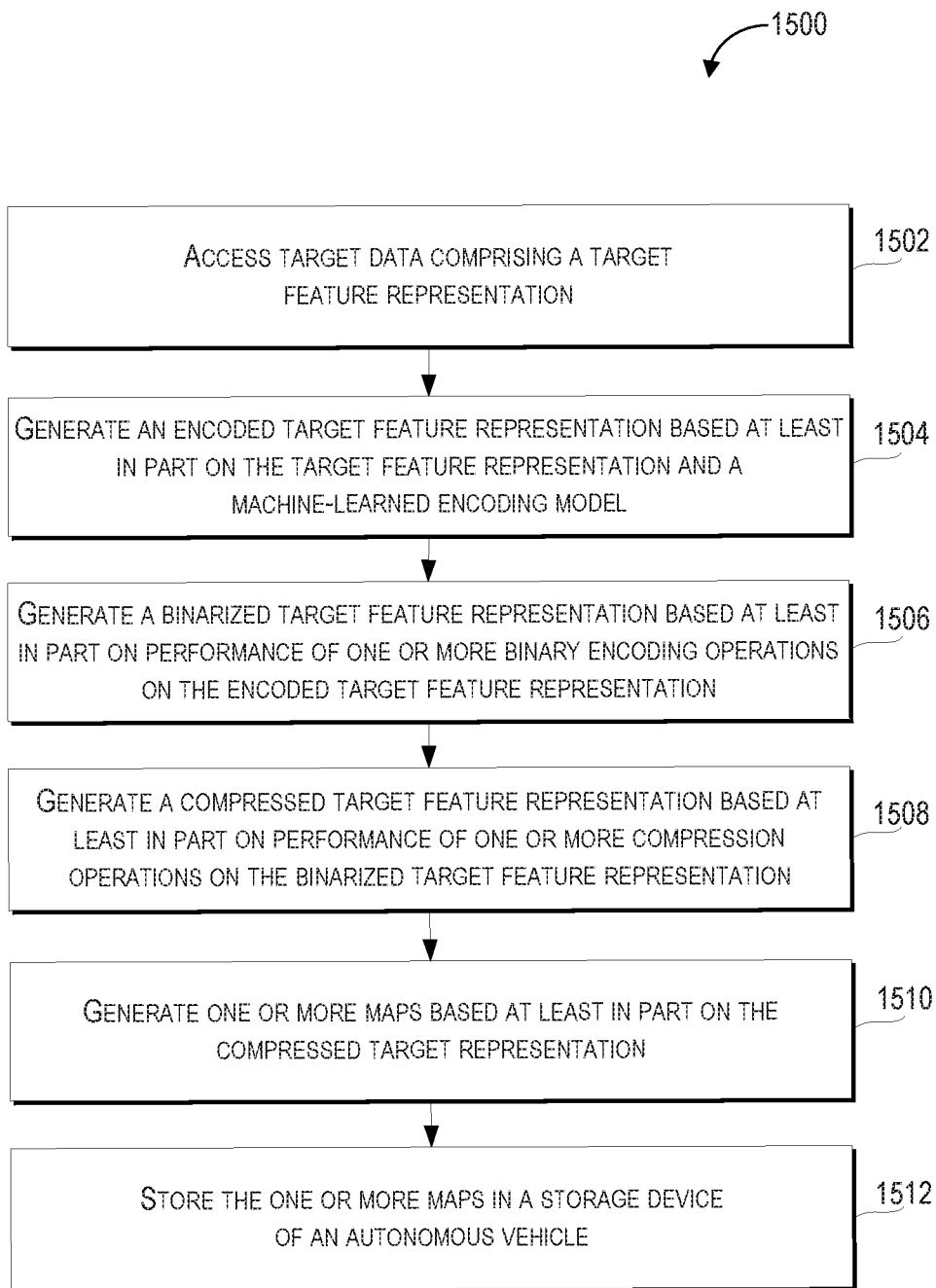
FIG. 15 depicts a flow diagram of an example method of feature compression and localization according to example embodiments of the present disclosure.

FIG. 15 depicts a flow diagram of an example method of feature compression and localization according to example embodiments of the present disclosure. One or more portions of a method 1500 can be implemented by one or more devices (e.g., one or more computing devices) or systems including, for example, the operations computing system 104, the vehicle 108, or the vehicle computing system 112, shown in FIG. 1. Moreover, one or more portions of the method 1500 can be implemented as an algorithm on the hardware components of the devices described herein (e.g., as in FIG. 1) to, for example, generate outputs including estimated locations of objects in an environment based on different representations of the environment. FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1502, the method 1500 can include accessing target data. For example, the operations computing system 104 can access target data stored in one or more storage devices of the vehicle computing system. In some examples, the target data can be based at least in part on, or can include, information associated with one or more sensor outputs from one or more sensors including one or more LiDAR devices. Further, one or more portions of the target data can be accessed concurrently and/or at different times. The environment can include any area or space and can include any combination of a natural environment, a human-made environment (e.g., a city or highway), a simulated environment (e.g., an environment generated by one or more computing systems), and/or any type of geographic environment. Further, the target data can include a compressed target feature representation of the environment.

In some embodiments the target data can be based at least in part on, or can include, one or more aerial images of the environment, one or more satellite images of the environment, and/or one or more maps of the environment.

At 1504, the method 1500 can include generating an encoded target feature representation based at least in part on the target feature representation and a machine-learned encoding model. For example, the operations computing system 104 can generate the encoded target feature representation by using the target feature representation as an input to a machine-learned encoding model that is configured to perform one or more operations including generating the encoded target feature representation based at least in part on the input of the target feature representation. In some embodiments, the machine-learned encoding model can be a residual convolutional neural network.

In some embodiments, the machine-learned encoding model can be configured and/or trained based at least in part on joint training with a machine-learned decoding model configured to generate a reconstructed target feature representation based at least in part on the binarized target feature representation. For example, the machine-learned encoding model and the machine-learned decoding model can be concurrently trained using the same binarized target feature representation and reconstructed target feature representation. In some embodiments, the reconstructed target feature representation is a reconstruction of the target feature representation.

In some embodiments, at least one of the machine-learned encoding model and the machine-learned decoding model are configured and/or trained based at least in part on evaluation of a compression loss function associated with a matching score for source feature representation of the environment and the reconstructed target feature representation relative to a ground-truth matching score.

At 1506, the method 1500 can include generating a binarized target feature representation based at least in part on performance of one or more binary encoding operations on the encoded target feature representation. For example, the operations computing system 104 can generate the binarized target feature representation (e.g., a binary representation of the target feature representation) by performing one or more binarization operations on the encoded target representation. The one or more binarization operations can include receiving the encoded target feature representation as an input that is passed through a binarization function that is evaluated and generates a binary output based at least in part on the encoded target feature representation.

At 1508, the method 1500 can include generating a compressed target feature representation of the encoded target feature representation based at least in part on performance of one or more compression operations on the binarized target feature representation. For example, the operations computing system 104 can generate the compressed target feature representation (e.g., a binary representation of the target feature representation) by performing one or more compression operations on the encoded target representation. The one or more compression operations can include receiving the encoded target feature representation as an input that is passed through one or more compression functions that are evaluated and that generate the compressed target feature representation as an output.

In some embodiments, the one or more compression operations can reconstruct the compressed target feature representation without loss of information encoded in the target feature representation.

In some embodiments, the one or more compression operations can be based at least in part on a frequency of occurrence of one or more portions of the binarized target feature representation, and one or more subsequent encoding operations are based at least in part on one or more redundancies in one or more portions of the binarized target feature representation. For example, the operations computing system 104 can generate a dictionary based on the frequency of occurrence of one or more portions of the binarized target feature representation and encode the binarized target frequency representation using the dictionary.

In some embodiments, the one or more compression operations can include one or more Huffman encoding operations and/or one or more Run-Length-Encoding operations. Furthermore, in some embodiments, the one or more Huffman encoding operations can be performed prior to the one or more Run-Length-Encoding operations.

At 1510, the method 1500 can include generating one or more maps of the environment based at least in part on the compressed target feature representation. For example, the operations computing system 104 can generate a compressed target feature representation including one or more images of an environment that uses less storage space than the target representation on which the compressed target feature representation is based.

At 1512, the method 1500 can include storing the one or more maps in a storage device or memory of the computing device and/or an autonomous vehicle associated with the computing device. For example, the vehicle computing system 112 can receive, via a communications network, the one or more maps from the operations computing system 104 and storing the one or more maps for future use including localization of the autonomous vehicle which can include the vehicle 108.

Figure 16:
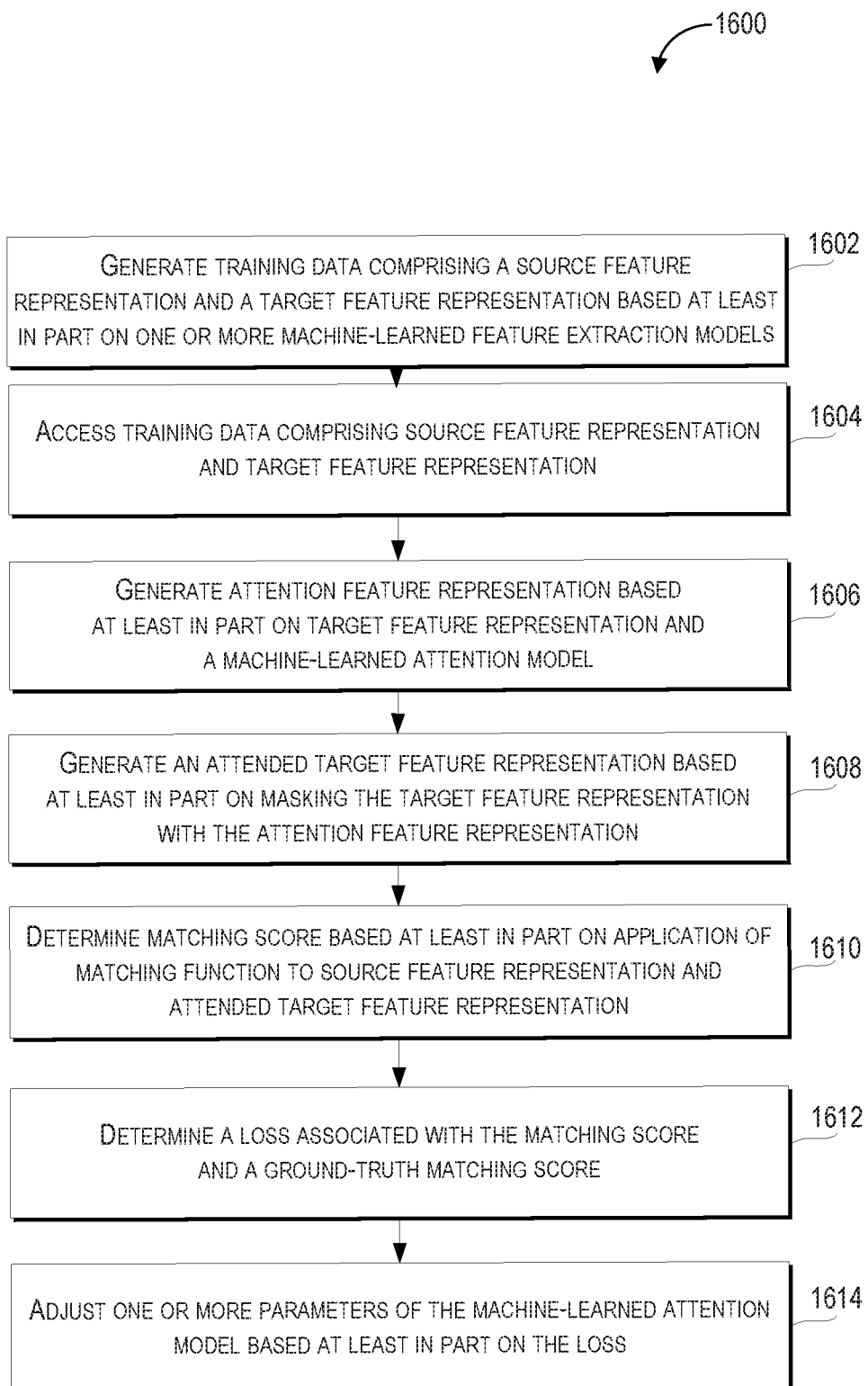
FIG. 16 depicts a flow diagram of an example method of feature compression and localization according to example embodiments of the present disclosure.

FIG. 16 depicts a flow diagram of an example method of feature compression and localization according to example embodiments of the present disclosure. One or more portions of a method 1600 can be implemented by one or more devices (e.g., one or more computing devices) or systems including, for example, the operations computing system 104, the vehicle 108, or the vehicle computing system 112, shown in FIG. 1. Moreover, one or more portions of the method 1600 can be implemented as an algorithm on the hardware components of the devices described herein (e.g., as in FIG. 1) to, for example, generate outputs including estimated locations of objects in an environment based on different representations of the environment. FIG. 16 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1602, the method 1600 can include generating the training data including at least one of the source feature representation and the target feature representation based at least in part on one or more machine-learned feature extraction models. For example, the operations computing system 104 can use the target data and source data as inputs to the one or more machine-learned feature extraction models, which can respectively receive the inputs and generate outputs including the target feature representation and the source feature representation respectively.

At 1604, the method 1600 can include accessing training data. The training data can include a source representation of a training environment and a target representation of the training environment. For example, the operations computing system 104 can access training data that is stored locally on the operations computing system 104 or remotely on the one or more remote computing devices 106. In some embodiments the source representation and/or the target representation of the training data can include different representations of the same environment. For example, the source representation can be based at least in part on, or can include, one or more sensor outputs from one or more sensors including at least one of: one or more light detection and ranging devices (LiDAR), one or more sonar devices, one or more radar devices, and/or one or more cameras.

Further, the target representation of the training data can be based at least in part on, or can include one or more maps of the environment. The source representation and/or the target representation of the training data can also be based on or include, one or more images of the environment.

At 1606, the method 1600 can include generating an attention feature representation based at least in part on the target feature representation and a machine-learned attention model. For example, the operations computing system 104 can use a machine-learned attention model that can receive an input including the target feature representation of an environment and generate an output including an attention feature representation. The attention feature representation can be used to mask one or more features of a representation based at least in part on the attention that is focused on those features. For example, in the context of generating a map, the machine-learned attention model can be trained to create a mask (the attention feature representation) that focuses attention on features that are useful for mapping applications including building features, river features, bridge features, canal features, street features, and/or road features.

In some embodiments, the machine-learned attention model can be a convolutional neural network that is trained end-to-end. For example, the machine-learned attention model can be trained without the use of manually performed operations and/or supervised training of the machine-learned attention model.

At 1608, the method 1600 can include generating an attended target feature representation based at least in part on masking the target feature representation with the attention feature representation. For example, the operations computing system 104 can perform one or more operations to use the attention feature representation to mask one or more features of the target feature representation. By way of further example, the attention feature representation can be used to increase the sparsity of a target feature representation.

In some embodiments, the compressed target feature representation can be based at least in part on the attended target feature representation. For example, the compressed target feature representation can be the same as the attended target feature representation or the compressed target feature representation can include one or more aspects of the attended target feature representation.

At 1610, the method 1600 can include determining a matching score based at least in part on application of a matching function to the source feature representation and the attended target feature representation. For example, the operations computing system 104 can determine a matching score based at least in part on use of a matching function that determines one or more similarities between one or more features of the source feature representation (e.g., a three-dimensional representation of an environment based on sonar detection of the environment) and the attended target feature representation (e.g., an aerial image of the environment).

At 1612, the method 1600 can include determining a loss associated with the matching score for the source feature representation and the target feature representation relative to a ground-truth matching score for the source feature representation and the target feature representation. For example, the operations computing system 104 can determine the loss based at least in part on evaluation of one or more loss functions (e.g., a loss function that includes one or more variables associated with one or more features) and/or one or more comparisons of the matching score to the ground-truth matching score.

In some embodiments, the loss associated with the matching score relative to a ground-truth matching score can be based at least in part on evaluation of the loss function: $\ell = \ell_{match}(y, y_{GT}) + \lambda_{latt}(\Omega)$. The loss can be represented by $\ell$; the matching loss can be represented by $\ell_{match}(y, y_{GT})$; the sparsity inducing loss can be represented by $\lambda_{latt}(\Omega)$; y can represent a localized state; and $y_{GT}$ can represent a ground-truth position. For example, the operations computing system 104 can determine the loss based at least in part on evaluation of the immediately preceding loss function.

In some embodiments, the loss can be based at least in part on a matching loss and a sparsity-inducing loss. The matching loss can be associated with a loss function that is used to determine one or more matches between the attended target feature representation and the source feature representation. The sparsity-inducing loss can be associated with increasing the sparsity of the attended feature representation. Increasing sparsity of the attended feature representation can, after the performance of one or more compressions operations on the attended feature representation, result in a reduction in the data size of the attended feature representation.

At 1614, the method 1600 can include adjusting one or more parameters of the machine-learned attention model based at least in part on the loss. The machine-learned attention model can include one or more parameters that can be adjusted based at least in part on the contributions that each of the one or more parameters make in terms of minimizing the loss. For example, the operations computing system 104 can determine one or more parameters of the machine-learned attention model that do not change the loss (e.g., e.g., cause the loss to increase or decrease) may be kept the same (e.g., not adjusted), the one or more parameters that decrease the loss can be weighted more heavily, and the one or more parameters that increase the loss can have their weighting reduced. Adjustment of the one or more parameters of the machine-learned attention model over a plurality of iterations can result in a lower loss which can correspond to greater similarity or closeness of the matching score relative to a ground-truth matching score (e.g., more effective focus of attention).

Figure 17:
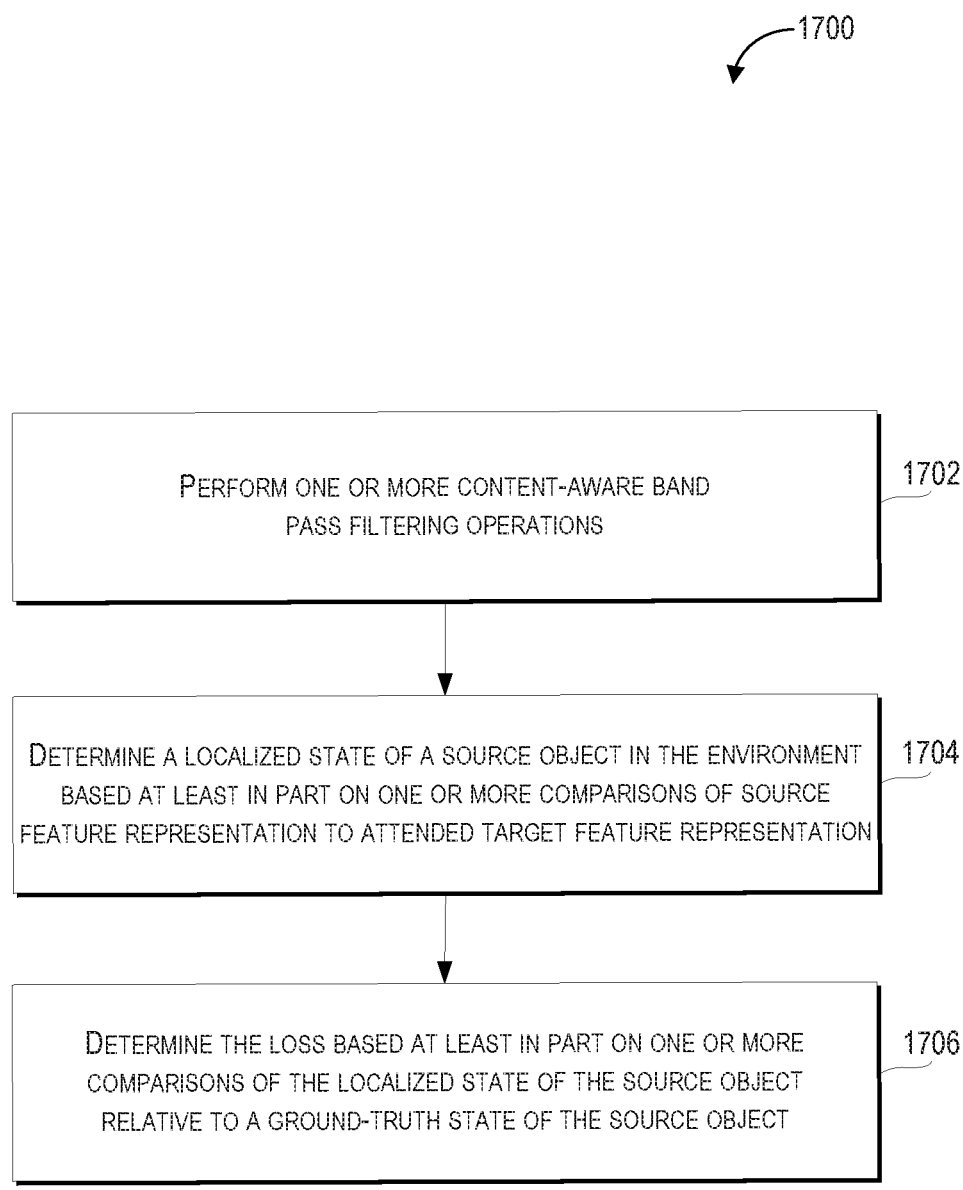
FIG. 17 depicts a flow diagram of an example method of feature compression and localization according to example embodiments of the present disclosure.

FIG. 17 depicts a flow diagram of an example method of feature compression and localization according to example embodiments of the present disclosure. One or more portions of a method 1700 can be implemented by one or more devices (e.g., one or more computing devices) or systems including, for example, the operations computing system 104, the vehicle 108, or the vehicle computing system 112, shown in FIG. 1. Moreover, one or more portions of the method 1700 can be implemented as an algorithm on the hardware components of the devices described herein (e.g., as in FIG. 1) to, for example, generate outputs including estimated locations of objects in an environment based on different representations of the environment. In some embodiments, one or more portions of the method 1700 can be performed as part of the method 1600 that is depicted in FIG. 16. FIG. 17 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1702, the method 1700 can include performing one or more content-aware band pass filtering operations that mask one or more portions of the attended feature representation based at least in part on attention to specific bands in a frequency domain. For example, the operations computing system 104 can use some combination of high-pass filtering and low-pass filtering to mask certain frequencies by attending to specific bands in the frequency domain.

At 1704, the method 1700 can include determining a localized state of a source object in the environment based at least in part on one or more comparisons of the source feature representation to the attended target feature representation. For example, the operations computing system 104 can compare one or more aspects of the source feature representation to the attended target feature representation to determine one or more matches between the source feature representation and the attended target feature representation.

At 1706, the method 1700 can include determining a loss based at least in part on evaluation of one or more loss functions (e.g., a loss function that includes one or more variables associated with one or more features) and/or one or more comparisons of the localized state of the source object to the ground-truth state (e.g., position, orientation, velocity, and/or heading) of the source object. For example, the operations computing system 104 can determine the loss based at least in part on evaluation of the one or more loss functions. In some embodiments, minimization of the loss is positively correlated with a more accurate localized state of the source object with respect to the ground-truth state of the source object.

Figure 18:
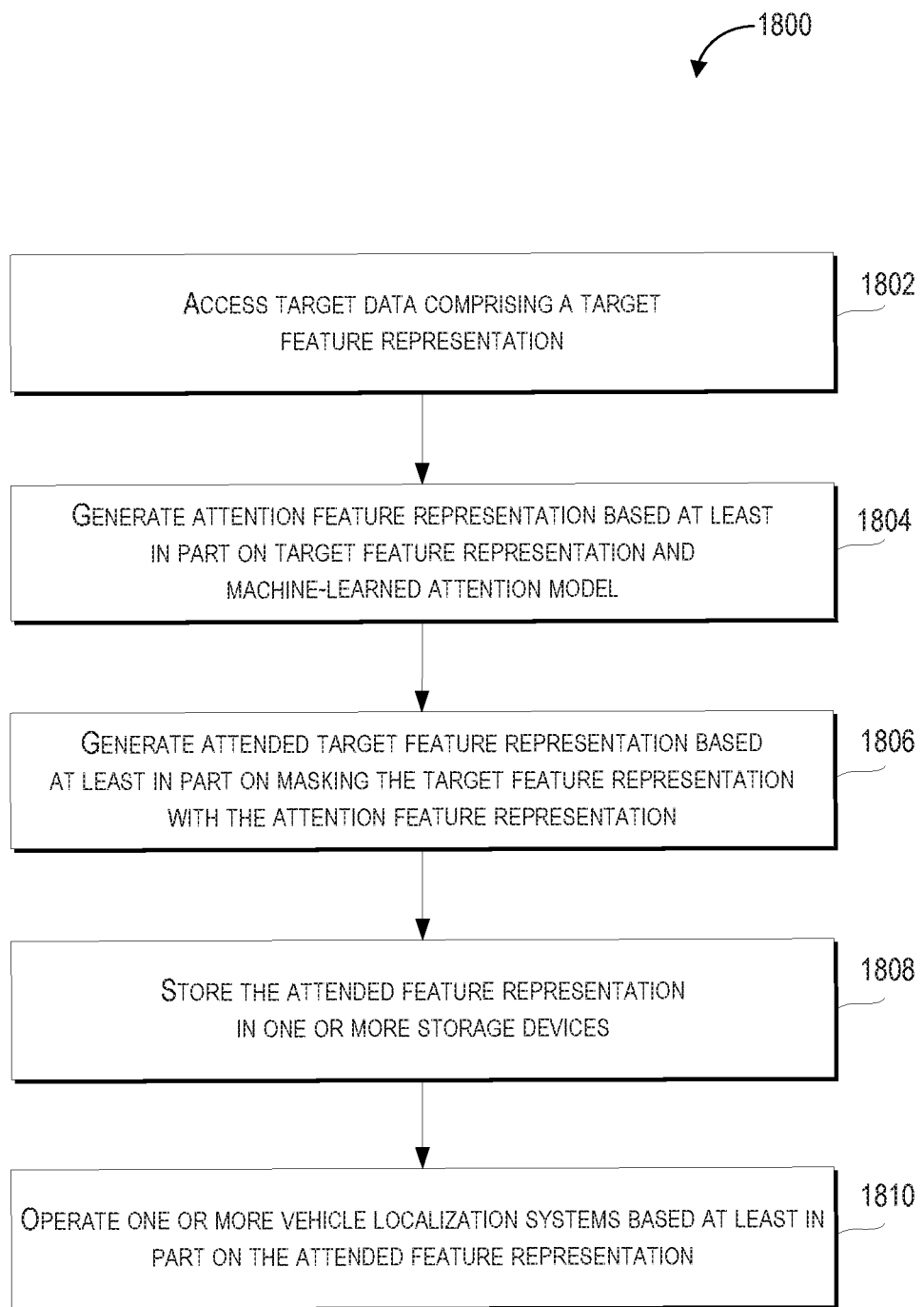
FIG. 18 depicts a flow diagram of an example method of feature compression and localization according to example embodiments of the present disclosure.

FIG. 18 depicts a flow diagram of an example method of feature compression and localization according to example embodiments of the present disclosure. One or more portions of a method 1800 can be implemented by one or more devices (e.g., one or more computing devices) or systems including, for example, the operations computing system 104, the vehicle 108, or the vehicle computing system 112, shown in FIG. 1. Moreover, one or more portions of the method 1800 can be implemented as an algorithm on the hardware components of the devices described herein (e.g., as in FIG. 1) to, for example, generate outputs including estimated locations of objects in an environment based on different representations of the environment. FIG. 18 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1802, the method 1800 can include accessing target data. In some examples, the target data can be based at least in part on, or can include, one or more sensor outputs from one or more sensors. For example, the operations computing system 104 can access target data that is locally or remotely stored. One or more portions of the target data can be accessed concurrently and/or at different times. The environment can include any area or space and can include any combination of a natural environment, a human-made environment (e.g., a city or highway), a simulated environment (e.g., an environment generated by one or more computing systems), and/or any other type of geographic environment. In some embodiments, the target data can include a compressed target feature representation of the environment.

In some embodiments the target data can be based at least in part on, or can include, one or more aerial images of the environment, one or more satellite images of the environment, or one or more maps of the environment.

At 1804, the method 1800 can include generating an attention feature representation based at least in part on the target feature representation and a machine-learned attention model. For example, the operations computing system 104 can use a machine-learned attention model that can receive an input including the target feature representation of an environment and generate an output including an attention feature representation. The attention feature representation can be used to mask one or more features of a representation based at least in part on the attention that is focused on those features. For example, in the context of generating a map, the operations computing system 104 can use a machine-learned attention model that has been trained to create a mask (the attention feature representation) that focuses attention on features that are useful for mapping applications including building features, waterway features, highway features, and/or road features.

At 1806, the method 1800 can include generating an attended target feature representation based at least in part on masking the target feature representation with the attention feature representation. For example, the operations computing system 104 can perform one or more operations to use the attention feature representation to mask one or more features of the target feature representation. By way of further example, the operations computing system 104 can use the attention feature representation to mask one or more features of the target feature representation and thereby generate the attended target feature representation.

At 1808, the method 1800 can include storing the attended feature representation in one or more storage devices which can include a storage device of an autonomous vehicle. For example, the operations computing system 104 can store data including the attended feature representation in one or more storage devices that can be accessed by other computing systems or devices for a variety of purposes including localization, navigation, and/or mapping applications. By way of further example, the vehicle computing system 112 can store data including the attended feature representation in one or more storage devices of the vehicle 108. The attended feature representation can, for example, represent a map of an environment in which the vehicle 108 is located.

At 1810, the method 1800 can include operating one or more vehicle localization systems and/or one or more mapping systems which can be based at least in part on the attended feature representation. By way of example, the operations computing system can use the attended feature representation to determine a location in an environment based at least in part on one or more comparisons of the attended feature representation to another representation of the environment (e.g., a source representation of the environment based at least in part on LiDAR data). For example, the attended feature representation can be accessed by the vehicle computing system 112 in order to localize the vehicle 108 in relation to its surrounding environment.

Figure 19:
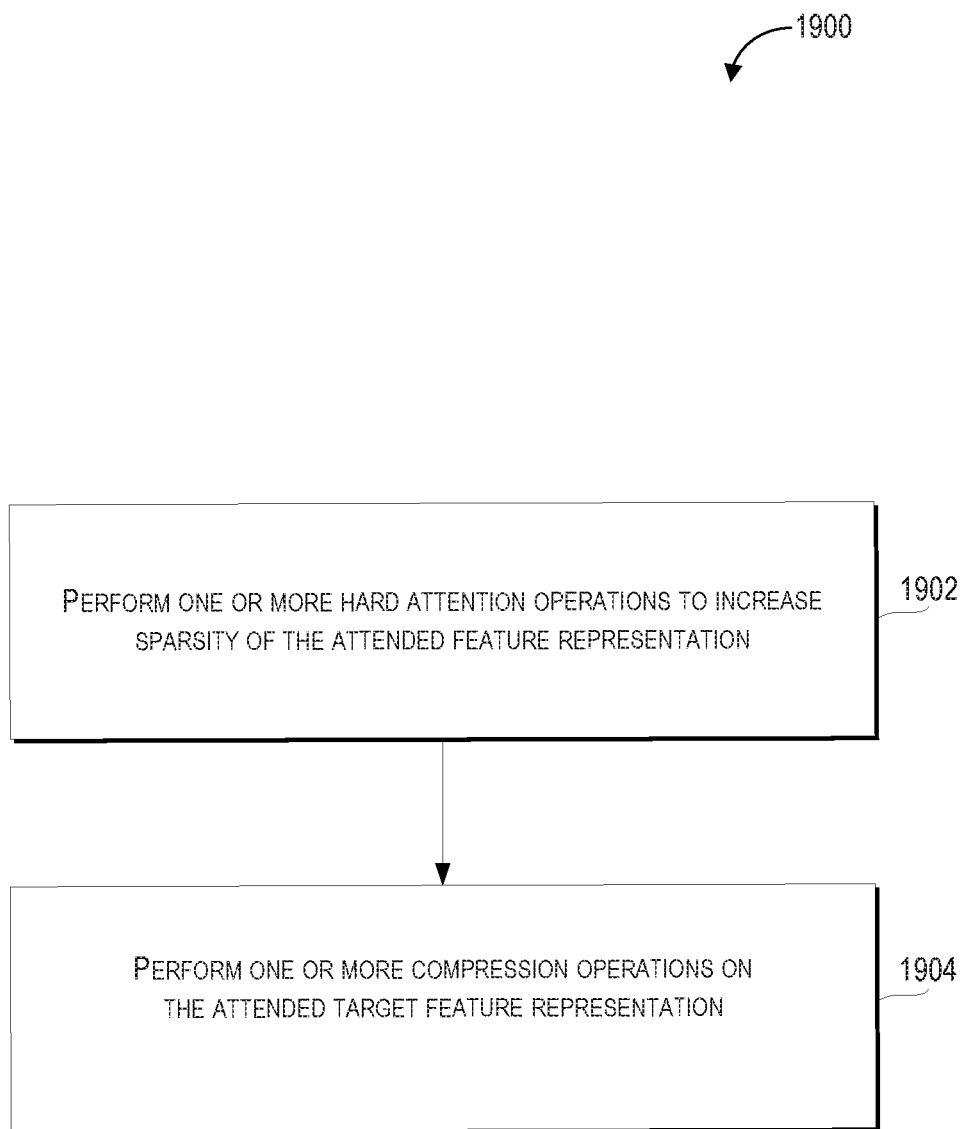
FIG. 19 depicts a flow diagram of an example method of feature compression and localization according to example embodiments of the present disclosure.

FIG. 19 depicts a flow diagram of an example method of feature compression and localization according to example embodiments of the present disclosure. One or more portions of a method 1900 can be implemented by one or more devices (e.g., one or more computing devices) or systems including, for example, the operations computing system 104, the vehicle 108, or the vehicle computing system 112, shown in FIG. 1. Moreover, one or more portions of the method 1900 can be implemented as an algorithm on the hardware components of the devices described herein (e.g., as in FIG. 1) to, for example, generate outputs including estimated locations of objects in an environment based on different representations of the environment. FIG. 19 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1902, the method 1900 can include performing one or more hard attention operations to increase sparsity of the attended feature representation. For example, hard attention ($att_h(f)$) can be formulated as:

$$att_h(f) = \text{binarize}(att_s(f; w)), \text{binarize} = \begin{cases} 0 & \text{if } x < \tau \\ 1 & \text{else} \end{cases}.$$

In the preceding formulation of hard attention, $att_s(f; w)$ can be a soft attention output (e.g., a soft attention map) of the machine-learned attention model, and $\tau$ can be a thresholding constant. For example, the operations computing system 104 can implement one or more hard attention operations on the attended feature representation based at least in part on evaluation of a hard attention function (e.g., $att_h(f)$).

In some embodiments, performing one or more hard attention operations to increase sparsity of the attended feature representation can include determining the sparsity of the attended feature representation based at least in part on evaluation of the attended target feature representation with respect to a sparsity threshold. For example, the thresholding constant $\tau$ can be used to determine the sparsity of the attended feature representation. For example, the operations computing system 104 can implement one or more hard attention operations on the attended feature representation based at least in part on evaluation of a hard attention function (e.g., $att_h(f)$) using the thresholding constant $\tau$ to sparsify the attended feature representation.

In some embodiments, the sparsity threshold can be based in part on a predetermined accuracy of the attended target feature representation with respect to the target feature representation and a predetermined data size of the attended target feature representation. For example, the sparsity threshold can be based at least in part on some combination of a desired accuracy of the attended target feature representation and/or a desired data size of the attended target feature representation.

At 1904, the method 1900 can include using one or more machine-learned compression models on the attended target feature representation and/or performing one or more compression operations on the attended target feature representation. For example, the operations computing system 104 can perform one or more compression operations and or use one or more machine-learned compression models to reduce the data size of the attended target feature representation. Furthermore, in some implementations the operations computing system 104 can perform a plurality of lossless binary compression operations that reconstruct the attended target feature representation without loss of information encoded in the attended target feature representation. For example, the one or more compression operations performed by the operations computing system 104 can include one or more Huffman encoding operations performed followed by one or more Run-Length-Encoding operations.

Figure 20:
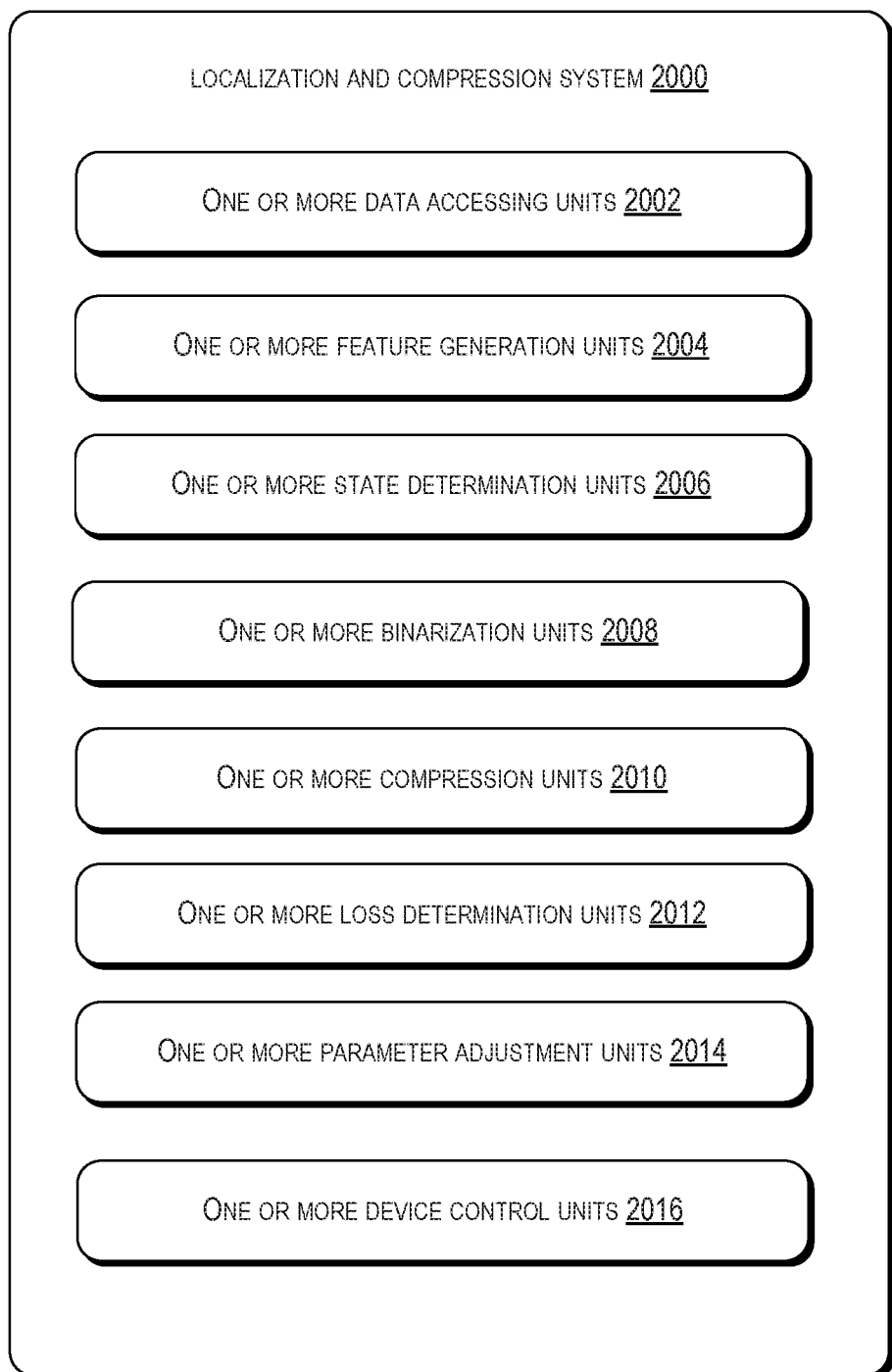
FIG. 20 depicts a diagram of an example system according to example embodiments of the present disclosure.

FIG. 20 depicts an example of a localization system according to example embodiments of the present disclosure. One or more operations and/or functions in FIG. 20 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 20 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a localization system 2000 can include one or more data accessing units 2002, one or more feature generation units 2004, one or more state determination units 2006, one or more binarization units 2008, one or more compression units 2010, one or more loss determination units 2012, one or more parameter adjustment units 2014, one or more device control units 2016, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware.

The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a feature compression and localization system) or configured (e.g., an ASIC custom designed and configured to operate a localization and compression system) to perform one or more algorithms for performing the operations and functions described herein. For example, the means (e.g., the one or more data accessing units 2002) can be configured to access source data and target data. The source data can include a representation (e.g., a source representation as described herein, including in the methods 500-1900 depicted in FIGS. 5-19) of an environment including a source object. The target data can include a compressed target feature representation of the environment. The compressed target feature representation (e.g., the compressed target feature representation described in the method 500 that is depicted in FIG. 5) can be based at least in part on compression of a target feature representation of the environment produced by one or more machine-learned feature extraction models. In some implementations, the target data can include a target feature representation of an environment.

In some implementations, the means (e.g., the one or more data accessing means 2002) can access training data. The training data can include a source representation of a training environment and a target representation of the training environment. The source representation can be associated with a ground-truth state of a source object in the training environment. In some implementations, the training data can include a source feature representation of a training environment and a target feature representation of the training environment.

The one or more feature generation units 2004 can be configured to generate a source feature representation based at least in part on the source data and/or the source representation and the one or more machine-learned feature extraction models. In some embodiments, the one or more feature generation units 2004 can be configured to generate a source feature representation and a target feature representation based at least in part on the one or more machine-learned feature extraction models accessing the source representation and the target representation respectively.

In some embodiments, the one or more feature generation units 2004 can be configured to generate a decoded target feature representation of the compressed target feature representation based at least in part on one or more lossless compression operations. The one or more lossless compression operations can include one or more lossless binary encoding operations. Further, the one or more feature generation units 2004 can generate the target feature representation based at least in part on the decoded target feature representation and the machine-learned reconstruction model.

In some embodiments, the one or more feature generation units 2004 can be configured to generate an encoded target feature representation based at least in part on the target feature representation and a machine-learned encoding model. In some embodiments, the one or more feature generation units 2004 can be configured to generate a reconstructed target feature representation based at least in part on the binarized target feature representation and a machine-learned decoding model. In some embodiments, the one or more feature generation units 2004 can be configured to generate at least one of the source feature representation and the target feature representation based at least in part on one or more machine-learned feature extraction models.

In some embodiments, the one or more feature generation units 2004 can be configured to generate an attention feature representation based at least in part on the target feature representation and a machine-learned attention model. In some embodiments, the machine-learned attention model can be trained by evaluating a loss associated with a matching score based at least in part on application of a matching function to the attention feature representation and a source representation compared to a ground-truth matching score for the target feature representation and the source feature representation. Further, the one or more feature generation means 2004 can be configured to generate an attended target feature representation based at least in part on masking the target feature representation with the attention feature representation. Further, the one or more feature generation means 2004 can be configured to perform one or more content-aware band pass filtering operations that mask one or more portions of the attended feature representation based at least in part on attention to specific bands in a frequency domain.

In some embodiments, the means (e.g., the one or more feature generation means 2004) can be configured to perform one or more hard attention operations to increase sparsity of the attended feature representation. Further, the one or more feature generation means 2004 can be configured to determining the sparsity of the attended feature representation based at least in part on evaluation of the attended target feature representation with respect to a sparsity threshold.

The means (e.g., the one or more state determination units 2006) can be configured to determine a localized state of the source object with respect to the environment based at least in part on the source feature representation and the compressed target feature representation. In some embodiments, the one or more state determination units 2006 can be configured to generate a reconstructed target feature representation based at least in part on the compressed target feature representation and a machine-learned reconstruction model. The reconstructed target feature representation can be a reconstruction of the target feature representation. Further, the one or more state determination units 2006 can determine the localized state of the source object based at least in part on one or more comparisons of the source feature representation to the reconstructed target feature representation. In some embodiments, the source object can be in a training environment and the localized state of the source object can be with respect to the environment or the training environment.

In some embodiments, the one or more state determination units 2006 can be configured to determine a localized state of the source object within the target representation of the environment based at least in part on the source feature representation and the compressed target feature representation.

In some embodiments, the one or more state determination units 2006 can be configured to determine one or more correlations between the reconstructed target feature representation and the source feature representation based at least in part on a probabilistic inference model configured to encode agreement between the source feature representation and the reconstructed target feature representation indexed at the position of the source object.

In some embodiments, the one or more state determination units 2006 can be configured to rotate the source feature representation to a plurality of candidate angles and determine at each of the plurality of candidate angles whether the source feature representation matches the compressed target feature representation.

In some embodiments, the one or more state determination units 2006 can be configured to determine one or more correlations between the source feature representation and the attended feature representation.

In some embodiments, the one or more state determination units 2006 can be configured to generate a decompressed target feature representation based at least in part on one or more lossless binary decoding operations; generate a reconstructed target feature representation based at least in part on the decompressed target feature representation and a machine-learned decoding model; and determine the localized state of the source object within the target representation of the environment based at least in part on one or more comparisons of the source feature representation to the reconstructed target feature representation.

In some embodiments, the one or more state determination units 2006 can be configured to determine a matching score based at least in part on application of a matching function to the source feature representation and the reconstructed target feature representation. Further, in some embodiments, the one or more state determination units 2006 can be configured to determine a matching score based at least in part on application of a matching function to the source feature representation and the attended target feature representation.

In some embodiments, the one or more state determination units 2006 can be configured to determine a localized state of a source object in the environment based at least in part on one or more comparisons of the source feature representation to the attended target feature representation.

The means (e.g., the one or more binarization units 2008) can be configured to generate a binarized target feature representation based at least in part on performance of one or more binary encoding operations on the encoded target feature representation. In some embodiments, the one or more binarization units 2008 can be configured to generate a binarized target feature representation of the encoded target feature representation.

The means (e.g., the one or more compression units 2010) can be configured to generate a compressed target feature representation of the target feature representation based at least in part on one or more compression operations, and/or the use of one or more machine-learned compression models (e.g., inputting the target feature representation into the one or more machine-learned compression models). The one or more compression units 2010 can be configured to generate an encoded target feature representation based at least in part the target feature representation and a machine-learned encoding model; and generate the compressed target feature representation based at least in part on use of one or more lossless binary encoding operations on the encoded target feature representation. In some embodiments, adjusting the one or more parameters of the one or more machine-learned compression models based at least in part on the loss can include adjusting the one or more parameters of the machine-learned encoding model based at least in part on the loss. The means one or more compression units 2010 can be configured to generate an attention feature representation based at least in part on the target feature representation and a machine-learned attention model; and generate an attended target feature representation based at least in part on masking the target feature representation with the attention feature representation. The compressed target feature representation can be based at least in part on the attended target feature representation.

In some embodiments, the one or more compression units 2010 can be configured to generate a compressed target feature representation of the encoded target feature representation based at least in part on performance of one or more compression operations on the binarized target feature representation, and/or the use of one or more machine-learned compression models (e.g., inputting an input including the binarized target feature representation into the one or more machine-learned compression models that are configured and/or trained to generate the compressed target feature representation based on the input).

In some embodiments, the one or more compression units 2010 can be configured to perform one or more compression operations on an attended target feature representation.

The means (e.g., the one or more loss determination units 2012) can be configured to determine a loss based at least in part on one or more comparisons of the localized state of the source object to the ground-truth state of the source object. Further, the one or more loss determination units 2012 can be configured to determine the loss based at least in part on an entropy of the compressed target feature representation. The entropy can be based at least in part on a data size of the compressed target feature representation. Further, the entropy can be positively correlated with data size.

The one or more loss determination units 2012 can be configured to determine the loss based at least in part on an accuracy of the localized state of the source object with respect to the ground-truth state of the source object, wherein the accuracy is inversely correlated with the loss and a distance of the localized state of the source object from the ground-truth state of the source object.

In some embodiments, the one or more loss determination units 2012 can be configured to determine a loss associated with the matching score for the source feature representation and the reconstructed target feature representation relative to a ground-truth matching score. In some embodiments, the one or more loss determination units 2012 can be configured to determine the loss based at least in part on one or more comparisons of the matching score to the ground-truth matching score.

In some embodiments, the one or more loss determination units 2012 can be configured to determine a loss associated with the matching score for the source feature representation and the target feature representation relative to a ground-truth matching score for the source feature representation and the target feature representation. In some embodiments, the one or more loss determination units 2012 can be configured to determine a loss based at least in part on one or more comparisons of the localized state of the source object relative to a ground-truth state of the source object.

The means (e.g., the one or more parameter adjustment units 2014) can be configured to adjust one or more parameters of one or more machine-learned compression models, a machine-learned encoding model, a machine-learned decoding model, and/or a machine-learned attention model, based at least in part on the loss. In some embodiments, the one or more parameter adjustment units 2014 can be configured to backpropagate the loss through the machine-learned decoding model; and backpropagate the loss through the machine-learned encoding model. Backpropagating the loss can include straight through estimation that bypasses the one or more lossless binary encoding operations, the one or more machine-learned compression models, and/or the one or more compression operations and/or bypasses generating a binarized target feature representation of an encoded target feature representation.

Furthermore, the means (e.g., the one or more device control units 2016) can be configured to control, based at least in part on the state (e.g., the position) of the source object with respect to the environment, one or more vehicle systems associated with operation of a vehicle. The vehicle can include an autonomous vehicle. The one or more vehicle systems can include one or more engine systems, one or more motor systems, one or more steering systems, one or more braking systems, one or more electrical systems, and/or one or more communications systems.

In some embodiments, the one or more device control units 2016 can be configured to generate one or more maps based at least in part on the compressed target representation; and store the one or more maps in a storage device of an autonomous vehicle associated with a computing device.

In some embodiments, the one or more device control units 2016 can be configured to store an attended feature representation in one or more tangible non-transitory computer-readable media.

In some embodiments, the one or more device control units 2016 can be configured to operate, based at least in part on the attended feature representation, one or more vehicle localization systems or one or more mapping systems. The attended feature representation can be used to determine a location in an environment based at least in part on one or more comparisons to another representation of the environment.

Figure 21:
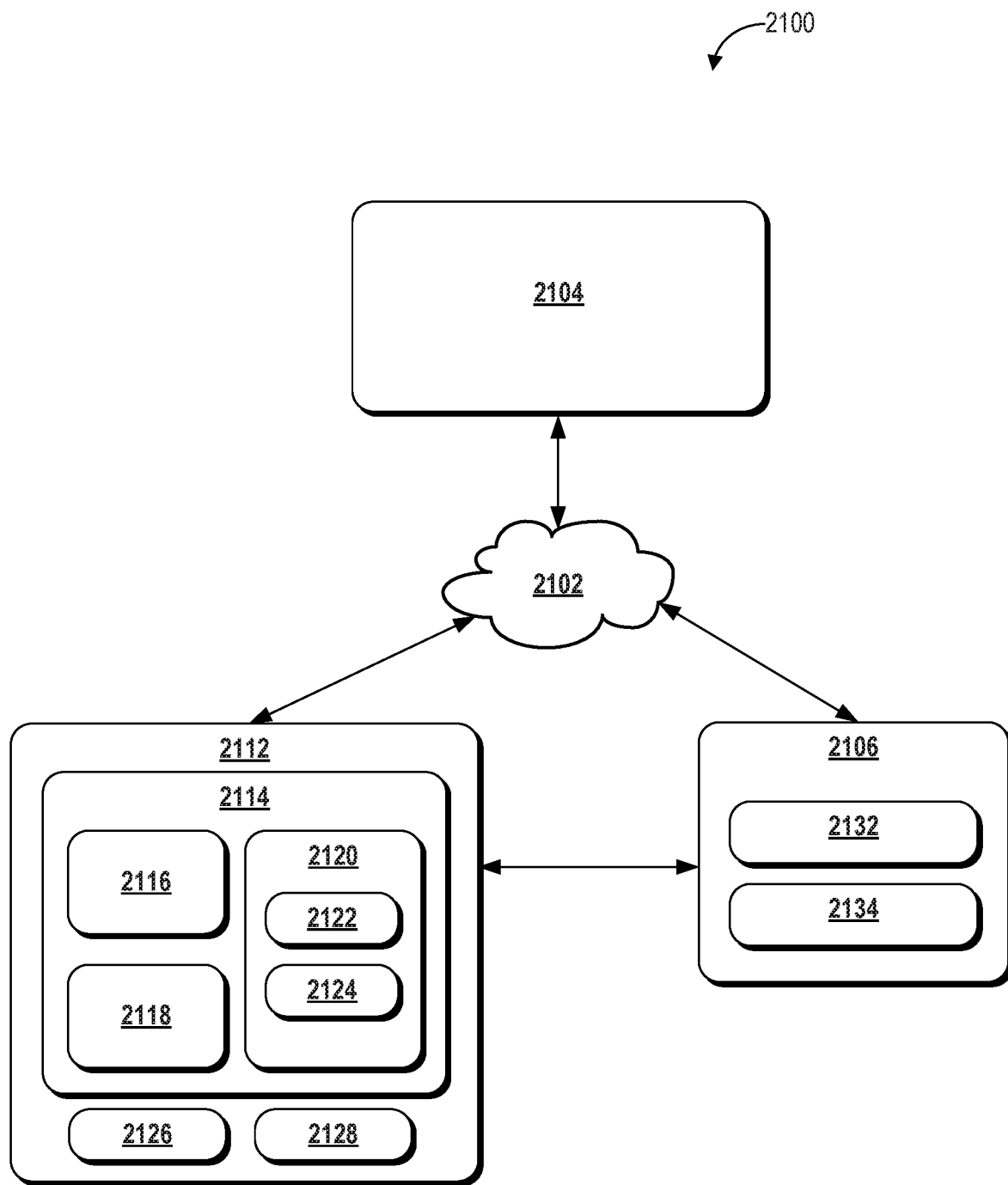
FIG. 21 depicts a diagram of an example system according to example embodiments of the present disclosure.

FIG. 21 depicts a diagram of an example system according to example embodiments of the present disclosure. A system 2100 can include a network 2102 which can include one or more features of the communications network 102 depicted in FIG. 1; an operations computing system 2104 which can include one or more features of the operations computing system 104 depicted in FIG. 1; one or more remote computing devices 2106 which can include one or more features of the one or more remote computing devices 106 depicted in FIG. 1; a vehicle computing system 2112 which can include one or more features of the vehicle computing system 112 depicted in FIG. 1; one or more computing devices 2114; a communication interface 2116; one or more processors 2118; one or more memory devices 2120; memory system 2122; memory system 2124; one or more input devices 2126; one or more output devices 2128; one or more input devices 2132; and one or more output devices 2134.

The vehicle computing system 2112 can include the one or more computing devices 2114. The one or more computing devices 2114 can include one or more processors 2118 which can be included on-board a vehicle including the vehicle 108 and one or more memory devices 2120 which can be included on-board a vehicle including the vehicle 108. The one or more processors 2118 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 2118 can include a single processor or a plurality of processors that are operatively and/or selectively connected. The one or more memory devices 2120 can include one or more non-transitory computer-readable storage media, such as RAM, ROM, EEPROM, EPROM, flash memory devices, magnetic disks, and/or combinations thereof.

The one or more memory devices 2120 can store data or information that can be accessed by the one or more processors 2118. For instance, the one or more memory devices 2120 which can be included on-board a vehicle including the vehicle 108, can include a memory system 2122 that can store computer-readable instructions that can be executed by the one or more processors 2118. The memory system 2122 can include software written in any programming language that can be implemented in hardware (e.g., computing hardware). Further, the memory system 2122 can include instructions that can be executed in logically and/or virtually separate threads on the one or more processors 2118. The memory system 2122 can include any set of instructions that when executed by the one or more processors 2118 cause the one or more processors 2118 to perform operations.

For example, the one or more memory devices 2120 which can be included on-board a vehicle (e.g., the vehicle 108) can store instructions, including specialized instructions, that when executed by the one or more processors 2118 on-board the vehicle cause the one or more processors 2118 to perform operations such as any of the operations and functions of the one or more computing devices 2114 or for which the one or more computing devices 2114 are configured, including any of the operations performed by the vehicle computing system 112 and/or any other operations and/or functions for operation of a vehicle, as described in the present disclosure.

The one or more memory devices 2120 can include a memory system 2124 that can store data that can be retrieved, manipulated, created, and/or stored by the one or more computing devices 2114. The data stored in memory system 2124 can include, for instance, the source data, target data, and/or training data that are described herein, including in the methods 500-1900 that are depicted in FIGS. 5-19 respectively. Furthermore, the data stored in the memory system 2124 can include one or more machine-learned models that have been configured and/or trained to generate an output based at least in part on an input provided to the one or more machine-learned models. For example, the one or more machine-learned models stored in the memory system 2124 can include one or more convolutional neural networks, one or more residual convolutional neural networks, one or more recurrent neural networks, and/or one or more recursive neural networks. Further, the one or more machine-learned models stored in the memory system 2124 can include one or more machine-learned feature extraction models, one or more machine-learned reconstruction models, one or more machine-learned encoding models, one or more decoding models, and/or one or more machine-learned attention models, which are described herein including in the methods 500-1900 that are depicted in FIGS. 5-19.

The data that is stored in the memory system 2124 can also include data associated with one or more states of one or more objects detected by one or more sensors (e.g., the one or more sensors 114 of the vehicle 108 that is described in the method 100 that is depicted in FIG. 1); data associated with one or more states of a device associated with the operations and/or functions of the vehicle computing system 2112, the operations computing system 2104, and/or the one or more remote computing devices 2106; data generated by any of the computing systems (e.g., the vehicle computing system 112) and/or computing devices involved in the determination of the localized state of a source object as described in the method 500 that is depicted in FIG. 5; data associated with user input; data associated with one or more actions and/or control command signals; data associated with users; and/or other data or information. The data in the memory system 2124 can be stored in one or more databases. The one or more databases can be split up so that the one or more databases are located in multiple locales onboard a vehicle which can include the vehicle 108. In some implementations, the one or more computing devices 2114 can obtain data from one or more memory devices that are remote from a vehicle, including, for example the vehicle 108.

The system 2100 can include the network 2102 (e.g., a communications network) which can be used to send and/or receive signals (e.g., electronic signals) or data (e.g., data from a computing device) including signals or data exchanged between computing devices including the operations computing system 2104, the one or more remote computing devices 2106, and/or the vehicle computing system 2112. The network 2102 can include any combination of various wired (e.g., twisted pair cable) and/or wireless communication mechanisms (e.g., cellular, wireless, satellite, microwave, and radio frequency) and/or any desired network topology (or topologies). For example, the communications network 2102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 2114 can also include the communication interface 2116 used to communicate with one or more other systems which can be included on-board a vehicle including the vehicle 108 (e.g., over the network 2102). The communication interface 2116 can include any suitable components for interfacing with one or more networks, including for example, transmitters, receivers, ports, controllers, antennas, other hardware and/or software.

The vehicle computing system 2112 can also include one or more input devices 2126 and/or one or more output devices 2128. The one or more input devices 2126 and/or the one or more output devices 2128 can be included and/or otherwise associated with a human-machine interface system. The one or more input devices 2126 can include, for example, hardware for receiving information from a user, such as a touch screen, touch pad, mouse, data entry keys, speakers, and/or a microphone suitable for voice recognition. The one or more output devices 2128 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The operations computing system 2104 can include one or more computing devices configured to perform one or more operations associated with operating one or more services. The one or more services can include one or more transportation services, courier services, and/or delivery services. Furthermore, the operations computing system 2104 can include one or more processors and one or more memory devices that can be used to store data including the source data, the target data, the training data, and/or the one or more machine-learned models that are stored in the memory system 2124.

The one or more remote computing devices 2106 can include various types of computing devices. For example, the one or more remote computing devices 2106 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 2106 can be associated with a user. The one or more remote computing devices 2106 described herein can also be representative of a user device that can be included in the human machine interface system of a vehicle including the vehicle 108.

The one or more remote computing devices 2106 can include one or more input devices 2132 and/or one or more output devices 2134. The one or more input devices 2132 can include, for example, hardware for receiving information from a user, such as a touch screen, touch pad, mouse, data entry keys, speakers, and/or a microphone suitable for voice recognition. The one or more output devices 2134 can include hardware for providing content for display. For example, the one or more output devices 2134 can include a display device (e.g., display screen, CRT, LCD), which can include hardware for a user interface.

Furthermore, the one or more remote computing devices 2106 can include one or more processors and one or more memory devices which can be used to store data including the source data, the target data, the training data, and/or the one or more machine-learned models that are stored in the memory system 2124.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for training machine-learned models, the computer-implemented method comprising:
    accessing training data comprising a source feature representation of a training environment and a target feature representation of the training environment, wherein the target feature representation of the training environment comprises at least one of: one or more aerial images of the training environment, one or more satellite images of the training environment, or one or more maps of the training environment;
    generating an encoded target feature representation based at least in part on the target feature representation and a machine-learned encoding model;
    generating a binarized target feature representation based at least in part on the encoded target feature representation;
    generating a reconstructed target feature representation based at least in part on the binarized target feature representation and a machine-learned decoding model;
    determining a matching score based at least in part on application of a matching function to the source feature representation and the reconstructed target feature representation;
    determining a loss associated with the matching score for the source feature representation and the reconstructed target feature representation relative to a ground-truth matching score; and
    adjusting one or more parameters of at least one of the machine-learned encoding model or the machine-learned decoding model based at least in part on the loss.

2. The computer-implemented method of claim 1, further comprising:
    generating at least one of the source feature representation and the target feature representation based at least in part on one or more machine-learned feature extraction models.

3. The computer-implemented method of claim 1, wherein the determining the matching score based at least in part on the application of the matching function to the source feature representation and the reconstructed target feature representation comprises:
    determining a localized state of a source object in the training environment based at least in part on one or more comparisons of the source feature representation to the reconstructed target feature representation.

4. The computer-implemented method of claim 1, wherein the determining the loss associated with the matching score for the source feature representation and the reconstructed target feature representation relative to the ground-truth matching score comprises:
    determining the loss based at least in part on one or more comparisons of the matching score to the ground-truth score.

5. The computer-implemented method of claim 1, wherein the adjusting one or more parameters of at least one of the machine-learned encoding model or the machine-learned decoding model based at least in part on the loss comprises:
    backpropagating the loss through the machine-learned decoding model, wherein backpropagating the loss comprises straight through estimation that bypasses the generating the binarized target feature representation of the encoded target feature representation, and wherein the straight through estimation comprises substituting generating the binarized target feature representation with use of an identity function; and
    backpropagating the loss through the machine-learned encoding model.

6. The computer-implemented method of claim 1, wherein the loss is based in part on at least one of a matching loss and a compression loss, and wherein the matching loss is based at least in part on an accuracy of the matching score with respect to the ground-truth matching score, and wherein the compression loss is based at least in part on a data size of the reconstructed target feature representation.

7. A computing system comprising:
    one or more processors;
    a machine-learned encoding model configured to access a target feature representation and generate an encoded target feature representation based at least in part on the target feature representation; and
    one or more tangible non-transitory computer-readable media storing computer-readable instructions that when executed by one or more processors cause the one or more processors to perform operations, the operations comprising:
        accessing target data comprising a target feature representation of an environment;
        generating an encoded target feature representation based at least in part on the target feature representation and the machine-learned encoding model;

generating a binarized target feature representation based at least in part on performance of one or more binary encoding operations on the encoded target feature representation;

generating a compressed target feature representation of the encoded target feature representation based at least in part on performance of one or more compression operations on the binarized target feature representation;

generating one or more maps based at least in part on the compressed target feature representation; and storing the one or more maps in a storage device of an autonomous vehicle associated with the computing system.

8. The computing system of claim 7, wherein the machine-learned encoding model is configured based at least in part on joint training with a machine-learned decoding model configured to generate a reconstructed target feature representation based at least in part on the binarized target feature representation, wherein the reconstructed target feature representation is a reconstruction of the target feature representation.

9. The computing system of any of claim 8, wherein at least one of the machine-learned encoding model or the machine-learned decoding model are trained based at least in part on a matching score based at least in part on application of a matching function to a source feature representation of the environment and the reconstructed target feature representation relative to a ground-truth matching score associated with the source feature representation and the target feature representation.

10. The computing system of claim 9, wherein a compression loss function comprises a regularization term that is used to increase sparsity of the binarized target feature representation.

11. The computing system of claim 7, wherein the one or more binary encoding operations reconstruct the compressed target feature representation without loss of information encoded in the target feature representation.

12. The computing system of claim 7, wherein the one or more binary encoding operations are based at least in part on a frequency of occurrence of one or more portions of the target feature representation, and one or more subsequent encoding operations are based at least in part on one or more redundancies in one or more portions of the target feature representation.

13. The computing system of claim 7, wherein the one or more compression operations comprise one or more Huffman encoding operations performed prior to one or more Run-Length-Encoding operations.

14. A computing device comprising:
one or more processors;
a memory comprising one or more computer-readable media, the memory storing computer-readable instructions that when executed by the one or more processors cause the one or more processors to perform operations comprising:
accessing target data comprising a target feature representation of an environment;
generating an encoded target feature representation of the target feature representation based at least in part on a machine-learned encoding model, wherein the encoded target feature representation has a smaller data size than the target feature representation;
generating a binarized target feature representation of the encoded target feature representation;
generating a compressed target feature representation of the encoded target feature representation based at least in part on performance of one or more compression operations on the binarized target feature representation;
generating one or more maps based at least in part on the compressed target feature representation; and
storing the one or more maps in a storage device of an autonomous vehicle associated with the computing device.

15. The computing device of claim 14, wherein the generating the binarized target feature representation of the encoded target feature representation comprises:
performing a first set of one or more binary encoding operations based at least in part on a frequency of occurrence of one or more portions of the target feature representation; and
performing a second set of one or more binary encoding operations subsequent to the first set of the one or more binary encoding operations, wherein the second set of the one or more binary encoding operations are based at least in part on one or more redundancies in one or more portions of the target feature representation.

16. The computing device of claim 15, wherein the one or more binary encoding operations comprise one or more Huffman encoding operations, and wherein the one or more subsequent binary encoding operations comprise one or more Run-Length-Encoding operations.

17. The computing device of claim 14, wherein the machine-learned encoding model is a residual convolutional neural network.

* * * * *